US012572953B2

(12) United States Patent
Maas et al.

(10) Patent No.: US 12,572,953 B2
(45) Date of Patent: Mar. 10, 2026

(54) CUSTOMER DATA VERIFICATION IN MANAGEMENT AND DETERMINATION OF USER IDENTITY USING IDENTITY GRAPHS

(71) Applicant: Target Brands, Inc., Minneapolis, MN (US)

(72) Inventors: Brenda Maas, Elk River, MN (US); Abhishek Srivastava, Minneapolis, MN (US); Jill Lemmerman, Minneapolis, MN (US); Kristina Taylor, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 181 days.

(21) Appl. No.: 18/098,031

(22) Filed: Jan. 17, 2023

(65) Prior Publication Data

US 2024/0185275 A1 Jun. 6, 2024

(30) Foreign Application Priority Data

Dec. 6, 2022 (IN) .............................. 202211070303

(51) Int. Cl.
| | |
|---|---|
| *G06Q 20/40* | (2012.01) |
| *G06Q 30/0204* | (2023.01) |
| *G06Q 30/0226* | (2023.01) |
| *G06Q 30/0251* | (2023.01) |
| *G06Q 30/0601* | (2023.01) |
| *H04L 67/306* | (2022.01) |

(52) U.S. Cl.
CPC ....... *G06Q 30/0205* (2013.01); *G06Q 20/401* (2013.01); *G06Q 20/4014* (2013.01); *G06Q 30/0204* (2013.01); *G06Q 30/0229* (2013.01);

*G06Q 30/0269* (2013.01); *G06Q 30/0631* (2013.01); *H04L 67/306* (2013.01)

(58) Field of Classification Search
CPC ...... G06Q 20/00–425; G06Q 30/00–08; H04L 67/00–75
See application file for complete search history.

(56) References Cited

U.S. PATENT DOCUMENTS

| | | | |
|---|---|---|---|
| 5,974,412 A | 10/1999 | Hazlehurst et al. |
| 7,376,714 B1 | 5/2008 | Gerken |
| 8,626,835 B1 | 1/2014 | Gyongyi et al. |
| 8,762,413 B2 | 6/2014 | Graham, Jr. et al. |
| 8,954,358 B1 | 2/2015 | Zhang et al. |

(Continued)

OTHER PUBLICATIONS

"The Viant Household ID" Viant. "https://www.viantinc.com/," Accessed Feb. 16, 2022.

(Continued)

*Primary Examiner* — Chenyuh Kuo

(74) *Attorney, Agent, or Firm* — Merchant & Gould P.C.

(57) ABSTRACT

A user identity management platform is provided that manages user identity for an enterprise, such as a retail enterprise. In particular, a specific identity graph structure is provided that allows for flexible management and selection of user account information depending on the context in which that user account information is to be used. Confidence scores may be maintained for nodes and edges and probabilistic techniques associated with account activity may be used to improve confidence of association among nodes within a cluster representing a unique user.

16 Claims, 27 Drawing Sheets

(56) References Cited

U.S. PATENT DOCUMENTS

| | | | |
|---|---|---|---|
| 8,965,914 | B2 | 2/2015 | Eshwar et al. |
| 9,064,002 | B1 | 6/2015 | Gyongyi et al. |
| 9,077,728 | B1 | 7/2015 | Hart et al. |
| 9,355,155 | B1 * | 5/2016 | Cassel ................. G06F 3/04842 |
| 9,699,196 | B1 | 7/2017 | Kolman et al. |
| 9,830,328 | B2 * | 11/2017 | Faith .................. G06Q 30/0631 |
| 10,291,635 | B2 | 5/2019 | Muddu et al. |
| 10,341,430 | B1 | 7/2019 | Badawy et al. |
| 10,523,682 | B1 | 12/2019 | Badawy et al. |
| 10,554,665 | B1 | 2/2020 | Badawy et al. |
| 10,628,837 | B2 | 4/2020 | Nair et al. |
| 10,681,056 | B1 * | 6/2020 | Badawy ................. G06Q 10/00 |
| 10,862,928 | B1 | 12/2020 | Badawy et al. |
| 11,037,138 | B2 * | 6/2021 | Theurer .............. G06Q 20/351 |
| 11,057,366 | B2 | 7/2021 | Avetisov et al. |
| 11,157,872 | B2 | 10/2021 | McMillan et al. |
| 11,403,643 | B2 | 8/2022 | Shekhar et al. |
| 11,704,673 | B1 | 7/2023 | Drapeau et al. |
| 2008/0010304 | A1 * | 1/2008 | Vempala .............. G06F 16/355 |
| 2010/0042680 | A1 | 2/2010 | Czyzewicz et al. |
| 2010/0306032 | A1 | 12/2010 | Jolley |
| 2012/0159647 | A1 | 6/2012 | Sanin et al. |
| 2012/0246098 | A1 | 9/2012 | Chari et al. |
| 2013/0191223 | A1 | 7/2013 | Harris et al. |
| 2014/0207813 | A1 | 7/2014 | Long et al. |
| 2015/0046528 | A1 | 2/2015 | Piepgrass et al. |
| 2015/0149269 | A1 | 5/2015 | Tietzen et al. |
| 2016/0092580 | A1 * | 3/2016 | Komeili ................. G06Q 10/10 |
| | | | 707/722 |
| 2016/0134692 | A1 | 5/2016 | Ju et al. |
| 2016/0203327 | A1 | 7/2016 | Akkiraju et al. |
| 2016/0241531 | A1 | 8/2016 | Loughlin-Mchugh et al. |
| 2017/0011226 | A1 | 1/2017 | Henderson |
| 2017/0024488 | A1 | 1/2017 | Henderson |
| 2017/0039242 | A1 | 2/2017 | Milton et al. |
| 2017/0193073 | A1 | 7/2017 | Tannen et al. |
| 2017/0201525 | A1 | 7/2017 | Biller et al. |
| 2018/0081968 | A1 | 3/2018 | Aryan |
| 2018/0218069 | A1 | 8/2018 | Rege et al. |
| 2018/0349800 | A1 | 12/2018 | Saba et al. |
| 2019/0114342 | A1 | 4/2019 | Orun et al. |
| 2019/0236597 | A1 | 8/2019 | Huang et al. |
| 2020/0280564 | A1 | 9/2020 | Badawy et al. |
| 2020/0311707 | A1 * | 10/2020 | Achan .................. G06Q 20/401 |
| 2020/0311746 | A1 | 10/2020 | Parida et al. |
| 2020/0372016 | A1 * | 11/2020 | Rogynskyy ......... H04L 67/1095 |
| 2022/0109986 | A1 * | 4/2022 | Jogand-Coulomb ........................ |
| | | | H04L 63/123 |
| 2022/0191235 | A1 * | 6/2022 | Ni .......................... G06F 16/245 |
| 2022/0405309 | A1 | 12/2022 | Qorbani |
| 2023/0298055 | A1 | 9/2023 | Woytarowicz et al. |
| 2023/0298058 | A1 | 9/2023 | Woytarowicz et al. |
| 2024/0037545 | A1 * | 2/2024 | Huang ................. G06Q 20/047 |
| 2024/0095779 | A1 * | 3/2024 | Maity ................... G06N 5/022 |
| 2024/0169322 | A1 | 5/2024 | Vanasco |
| 2024/0185242 | A1 | 6/2024 | Basu et al. |
| 2024/0185277 | A1 | 6/2024 | Lemmerman et al. |
| 2024/0185284 | A1 | 6/2024 | Hitzman et al. |
| 2024/0380597 | A1 * | 11/2024 | Lopez .................. H04L 9/3231 |

OTHER PUBLICATIONS

"Using a Private ID Graph" Oracle, 2022. "https://docs.oracle.com/en/cloud/saas/data-cloud/data-cloud-help-center/IntegratingBlueKaiPlatform/IDManagement/private_id_setup.html#:~:text=You%20can%20use%20a%20private,%2C%20CRM%2Dbased%20private%20ID." Accessed Feb. 16, 2022.

Mitra, Soumyadeb, "The Tale of Identity Graph and Identity Resolution" Rudderstack.com "https://www.rudderstack.com/blog/the-tale-of-identity-graph-and-identity-resolution/," May 5, 2020.

"Identity Graph: Connecting Data for Better Customer Relationships" LiveRamp, "https://liveramp.com/sitemap/" Accessed Feb. 16, 2022.

RG, Amit, "What is an Identity Graph? | Everything You Need to Know" Richpanel, "https://www.richpanel.com/blog/what-is-an-identity-graph," May 12, 2018, Accessed Feb. 16, 2022.

"Gain a Holistic View of Customers" Richpanel, 2021. Accessed Feb. 16, 2022.

* cited by examiner

200

Receive User Identity Request 602

Determine a User Cluster Associated with Requested User Identity 604

Resolve User Profile Nodes Responsive to Request Based on Confidence Level(s) 606

Return User Profile Nodes Associated With User Identity Request 608

Correlate Responsive User Profile Node(s) to Account / Transaction Data for Identity-Based Action(s) 610

600

Send Attributes: Name, Address, Phone/Email, Acct, Store ID 902

Apply Match Rules 904

Confirm Card and Provide Match Reason 906

Adjust Confidence Based on Match 908

900

Receive Indication of New Cluster 1102

Capture Timestamp, Node ID, and Local Counter on Node of Platform 1104

Concatenate Into 64-Bit ID Representation 1106

1100

1400

1500

1600

1700

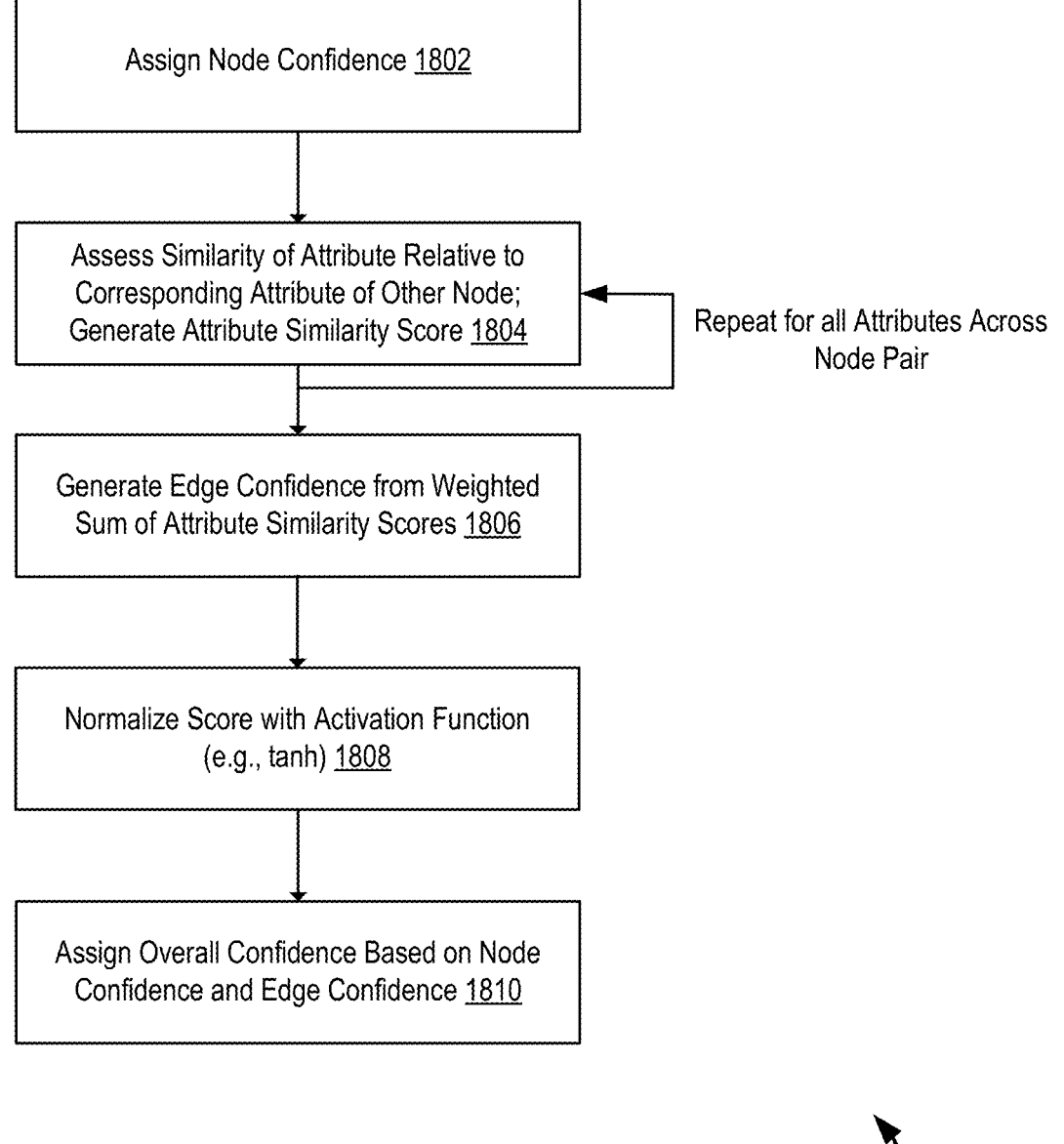

Assign Node Confidence 1802

Assess Similarity of Attribute Relative to Corresponding Attribute of Other Node; Generate Attribute Similarity Score 1804

Repeat for all Attributes Across Node Pair

Generate Edge Confidence from Weighted Sum of Attribute Similarity Scores 1806

Normalize Score with Activation Function (e.g., tanh) 1808

Assign Overall Confidence Based on Node Confidence and Edge Confidence 1810

Train Random Forest Classifier Using
Transaction Data for Known Accounts 2402

Obtain New Transaction Data 2404

Determine Possible Identity Matches In Identity
Graph (New or Existing) 2406

Process Node Associations for Matched
Node(s) 2408

2400

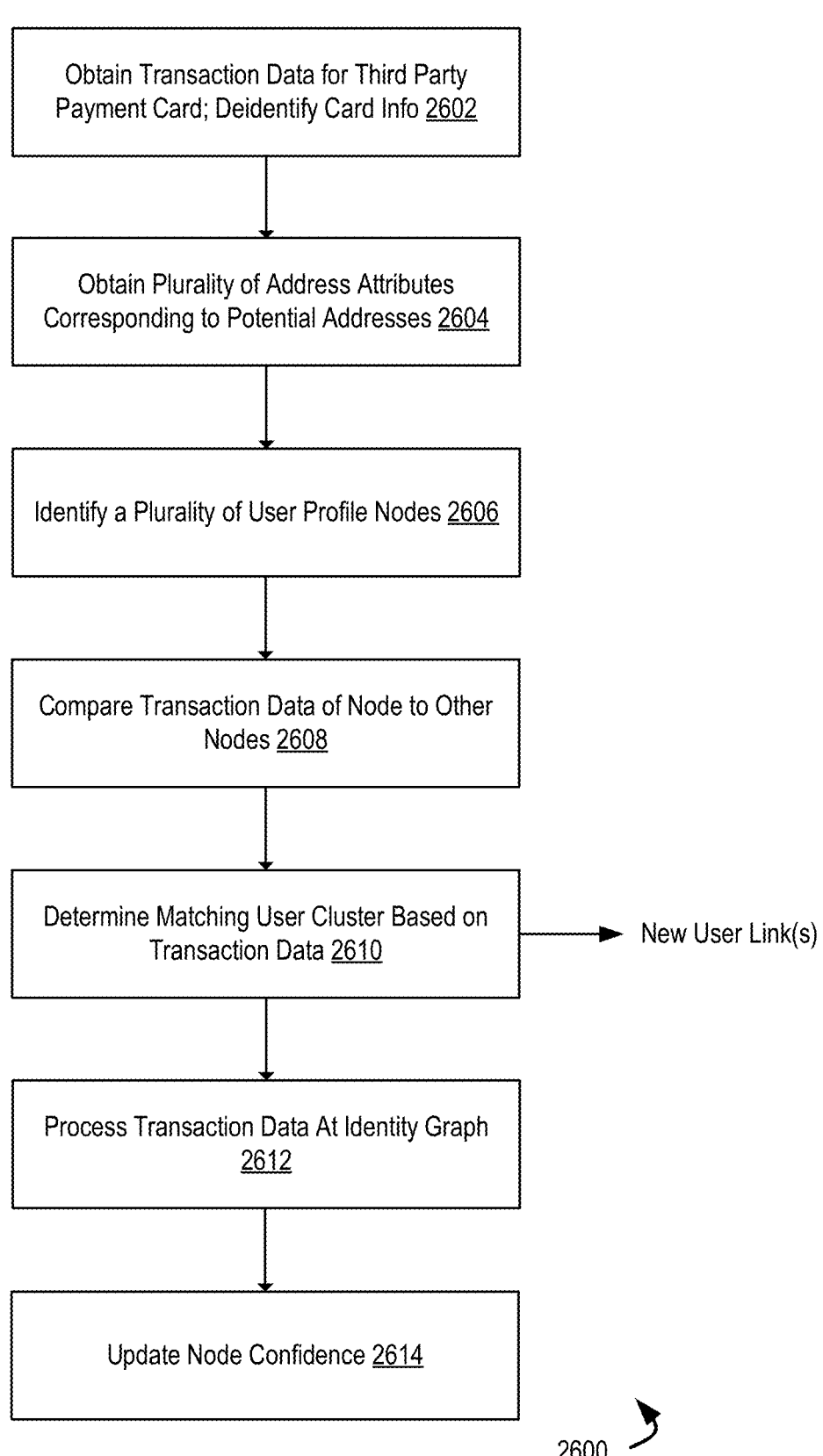

Obtain Transaction Data for Third Party
Payment Card; Deidentify Card Info 2602

Obtain Plurality of Address Attributes
Corresponding to Potential Addresses 2604

Identify a Plurality of User Profile Nodes 2606

Compare Transaction Data of Node to Other
Nodes 2608

Determine Matching User Cluster Based on
Transaction Data 2610 → New User Link(s)

Process Transaction Data At Identity Graph
2612

Update Node Confidence 2614

Determine No Exact Profile Match 2702

Create User Profile Node 2704

Determine Corresponding User Profile Nodes 2706

Add User Profile Node to Cluster 2708

2700

Name, Card Number

Name,
Card Number,
Store ID

Name,
De-ID Card Number,
Location

Third Party Data
Provider(s) 150

Possible
Matches

Name,
Card Number,
Store ID

Possible
Matches

Customer Interaction
System(s) 104

Identity Graph 120

Matching Model 130

Enterprise Transaction
Data 106

User Identity Platform
110

Enterprise Infrastructure 102

2800

CUSTOMER DATA VERIFICATION IN MANAGEMENT AND DETERMINATION OF USER IDENTITY USING IDENTITY GRAPHS

CROSS-REFERENCE TO RELATED APPLICATIONS

The present application claims priority from Indian Provisional Patent Application No. 202211070303, filed on Dec. 6, 2022, the disclosure of which is hereby incorporated by reference in its entirety.

BACKGROUND

Various enterprise organizations interact with users, such as employees, customers, and other contacts, in multiple contexts. For example, a retail organization may interact with a customer in their capacity as a loyalty program member, or in their capacity as a purchaser of goods or services using a particular payment card or account. Where such customers may use multiple, different payment cards, the same customer may appear as many different potential users. Additionally, Internet-based entities may interact with users who may or may not be known, but which may be associated with particular browsing activity or browsing history.

Enterprise organizations use information associated with the users with whom they interact in a variety of ways. For example, an enterprise may determine a user's interests based on browsing or shopping activity, or account settings in which a given user may identify particular interests. The same enterprise may elect to initiate communication with the user based on known activity of the user. For example, in a retail context, a customer may be prompted to purchase an item based on past interests or past purchases. The customer may also be prompted to browse particular categories of items based on more generalized interests, rather than particular purchases. If referencing a particularized purchase, it is particularly important for the enterprise to accurately identify the user and purchase: otherwise, it is possible that the past purchase may be misattributed to the customer, and the customer may think that a fraudulent purchase was made on their behalf. If referencing a more generalized set of purchasing habits, it may be more advantageous to consider a broader range of browsing and purchasing activity, despite having less than perfect confidence that all of that activity is associated with the same user.

Existing identity management systems address this problem in a number of ways. Typically, various user accounts or user personas may be aggregated or grouped once they are considered, with sufficient organizational confidence, to be associated with the same user or customer. That is, a user having multiple accounts may be considered multiple users from the perspective of an enterprise until sufficient linking information is known to the enterprise (e.g., a user links his or her loyalty account to a particular method of payment, or the like). Once linked, all user accounts are considered to be associated with the same user. This limits the flexibility with which such user accounts may be managed and considered to be the same user or different users in different contexts.

SUMMARY

Embodiments of the present invention are directed to a user identity management platform that manages user identity for an enterprise, such as a retail enterprise, using a graph database maintaining identity graphs. In particular, a specific identity graph structure is provided that allows for flexible management and selection of user account information depending on the context in which that user account information is to be used.

In a first aspect, a method of managing a user identity at an identity management platform associated with an enterprise is disclosed. The method includes receiving an indication of a user profile node within the identity management platform, the user profile node being associated with a user account established with an enterprise. The method further includes, in response to the indication of a user profile node: determining whether the user profile node is associated with an existing user cluster, the user cluster including one or more user profile nodes affiliated with the same user, and, in response to determining that the user profile node is not affiliated with any existing user cluster, creating a new user cluster. Creating the new user cluster includes creating a user cluster node within the identity management platform and assigning a unique identifier to the user cluster node, and establishing a cluster edge connection between the user cluster node and the user profile node.

In a second aspect, an identity management platform implemented on at least one computing system, the identity management platform maintaining an identity graph for each of a plurality of users is disclosed. The identity management platform is implemented on at least one computing system and includes a memory maintaining an identity graph within a database, as well as a processor communicatively connected to the memory and configured to execute instructions stored in the memory. The instructions cause the identity management platform to manage the identity graph by performing, when executed, a process including: receiving an indication of a user profile node within the identity management platform, the user profile node being associated with a user account established with an enterprise; and in response to the indication of a user profile node: determining whether the user profile node is associated with an existing user cluster, the user cluster including one or more user profile nodes affiliated with the same user: in response to determining that the user profile node is not affiliated with any existing user cluster, creating a new user cluster. Creating the new user cluster includes: creating a user cluster node within the identity management platform and assigning a unique identifier to the user cluster node, and establishing a cluster edge connection between the user cluster node and the user profile node.

In a third aspect, an identity management platform implemented on at least one computing system is disclosed. The identity management platform is implemented within a retail enterprise and maintains an identity graph for each of a plurality of customers of the retail enterprise. The identity management platform includes an identity graph maintained within a data storage system including at least one memory, wherein the identity graph includes a plurality of clusters, each cluster being associated with an individual customer and including a customer cluster node and one or more customer profile nodes, each customer profile node being associated with a different customer profile of the customer. The identity management platform further includes a processor communicatively connected to the data storage system and configured to execute instructions stored in the memory. The instructions cause the identity management platform to manage the identity graph by performing, when executed, a process including: receiving an indication of a customer profile node within the identity management platform, the customer profile node being associated with a customer account established with the retail enterprise: in response to the indication of a customer profile node: determining whether the customer profile node is associated with an existing cluster within the plurality of clusters: in response to determining that the customer profile node is not affiliated with any existing cluster within the plurality of clusters, creating a new cluster. Creating the new cluster includes: creating a customer cluster node within the identity management platform and assigning a unique identifier to the customer cluster node; and establishing a cluster edge connection between the customer cluster node and the customer profile node. The process further includes receiving, at the identity management platform, a request for a customer identity, the request having a desired identity confidence, and, in response to the request, determining a cluster from among a plurality of customer clusters managed by the identity management platform corresponding to the customer. The process further includes, based on the desired identity confidence, providing an identification of one or more customer accounts identified by customer profile nodes within the determined cluster that satisfy the desired identity confidence. The customer profile nodes within the determined cluster that satisfy the desired identity confidence corresponds to fewer than all of the customer profile nodes included within the determined cluster.

In a further aspect, a method includes receiving a request, from a requesting entity, for a user identity at an identity management platform associated with an enterprise, the identity management platform maintaining an identity graph of a plurality of users. The method also includes identifying, in response to the request, a user cluster associated with a user identifiable via the request, the user cluster including one or more user profile nodes, each of the user profile nodes being associated with a user account established with the enterprise and having a node confidence associated therewith. The method further includes identifying at least one of the one or more user profile nodes based on whether an overall confidence associated with the one or more user profile nodes included within the user cluster meets a threshold confidence level, the threshold confidence level being based, at least in part, on the request, and the overall confidence being based in part on the node confidence. The method also includes transmitting, to the requesting entity, an identification of the at least one user profile node that meets the threshold confidence level.

In a still further aspect, a customer identity management platform used within a retail enterprise is disclosed. The customer identity management platform includes a computing system comprising a memory and a processor. The memory stores instructions which, when executed by the processor, cause the computing system to: receive a request, from a requesting entity, for a customer identity at an identity management platform associated with an enterprise, the identity management platform maintaining an identity graph of a plurality of customer: identify, in response to the request, a cluster associated with a customer identifiable via the request, the cluster including one or more customer profile nodes, each of the customer profile nodes being associated with a customer account established with the enterprise and having a node confidence associated therewith: identify at least one of the one or more customer profile nodes based on whether an overall confidence associated with the one or more customer profile nodes included within the cluster meets a threshold confidence level, the threshold confidence level being based, at least in part, on the request, and the overall confidence being based in part on the node confidence; and transmit, to the requesting entity, an identification of the at least one customer profile node that meets the threshold confidence level.

In yet a further aspect, a customer identity graph stored in a memory of a computing system implementing a customer identity management platform of a retail enterprise is disclosed. The customer identity graph includes a first customer profile node representative of a first customer account of a customer of the retail enterprise, the first customer profile node having a plurality of customer attributes and being assigned a first node confidence. The customer identity graph further includes a second customer profile node representative of a second customer account of the customer, the second customer profile node having a second plurality of customer attributes and being assigned a second node confidence. The customer identity graph further includes an identity edge linking the first customer profile node and the second customer profile node based on a similarity of one or more attributes of the first customer account and the second customer account, the identity edge being assigned an edge confidence based, at least in part, on the similarity of the first plurality of customer attributes to the second plurality of customer attributes. The first node confidence and the second node confidence are each assigned based, at least in part, on a type or source of customer account represented by the first customer account and the second customer account.

In another aspect, a method includes establishing an identity graph including a plurality of user clusters, each user cluster being associated with a different user and including one or more user profile nodes, each user profile node being associated with a customer account of a user, such that each of the one or more user profile nodes within a cluster correspond to different customer accounts of the user. The method further includes obtaining transaction data associated with an account used in a transaction at a retail enterprise, and, based on the transaction data, determining a plurality of possible identity matches. The method also includes identifying one or more nodes within the identity graph that correspond to one of the plurality of possible identity matches, and, for each of the one or more nodes, providing the transaction data and an identification of the node to a classifier model to obtain a determination of whether the transaction data is associated with the node, the classifier model being trained using training transaction data linked to the customer accounts corresponding to user profile nodes in the identity graph. The method further includes, based on a determination from the classifier model that the transaction data is associated with a node of the one or more nodes, establishing an identity edge between the node and a user profile node corresponding to the account, thereby adding the user profile node corresponding to the account to a cluster that includes the node.

In another aspect, a computer-readable storage medium is disclosed that includes computer-executable instructions which, when executed, cause a computing system to perform actions comprising: establishing an identity graph including a plurality of user clusters, each user cluster being associated with a different user and including one or more user profile nodes, each user profile node being associated with a customer account of a user, such that each of the one or more user profile nodes within a cluster correspond to different customer accounts of the user: obtaining transaction data associated with an account used in a transaction at a retail enterprise: based on the transaction data, determining a plurality of possible identity matches; identifying one or more nodes within the identity graph that correspond to one of the plurality of possible identity matches: for each of the one or more nodes, providing the transaction data and an identification of the node to a classifier model to obtain a determination of whether the transaction data is associated with the node, the classifier model being trained using training transaction data linked to the customer accounts corresponding to user profile nodes in the identity graph; and based on a determination from the classifier model that the transaction data is associated with a node of the one or more nodes, establishing an identity edge between the node and a user profile node corresponding to the account, thereby adding the user profile node corresponding to the account to a cluster that includes the node.

In another aspect, a customer identity management platform used within a retail enterprise is disclosed. The customer identity management platform includes a computing system comprising a memory and a processor. The memory stores instructions which, when executed by the processor, cause the computing system to: establish an identity graph including a plurality of user clusters, each user cluster being associated with a different customer and including one or more user profile nodes, each user profile node being associated with a customer account of a customer, such that each of the one or more user profile nodes within a cluster correspond to different customer accounts of the customer: obtaining transaction data associated with an account used in a transaction at a retail enterprise: based on the transaction data, determine a plurality of possible identity matches: identifying one or more nodes within the identity graph that correspond to one of the plurality of possible identity matches, the plurality of possible identity matches being based at least in part on geographic proximity between a location represented in the transaction data and locations represented in transaction data associated with the one or more nodes: for each of the one or more nodes, provide the transaction data and an identification of the node to a classifier model to obtain a determination of whether the transaction data is associated with the node, the classifier model being trained using training transaction data linked to the customer accounts corresponding to user profile nodes in the identity graph; and based on a determination from the classifier model that the transaction data is associated with a node of the one or more nodes, establish an identity edge between the node and a user profile node corresponding to the account, thereby adding the user profile node corresponding to the account to a cluster that includes the node.

In another aspect, a method of verifying customer data for inclusion in a customer identity graph is provided. The method includes obtaining transaction data associated with a third party payment card used in a transaction at a retail enterprise location, the transaction data including transaction attributes including at least a customer name, an account identifier for the third party payment card, and a location of the retail enterprise at which the transaction occurred, and obtaining a plurality of potential customer contact information data sets in response to submitting at least a portion of the transaction data to a third party service, the plurality of potential customer contact information data sets including customer addresses, emails, and phone numbers. The method includes identifying, within an identity graph maintained by an identity management platform, a plurality of user profile nodes corresponding to the plurality of potential customer addresses, the identity graph including a plurality of user clusters, each user cluster being associated with a different customer and including one or more user profile nodes, each of the one or more user profile nodes being associated with a customer account of a customer. The method further includes determining, based on a comparison of the transaction data to other transaction data associated with the plurality of user profile nodes, a matching user profile node from among the plurality of user profile nodes based on a similarity of the transaction data, and associating the transaction data with the matching user profile node.

In another aspect, a customer identity management platform used within a retail enterprise is provided. The customer identity management platform includes a computing system comprising a memory and a processor. The memory stores instructions which, when executed by the processor, cause the computing system to perform: obtaining transaction data associated with a third party payment card used in a transaction at a retail enterprise location, the transaction data including transaction attributes including at least a customer name and a location of the retail enterprise at which the transaction occurred: obtaining a plurality of potential customer contact information data sets in response to submitting at least a portion of the transaction data to a third party service, the plurality of potential customer contact information data sets including customer addresses, emails, and phone numbers: identifying, within an identity graph maintained by the customer identity management platform, a plurality of user profile nodes corresponding to the plurality of potential customer contact information data sets, the identity graph including a plurality of user clusters, each user cluster being associated with a different customer and including one or more user profile nodes, each of the one or more user profile nodes being associated with a customer account of a customer; determining, based on a comparison of the transaction data to other transaction data associated with the plurality of user profile nodes, a matching user profile node from among the plurality of user profile nodes based on a similarity of the transaction data; and based on determining the matching user profile node, associating the transaction data with the matching user profile node.

In another aspect, a computer-readable storage medium comprising computer-executable instructions is disclosed which, when executed, cause a computing system to perform actions comprising: obtaining transaction data associated with a third party payment card used in a transaction at a retail enterprise location, the transaction data including transaction attributes including at least a customer name, a card identifier, and a location of the retail enterprise at which the transaction occurred: submitting at least a portion of the transaction data to a third party service, the at least a portion of the transaction data including the name, the location of the retail enterprise at which the transaction occurred, and a deidentified representation of the card identifier: receiving, from the third party service, a plurality of potential customer contact information data sets in response to submitting the at least a portion of the transaction data to the third party service, the plurality of potential customer contact information data sets including customer addresses, emails, and phone numbers: identifying, within an identity graph maintained by an identity management platform, a plurality of user profile nodes corresponding to the plurality of potential customer contact information data sets, the identity graph including a plurality of user clusters, each user cluster being associated with a different customer and including one or more user profile nodes, each of the one or more user profile nodes being associated with a customer account of a customer; determining, based on a comparison of the transaction data to other transaction data associated with the plurality of user profile nodes corresponding to the plurality of potential customer addresses, a matching user profile node from among the plurality of user profile nodes based on a similarity of the transaction data: associating the transaction data with the matching user profile node: updating a node confidence of the matching user profile node based at least in part of the similarity of the transaction data: receiving, at the identity management platform, a request for a customer identity, the request having a desired identity confidence: in response to the request, determining a user cluster from among a plurality of user clusters managed by the identity management platform corresponding to the customer identity: based on the desired identity confidence, providing an identification of one or more customer accounts identified by user profile nodes within the determined user cluster that satisfy the desired identity confidence based on a node confidence of the user profile nodes corresponding to the one or more customer accounts.

BRIEF DESCRIPTION OF THE DRAWINGS

The same number represents the same element or same type of element in all drawings.

FIG. 18 is a flowchart of a method of computing linking confidences between pairs of nodes based on node level attribute confidence values and matching scores, in accordance with example embodiments.

FIG. 26 is flowchart of a method of performing an identity verification process using a third party identity verification service in combination with one or more matching processes that may be performed within a user identity platform.

DETAILED DESCRIPTION

Figure 1:
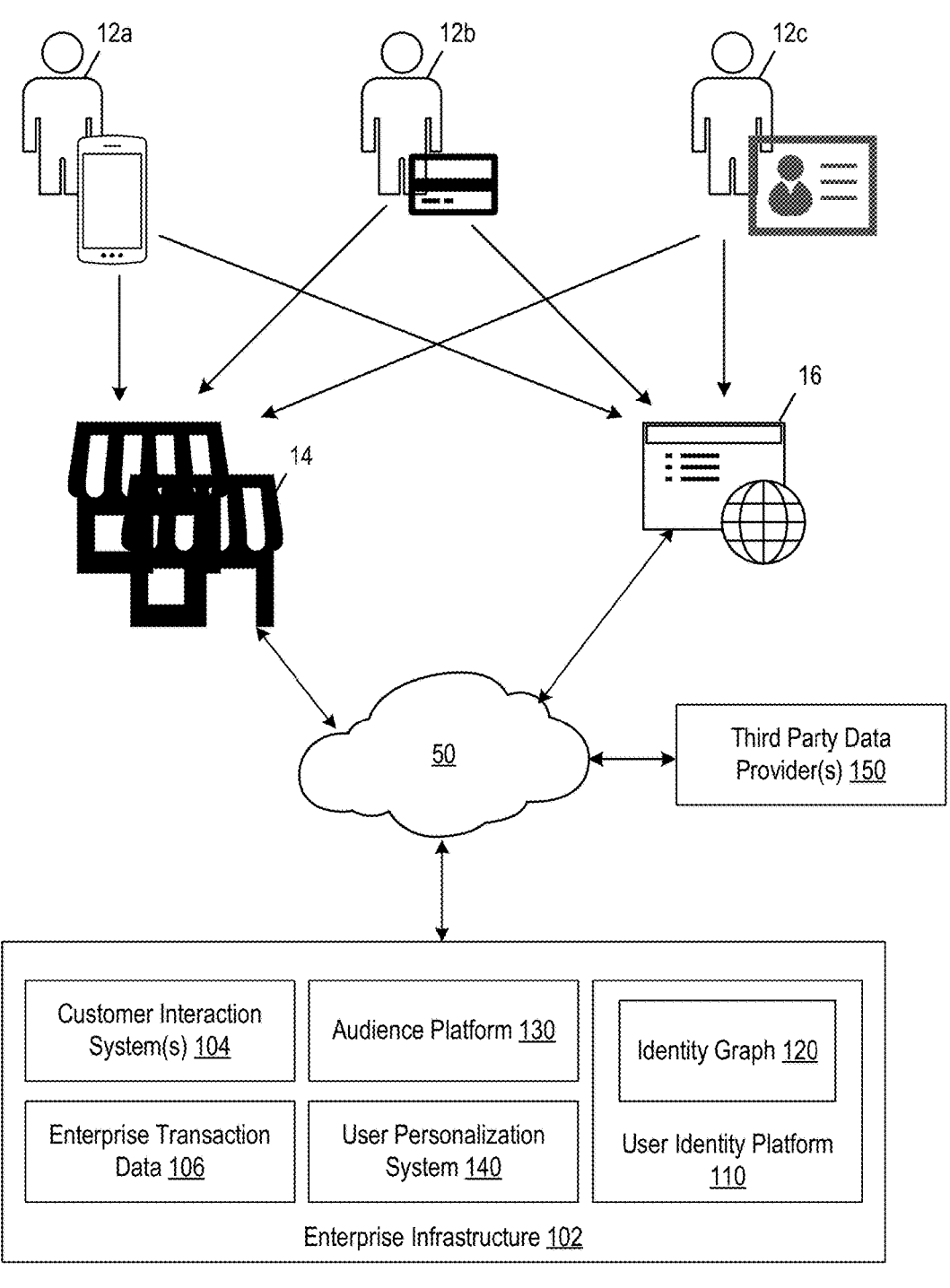
FIG. 1 illustrates an example logical diagram of an environment in which a user identity platform may be implemented, to assist with management and determination of user identity using identity graphs.

As briefly described above, embodiments of the present invention are directed to a user identity management platform that manages user identity for an enterprise, such as a retail enterprise, using a graph database maintaining identity graphs. In particular, a specific identity graph structure is provided that allows for flexible management and selection of user account information depending on the context in which that user account information is to be used. Additionally, methods of migration of user account information for association with different user clusters are provided.

Accordingly, a particular user account, such as may be tied to a payment method, a loyalty account, or other types of identifiable account, may be associated with a specific user profile that uniquely identifies a particular user. However, information with that account may be selectively attributable to the user depending on the confidence that a particular account is associated with that unique user. This may be due to, e.g., confidence in the source information (e.g., from a payment card company or third party payment information provider), confidence in the similarity between two accounts (e.g., due to use of similar name and/or contact information), confidence that the same user is in fact using the same account (rather than a family member or other user utilizing the account), or other sources of uncertainty. Although the term "account" is used in the present application, it is recognized that an account may take a variety of forms, and in essence corresponds to a particular user "persona", e.g., the way in which a user presents himself or herself to an organization. Such a persona may be based on a selected payment card or membership in a loyalty program, but may also correspond to a particular online or in-store/in-person presence or identification during an interaction with the organization.

In example implementations, particular graph structures are used in which clusters of nodes are arranged such that each individual user account is associated with a node, and edges are formed between and among nodes that define relationships among those accounts. Relationships may include identity edges which indicate that two accounts are associated with the same user, or may indicate other types of relationships, such as familial relationships. Additionally, various methods for calculating, and managing, confidence that two such nodes are interrelated in a particular way are described. As further described below, a determination of a confidence level between two nodes may be deterministic, or may be probabilistic based on attribute similarities. Aggregation, weighting, and normalization of such confidence levels may be used. Probabilistic similarity may be used to supplement deterministic rules that initially establish edges between nodes. The probabilistic similarity may, in various embodiments, allow for establishment of additional edges between nodes where deterministic rules may not strongly detect relationships, or may enhance a confidence that two nodes are in fact interrelated.

An identity management platform implemented in accordance with the present disclosure provides significant advantages in terms of flexibility, accuracy, and computational efficiency. Specifically, the use of identity graphs that maintain a specific structure that allows for efficient traversal of the identity graph reduces the number of calculations that are required to be performed to identify responsive nodes within such a graph, and therefore improves the speed of responsiveness of the platform in response to user identity requests. Additionally, the use of such a flexible structure allows multiple client services having different priorities to concurrently request user identity information and obtain a most appropriate, accurate response (e.g., most accurate/ confident, or most inclusive, or somewhere therebetween) depending on the requesting entity or request.

In accordance with this general description, a user identity platform is described below, as well as example identity graph structures that may be used by such a platform. A method of calculating and maintaining various types of "confidence" measures representing a likelihood of accuracy or association, is provided, as are various deterministic and probabilistic matching processes to improve those confidence measures.

I. Overall Computing Environment for User Identity Platform

Referring first to FIGS. 1-5, details regarding a general environment in which a user identity platform may be implemented are provided, according to example embodiments. In general, the present examples are discussed in the context of a retail enterprise; however, it is understood the user identity platform, and identity graph managed therewith, are not so limited in application. Rather, a user identity platform may be utilized in any analogous scenario in which users may interact with an entity, but may take on a plurality of different personas or may interact with that entity in different contexts without explicit prior user identification.

In the example environment 10 of FIG. 1, a plurality of users, shown as customers 12*a-c* (collectively referred to as customers 12), may interact with an enterprise in a variety of ways. In the example shown, the customers 12 interact with a retail enterprise 100 having a plurality of retail locations, such as stores 14, as well as an online presence, shown as retail website 16.

In the example shown, each of the customers 12 may interact with the stores 14 or retail website 16 in different ways. For example, customer 12*a* may interact with the stores 14 or retail website 16 using a mobile payment application. Customer 12*b* may interact with the stores 14 or retail website 16 using a credit card. The credit card may be a card known to the retail enterprise (a store branded card), or may be a payment card such as a credit card or debit card issued by a third-party institution, such as a bank, credit union, or the like. Customer 12*c* may interact with the stores 14 or retail website 16 using a customer profile or account, which may correspond to a loyalty program.

It is recognized that, depending upon the manner of interaction with the retail enterprise 100, the retail enterprise may be more or less able to uniquely identify the customer. For example, a customer using a mobile application for payment, such as customer 12*a*, may be known to the retail enterprise with very high confidence if the mobile application used for payment is tied to the customer via a unique identifier. However, if the mobile application is a third-party mobile application used for payment, the confidence held by the retail enterprise that they are able to uniquely identify the customer 12*a* may be lower. Similarly, customer 12*b* might use a third-party issued credit card, in which case the retail enterprise may have moderate confidence in its ability to uniquely identify the customer, or may be a store branded credit card issued by the retail enterprise 100, in which case the retail enterprise would have greater confidence that it is able to uniquely identify the customer. Similarly, because the loyalty program is associated with the retail enterprise, the customer 12*c* will, once they use the specific loyalty program information, be known to the retail enterprise.

In the example shown, the stores 14 and retail website 16 exposed to the customers 12 by the retail enterprise 100 are communicatively coupled to enterprise infrastructure 102. The enterprise infrastructure 102 corresponds to various computing systems that are used by the retail enterprise 100 for managing customer interactions. In the example shown, the enterprise infrastructure 102 includes one or more customer interaction systems 104, which may operate to interact with the customers 12 based on, among other factors, historical interactions with those customers reflected in enterprise transaction data 106.

Typically, the enterprise transaction data 106 may correspond to browsing data and shopping data associated with a particular customer, as specifically identified as tied to a computing device used for browsing or as tied to a payment account or loyalty account used in association with the purchase. The enterprise transaction data may include information identifying an individual or location of purchase, method of payment, and the like, or may further include details regarding items purchased, times of purchase, and other detailed transaction characteristics. Since a single customer may interact with the retail enterprise 100 using any of a mobile application for mobile payment, a credit card or multiple credit cards, or a loyalty account, the enterprise transaction data 106 associated with a single unique customer may be associated with only one of those account types. As such, a view of a particular customers preferences might be limited to the preferences associated with a single account type, or may be incorrectly associated with multiple account types, if accounts are incorrectly linked together.

In accordance with the present disclosure, a user identity platform 110 hosts an identity graph 120 within the enterprise infrastructure 102. The user identity platform 110 manages the identity graph 120, and responds to requests for information about particular user identities, such that the user identities may then be assessed in conjunction with enterprise transaction data 106 to determine, for example, user interaction histories, user preferences, and the like. Details regarding the identity graph 120, and methods of managing such an identity graph using a user identity platform 110, are described in further detail below.

In the example shown, the retail enterprise 100 may also be communicatively connected to one or more third-party data providers 150. The third-party data providers 150 may correspond to credit bureaus, public user identity services, and the like, which may provide data to enterprises regarding specific transactions occurring at those enterprises. For example, as described below, a third-party data provider 150 may provide contact information (e.g. a phone number or email address) in response to receiving transaction information (e.g., a name and credit card number, and optionally other transaction information) associated with a third-party credit card number that is received by the enterprise, for example at the point-of-sale. In some aspects, the third-party data provider 150 may provide information regarding a unique user associated with a credit card number. If multiple potential pieces of user information may match a particular credit card number, in some instances, no information might be returned to the retail enterprise. Alternatives to this approach are described below.

In example aspects, the enterprise infrastructure 102 may include one or more additional services, systems, and/or platforms useable to query user data. In the example shown, an audience platform 130 and a user personalization system 140 are illustrated. In some examples, audience platform 130 may receive requests from third party services to identify specific user groups by attribute. For example, a request may be received to identify a set of users who purchased items of a particular type within a predetermined period, or which have specific characteristics (e.g., geographic location, purchasing history, etc.), and a set of user identifiers may be obtained by the audience platform 130 from the enterprise transaction data 106. Such user identifiers may be provided to the user identity platform 110 for resolution of underlying or related user profiles to ensure an overall user profile is obtained for each user meeting the audience criteria identified by the audience platform 130. Similarly, a user personalization system 140 may receive a request for specific information about a particular user (e.g., inferred affinities, contact preferences, and recommended actions to take as to that user). Such a user personalization system 140 may access the user identity platform 110 to obtain information regarding related user profiles that may provide a greater context of user preferences beyond those associated with a particular identifying mechanism (e.g., name and address, payment card, or the like). Other types of services may be used by a given enterprise as well, which may make use of services provided by such a user identity platform 110.

Referring to FIG. 1 generally, it is noted that enterprise transaction data 106 may be organized into one or more certified datasets, and may be secured, and accessible/retrievable via an API-based interface. Notably, in some examples, while enterprise transaction data 106 may include some personal information, the identification of specific user identity details exposed to the user identity platform 110, audience platform 130, and/or user personalization system 140 may be de-identified, such that name, phone number, email address, and/or physical address may be maintained securely by the enterprise. Various identifiers, such as a hash or representative value for name and/or contact information (referred to as contact mechanism identifiers) may be returned and used by user identity platform 110, audience platform 130, and/or user personalization system 140. As such, although names and contact information are illustrated in the present disclosure for simplicity, references to name and contact information are synonymous with references to depersonalized identifiers for that information: it is recognized that actual personally identifiable information is instead secured.

Figure 2:
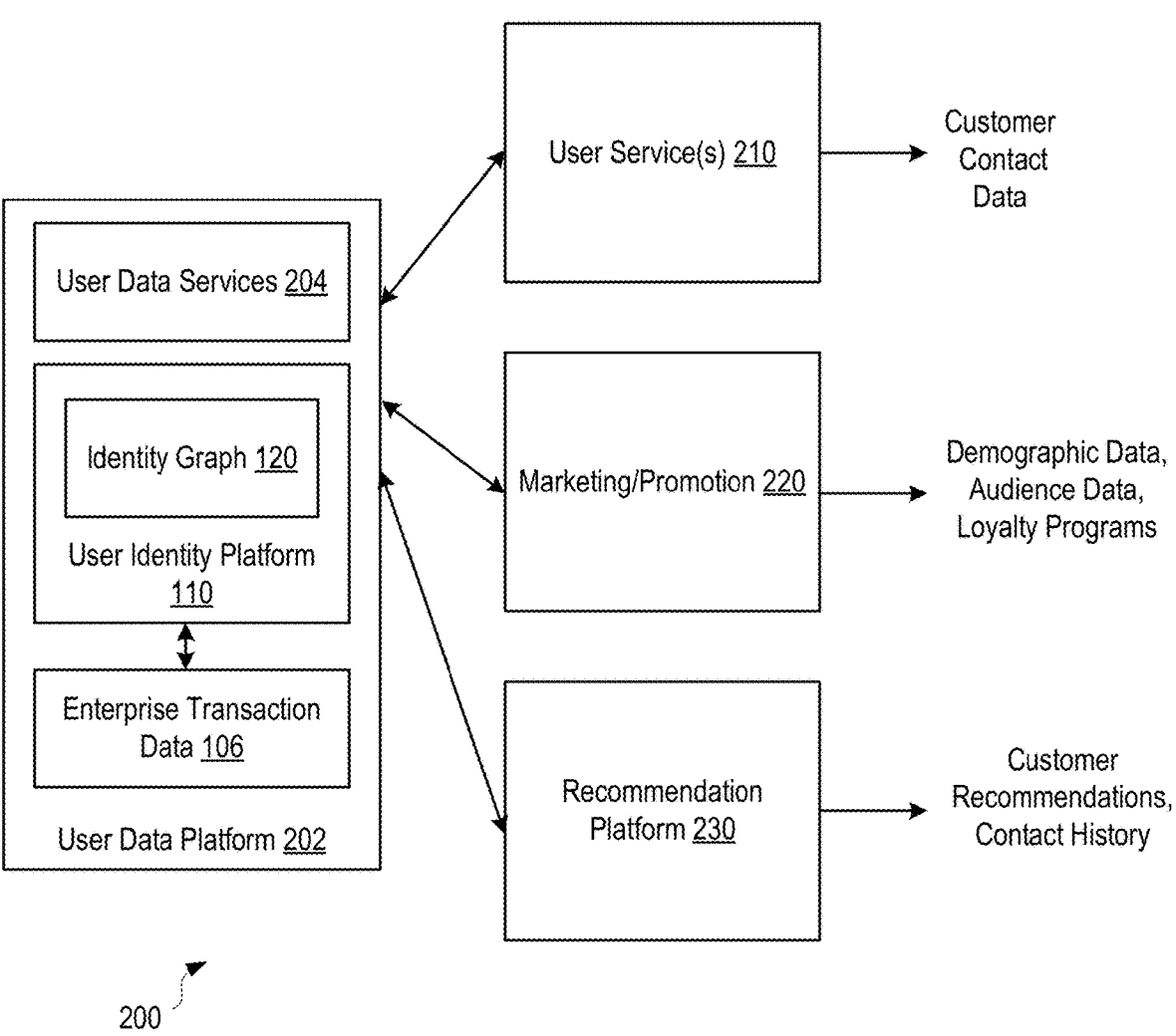
FIG. 2 illustrates an example logical flow diagram illustrating example uses of user identity derived from an identity graph, in accordance with an example embodiment.

Referring now to FIG. 2, an example logical flow diagram 200 is provided, illustrating example uses of user identity derived from an identity graph. In particular, the identity graph 120 may be generated, at least in part, by a user identity platform 110 based on received enterprise transaction data 106. In the example shown, the user identity platform 110 may be used within a user data platform 202, and may operate in conjunction with various customer data services 204 responsive to other enterprise services, such as user services 210, marketing and promotion services 220, or a recommendation platform 230. Other types of services may be able to address the user identity platform 110 as well.

In the example shown, the customer data platform 202 may be operable within the enterprise infrastructure 102 of FIG. 1, and user data services 204 may include a variety of services and/or platforms such as the audience platform 130 and/or the user personalization system 140 described previously. Generally speaking, external services may transmit requests to specific portions of the user data platform 202, and in some instances directly to the user identity platform 110, to obtain representative user information in the context of a customer data storage.

The user services 210 may correspond to services that maintain unique information about a particular user, such as available payment identifiers, user addresses, and the like. Generally speaking, the user services 210 will require a high degree of certainty that a particular account is associated with a user, for example to ensure that correct user profile details are accessed from remote systems for display in the event that user logs in to a management portal maintained by the enterprise.

The marketing and promotion services 220 may provide a variety of types of customer contacts for the enterprise. For example, in some instances, specific targeted ads may be delivered to a customer, for example by email, mobile application notification or the like. To the extent any such recommendations are highly personalized (e.g. based on prior purchases), the greater the need for accurate determination that specific purchases are associated with a particular user. Accordingly, an overall user account having an email address (e.g., jdoe@gmail.com) may be tied to multiple types of transactions associated with multiple different payment methods. Some of those payment methods may be directly tied to that email address, while others are only inferentially tied, for example through a common name on the third-party credit card used for that purchase. However, other types of directed marketing or promotional communications may be directed to generalized types of items the customer may be interested in therefore may not require as much certainty as to the customer identity. Requests from marketing and promotion services 220 may be routed to a particular user data service from among the user data services 204 for example an audience platform 130, for identification of a relevant audience. Such an audience platform 130 may subsequently use information from user identity platform 110 to assist with resolution on a fuller view of a user identity known by the enterprise.

The recommendation platform 230) may access specific user identity information to generate purchasing recommendations for example based on past customer purchases or past browsing activity. To the extent such recommendations are not based directly on past purchases (recommending repurchase of a particular item) it is generally less critical that an individual customer identity be correct, and in fact may be more useful to be over inclusive of potential inter-activity information of that customer, even if some of that information is not technically accurately ascribed to the particular customer. However, in other instances, where a contact history is important and directly used in generating recommendations, it may be more important to accurately attribute activity to a user. Such a recommendation platform 230 may access, e.g., user personalization system 140, which similarly obtains user identity information using the user identity platform 110.

Accordingly, overall, there are a variety of enterprise applications that may need to flexibly identify a user, either accurately or broadly, or some combination thereof, depending on the specific application of that user information. By identifying a user more broadly, a wider range of enterprise transaction data 106 may be ascribed to the user, at the potential compromise of some level of accuracy. Typically, because identity graphs use fixed account associations, once an account is linked to a particular unique user, it may be difficult to later decide that the account should or should not be included within the definition of the user for later arising user interactions or behavior analysis. However, in accordance with example embodiments, the identity graphs described herein maintain many degrees of relatedness among user accounts, such that particular accounts, and associated account activity, may be selectively incorporated into a definition of user activity depending on the specific accuracy or inclusiveness required by a given request for user identity.

Figure 3:
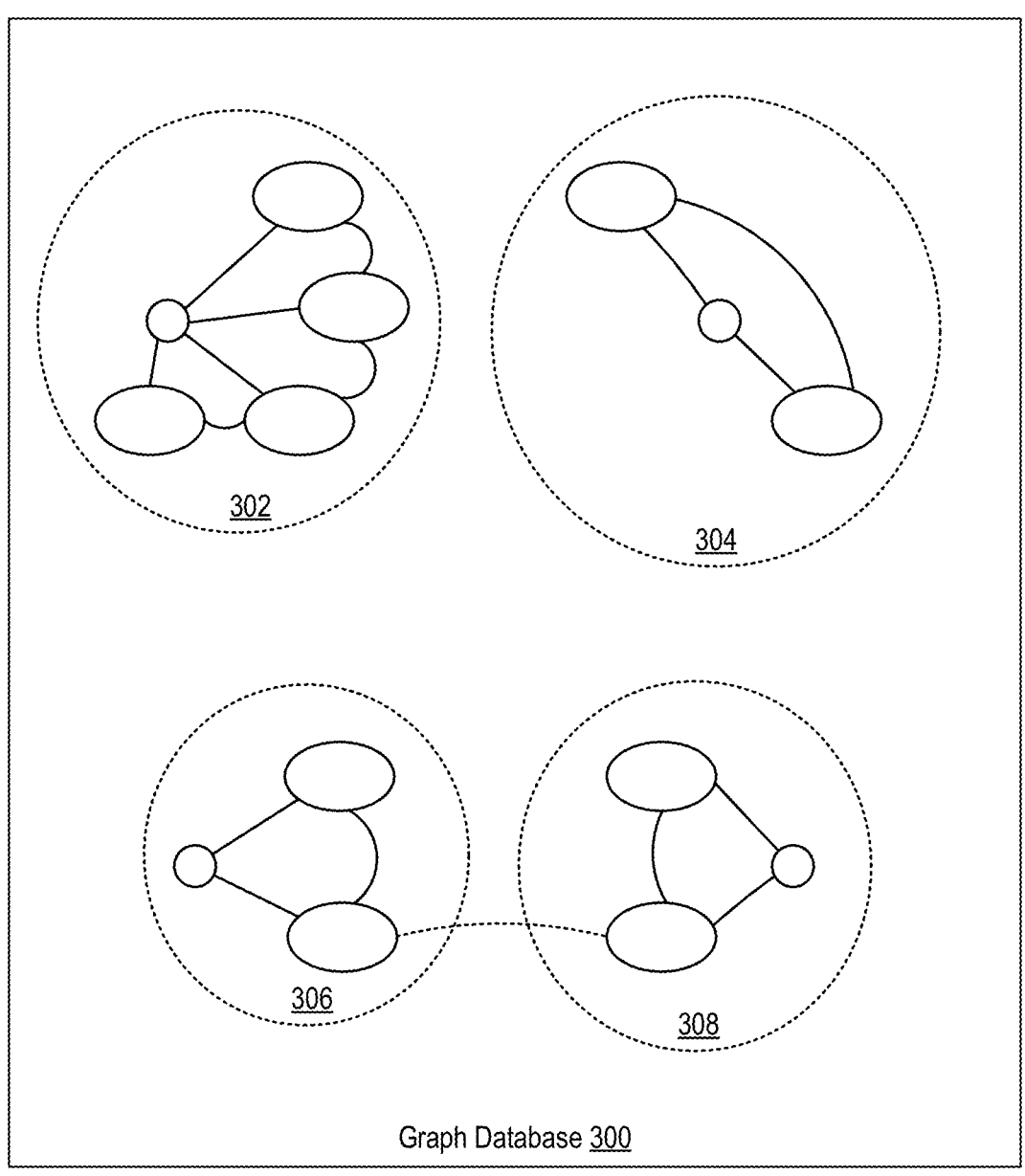
FIG. 3 illustrates an example graph database including an identity graph illustrating a plurality of users, such as customers, grouped into user clusters in an example embodiment.

FIG. 3 illustrates an example graph database 300 including an identity graph illustrating a plurality of users, such as customers, grouped into user clusters in an example embodiment. The graph database 300 includes an example identity graph including a plurality of user clusters 302, 304, 306, 308. In the example shown, each user cluster corresponds to a distinct, unique user. Although four user clusters are shown in graph database 300, it is generally understood that the graph database will store, within an identity graph, a large number of unique user identities (and therefore user clusters), typically hundreds of thousands or millions of such identities.

In the example shown, each user cluster 302, 304, 306, 308 includes a user cluster node and one or more user profile nodes. In the context of a retail enterprise tracking customer accounts, the user cluster node may be considered a customer cluster node, and the user profile node may be considered a customer profile node. The user cluster node defines a linking point for one or more user profile nodes, and uniquely identifies the user. For example, the user cluster node may be assigned a unique identifier representing a discrete user. Each user profile node may, in contrast, represent a different account used by the same user to interact with the enterprise. Accordingly, each user cluster will have a single associated user cluster node, while the same user cluster may have one or more user profile nodes.

As discussed in further detail below, links, or edges, between the user cluster nodes and the user profile nodes within each cluster are established based on similarity among the user profile nodes. In examples, common attributes may be used to link user profile nodes, which would in turn define the user profile nodes as being associated with a common user cluster node.

In some examples, different types of edges may be managed within the identity graph. In the example shown, user clusters 306, 308 share an edge between two user profile nodes. This edge may be an edge indicating a shared account or shared payment method, such as a shared credit card (as may be used by two different users or customers within the same family). In such an instance, the card information may be identified as similar, but the usernames and/or other identifying information may differ in a way that makes clear that the users are different, but share the common account attribute. In such an instances, a different type of edge may be established (e.g., a "relationship" edge, rather than a "linking" edge). Thereafter, requests for information about a household may use such relationship edges to identify responsive linked clusters, where each cluster represents a different individual within that modeled "household". Such household information may be used by other systems, such as product recommendation systems, to obtain, e.g., recommended items that may be needed by a family, gift ideas, and the like.

Figure 4:
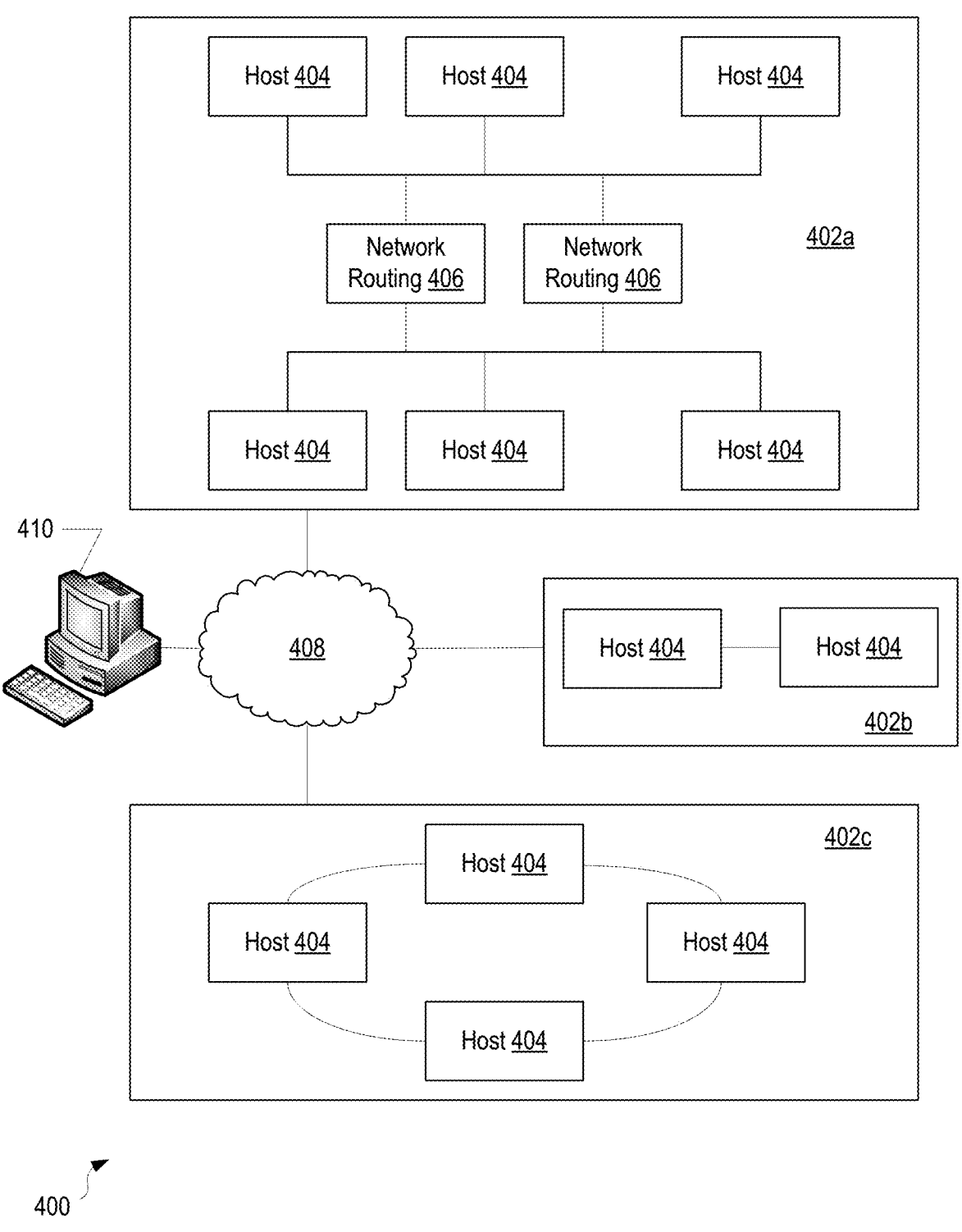
FIG. 4 illustrates an example distributed computing platform utilizing a plurality of computing nodes, the computing platform being usable to implement the user identity platform of the present disclosure.
Figure 5:
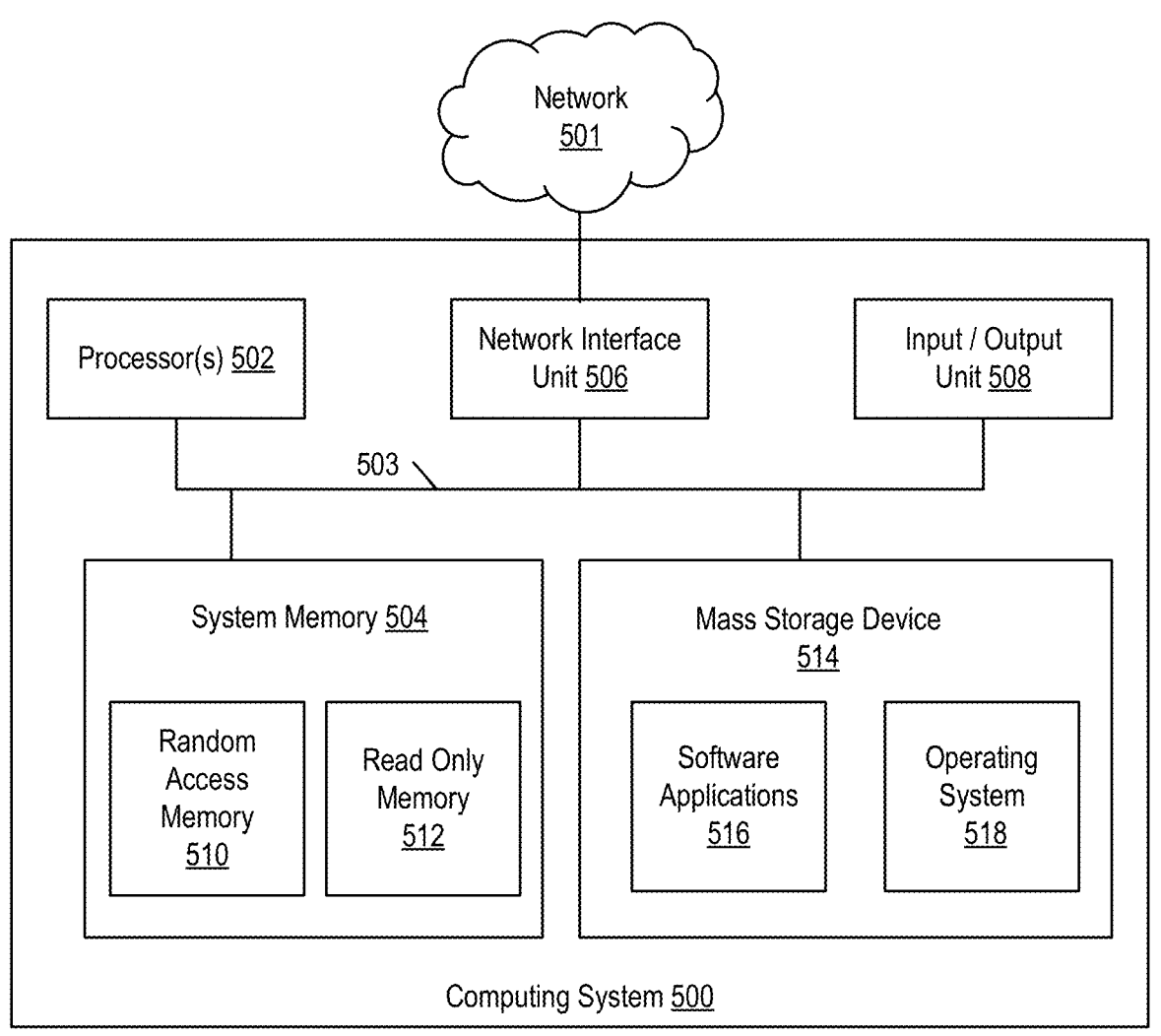
FIG. 5 illustrates an example computing device with which aspects of the present disclosure may be implemented.

Referring now to FIGS. 4-5, example hardware environments are disclosed in which aspects of the present disclosure may be implemented. The hardware environments disclosed may, for example, represent particular computing systems or computing environments useable within the overall context of the environment described above in conjunction with FIG. 1.

As seen in FIG. 4, a distributed multi-host system 400 represents a possible arrangement of computing systems or virtual computing systems useable to implement the environment 100 of FIG. 1. In the embodiment shown, the system 400 is distributed across one or more locations 402, shown as locations 402a-c. These can correspond to locations remote from each other, such as a data center owned or controlled by an enterprise, a third-party managed computing cluster used in a "cloud" computing arrangement, or other local or remote computing resources residing within a trusted grouping. In the embodiment shown, the locations 402a-c each include one or more host systems 404, or nodes. The host systems 404 represent host computing systems, and can take any of a number of forms. For example, the host systems 404 can be server computing systems having one or more processing cores and memory subsystems and are useable for large-scale computing tasks. In one example embodiment, a host system 404 can be as illustrated in FIG. 5.

As illustrated in FIG. 4, a location 402 within the system 400 can be organized in a variety of ways. In the embodiment shown, a first location 402a includes network routing equipment 406, which routes communication traffic among the various hosts 404, for example in a switched network configuration. Second location 402*b* illustrates a peer-to-peer arrangement of host systems. Third location 402*c* illustrates a ring arrangement in which messages and/or data can be passed among the host computing systems themselves, which provide the routing of messages. Other types of networked arrangements could be used as well.

In various embodiments, at each location 402, the host systems 404 are interconnected by a high-speed, high-bandwidth interconnect, thereby minimizing latency due to data transfers between host systems. In an example embodiment, the interconnect can be provided by an IP-based network: in alternative embodiments, other types of interconnect technologies, such as an Infiniband switched fabric communications link, Fibre Channel, PCI Express, Serial ATA, or other interconnect could be used as well.

Among the locations 402*a-c*, a variety of communication technologies can also be used to provide communicative connections of host systems 404 at different locations. For example, a packet-switched networking arrangement, such as via the Internet 408, could be used. Preferably, the interconnections among locations 402*a-c* are provided on a high-bandwidth connection, such as a fiber optic communication connection.

In the embodiment shown, the various host systems 404 at locations 402*a-c* can be accessed by a client computing system 410. The client computing system can be any of a variety of desktop or mobile computing systems, such as a desktop, laptop, tablet, smartphone, or other type of user computing system. In alternative embodiments, the client computing system 410 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 404 within the overall system 400 can be used: for example, different host systems 404 may have different numbers or types of processing cores, and different capacity and type of memory and/or caching subsystems could be implemented in different ones of the host system 404. Furthermore, one or more different types of communicative interconnect technologies might be used in the different locations 402*a-c*, or within a particular location.

Referring now to FIG. 5, a schematic illustration of an example discrete computing system in which aspects of the present disclosure can be implemented. The computing device 500 can represent, for example, a native computing system operable to implement the retail enterprise infrastructure 102, including the identity platform 110, third party services 150, or user devices as illustrated in FIG. 1, or any other enterprise services or systems described in FIGS. 1-2. In particular, the computing device 500 represents the physical construct of an example computing system at which an endpoint or server could be established. In some embodiments, the computing device 500 implements virtualized or hosted systems.

FIG. 5 is a block diagram of an example computing system 500 with which aspects of the present disclosure may be implemented. The example computing system 500 may be used alone or in combination with other similar devices to implement any of the systems described herein. In the embodiment shown, the computing system 500 includes at least one central processing unit ("CPU") 502, a system memory 504, and a system bus 503 that couples the system memory 504 to the CPU 502. The system memory 504 includes a random access memory ("RAM") 510 and a read-only memory ("ROM") 512. A basic input/output system that contains the basic routines that help to transfer information between elements within the computing system 500, such as during startup, is stored in the ROM 512. The computing system 500 further includes a mass storage device 514. The mass storage device 514 is able to store software instructions and data.

The mass storage device 514 is connected to the CPU 502 through a mass storage controller (not shown) connected to the system bus 503. The mass storage device 514 and its associated computer-readable storage media provide non-volatile, non-transitory data storage for the computing system 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 502 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 500.

According to various embodiments of the invention, the computing system 500 may operate in a networked environment using logical connections to remote network devices through a network 501, such as a wireless network, the Internet, or another type of network. The computing system 500 may connect to the network 501 through a network interface unit 506 connected to the system bus 503. It should be appreciated that the network interface unit 506 may also be utilized to connect to other types of networks and remote computing systems. The computing system 500 also includes an input/output controller 508 for receiving and processing input from a number of other devices, including a touch user interface display screen, or another type of input device. Similarly, the input/output controller 508 may provide output to a touch user interface display screen or other type of output device.

As mentioned briefly above, the mass storage device 514 and the RAM 510 of the computing system 500 can store software instructions and data. The software instructions include an operating system 518 suitable for controlling the operation of the computing system 500. The mass storage device 514 and/or the RAM 510 also store software instructions 516, that when executed by the CPU 502, cause the computing system 500 to provide the functionality discussed in this document. For example, the mass storage device 514 and/or the RAM 510) can store software instructions that, when executed by the CPU 502, cause the computing system 500 to provide a user identity management platform as described herein.

Figure 6:
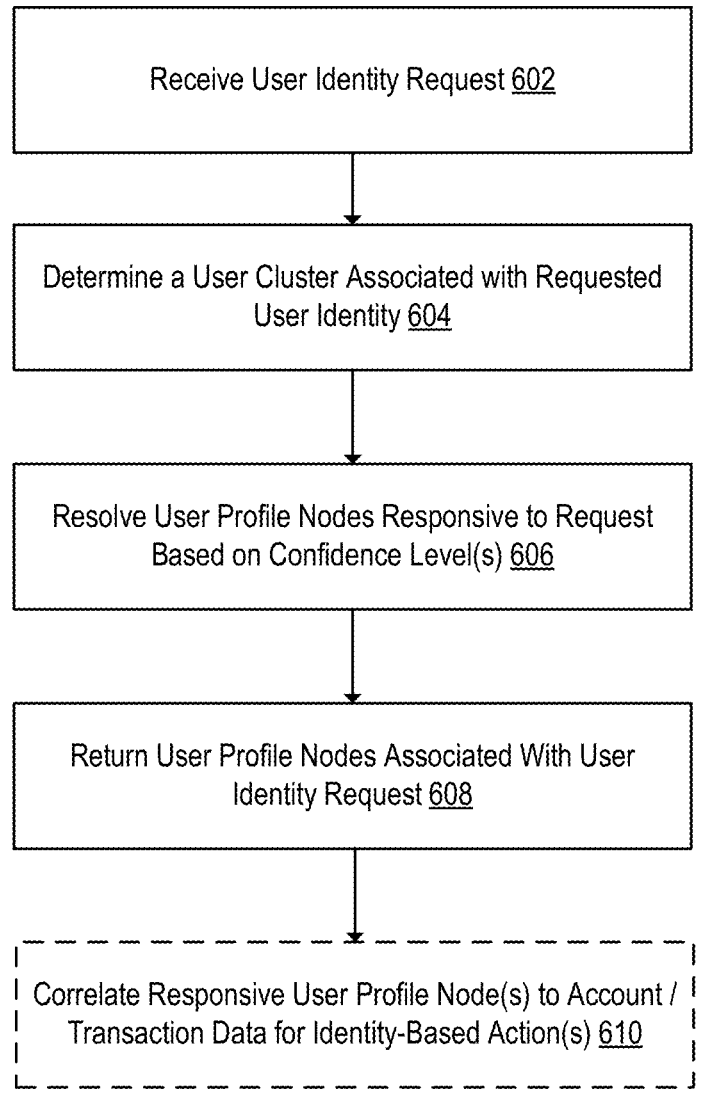
FIG. 6 is a flowchart of an example method of obtaining user identity information utilizing a user identity platform in accordance with the present disclosure.

FIG. 6 is a flowchart of an example method 600 of obtaining user identity information utilizing a user identity platform in accordance with the present disclosure. The example method 600 may be implemented within the environment described herein, for example within a retail enterprise. In particular, aspects of method 600 may be performed using a user data platform, such as platform 202 of FIG. 2, above, in conjunction with user identity platform 110 as described herein.

In the example shown, the method 600 includes receiving a user identity request, at step 602. Receiving an identity request may correspond with, for example, a request from one or more other enterprise subsystems, such as the user services 210, marketing and promotion services 220, or recommendation platform 230 of FIG. 2. The request can include, for example, a specific user identifier that may be associated with a user uniquely, or may be associated with a particular user account, such as a credit card number or the like. Additionally, the request could include one or more preferred attributes of a user rather than uniquely identifying a user, for example to identify all users who have used a customer loyalty card for payment within the last six months, those users who have shopped both in-store and online, or other types of arrangements. The request may alternatively include a particular audience segment, e.g., a collection of known accounts that meet a particular set of request criteria, but for which a more complete understanding of the underlying user profile is desired. Additionally, in some examples, the request may include an identification of prioritization between accuracy and inclusiveness of user information. This may take the form of an explicit confidence level (details provided below), or may be based, at least in part, on the enterprise entity or service issuing the request. For example, a user services requests may require greater confidence at the risk of lower inclusiveness, while a marketing request may accept lower accuracy to obtain greater inclusiveness of user records.

In a specific example within the context of a retail enterprise, it may be the case that a particular group within the retail enterprise, such as a digital marketing group, wishes to create and execute an email marketing campaign to match a specific audience with offers. Such a group may wish to find all customers who have purchased or browsed for specific items in the last six months but do not have a loyalty card. Another example of a request might be finding specific customers who are verified as teachers but are not within a loyalty program, or those who have established a wedding registry within a predetermined amount of time prior to the request.

In response to the request, the method 600 includes determining a user cluster that is associated with a requested user identity, at step 604. Determining the user cluster associated with the requested identity may be performed in a variety of ways, depending on the specific format of the request. In some instances, the request may identify the specific user cluster that is desired, for example by using a unique user identifier that is tied to a user cluster node that is linked, in turn, to user profile nodes. Alternatively, the request may identify a specific user cluster by identifying an attribute approximately unique to the user, for example a known unique or semi-unique identifier of the user. In such instances, the user profile node may be queried and identified, and the cluster may be identified as the cluster in which the user account code is a member.

In further examples, a particular attribute of a user profile node may be identified in a request for one or more user identities received at a user data platform. The attribute may be an attribute shared among a collection of users or of a single user. For example, the attribute may be a user within a particular ZIP Code, having a particular known demographic, or known set of preferences. A known set of preferences may be preferences the user enters within a user account, or may be preferences derived from user interactions with the retail enterprise, for example browsing or purchase activity. Such actions taken by the user may be, for example, based on specific historical activity of the user. In such cases, one or more than one user profile may be identifiable as having the particular attribute. The information sought may be accessible within enterprise transaction data 106, and identified using one or more user data services 204. In such instances, the enterprise transaction data 106 may be queried, and profile identifying information (e.g. account numbers and the like) may be used to identify the specific user profile nodes to which the attribute may be associated. The user identity platform may then be used in association with each identified user profile to obtain further information about user identity associated with that profile.

In the example shown, the method 600 further includes resolving which user profile nodes within a given cluster are responsive to the received requests, at step 606. A determination of which user profile nodes within a given cluster are responsive to the received requests may be performed based on which user profile nodes are associated with a particular attribute sought, or which may be sufficiently related to those profile nodes, or related to the user cluster node, more generally. For example, a particular user profile node may be responsive to a query based on it having a high level of similarity and a high data source confidence, thereby resulting in a high level of confidence in the profile information. A different user profile node may be considered nonresponsive to the query based on it having a lower level of similarity and/or a lower source confidence, thereby resulting in a lower overall confidence in the profile information.

In examples provided herein, different types of confidence scoring for various nodes managed within a user identity platform 110 are provided. In some examples, a "node" confidence, or "source" confidence, may be related to a confidence in accuracy of source data. In some further examples, an "identity edge" confidence, or "linking" confidence, may represent a calculated extent of similarity between two user profile nodes. Still further, a cluster edge confidence may define a calculated confidence that a particular node should be a member of a given cluster of nodes, and represents an edge between a cluster node and a user profile node. Such a cluster edge confidence may be based, for example, on the source confidence of a user profile node to be incorporated into the cluster, as well as one or more identity edge confidence values representing relationships between the user profile node and other user profile nodes within the cluster. Details regarding calculation and assessment of both identity edge confidence values and cluster edge confidence values are provided below.

In the example shown, the method 600 also includes returning user profile nodes associated with the user identity request, at step 608. The user profile nodes correspond to the collected nodes meeting a threshold confidence level (e.g., a cluster edge confidence meeting the threshold confidence level). Again, the threshold confidence level may be based on the nature of the request received, or may be based on a specific designated confidence received as part of the request. Additionally, the cluster edge confidence for each user profile node relative to a user cluster node may be either calculated at the time a query is received, or preferably pre-calculated, as is the identity edge confidence among various user profile nodes.

In some example embodiments, the method 600 further includes correlating responsive user profile nodes to specific account or transaction data (step 610). In some embodiments, the correlation of user profile nodes to account or transaction data is performed within a user data platform 202, for example by the identity management platform 110. In alternative embodiments, the correlation of user profile nodes to account or transactional data may be performed by other enterprise infrastructure in response to receipt of identification of particular user profile nodes by the user data platform 202, and in particular the identity management platform 110. For example, a requesting entity may receive an identification of user profile nodes informed by the identity management platform 110, and may subsequently query underlying enterprise transaction data 106 to obtain behavioral or interactivity data associated with the particular user profiles of interest.

Continuing the retail enterprise examples from above, a desired return from a user data platform may include a list of one or more customer identifiers associated with identified user clusters. In some examples, a user data platform could also provide some amount of customer information, such as a top five purchasing categories, a behavior segment, particular contact information, in the case of a digital marketing campaign, and the like. This information could also be obtained from other systems within an enterprise environment. Furthermore, such information may be enhanced through use of the identity management platform 110 to determine the set of user profiles that are to be appropriately associated with each customer. This has the advantage of broadening the set of user profiles accounted for in response to an initially narrower set of user profiles responsive to a task, but which may otherwise miss some consumer profile information. Furthermore, by providing specific customer identifiers in response, a requesting entity within the enterprise may then be able to submit targeted information requests to other data sources, such as historical sales data, account information, online interactivity information (e.g. browsing activity) for a particular individual or set of individuals, which is more efficient than searching each of these databases separately and reconciling the customer identifiers from each.

In some example embodiments, the method 600 may be performed using a specific identity graph structure and confidence level calculation methodology. Details regarding one example identity graph structure, and method of management thereof, are provided below in conjunction with FIGS. 7-16. An example confidence level calculation methodology is described in conjunction with FIGS. 17-19. Alternative identity graph structures are provided in FIGS. 20-23. Furthermore, additional methods for improving overall confidence among nodes within the identity graph, and alternative methods of forming edges among user profile nodes in identity graphs, are described thereafter in conjunction with FIGS. 24-29.

II. Management of Identity Graphs

Figure 7:
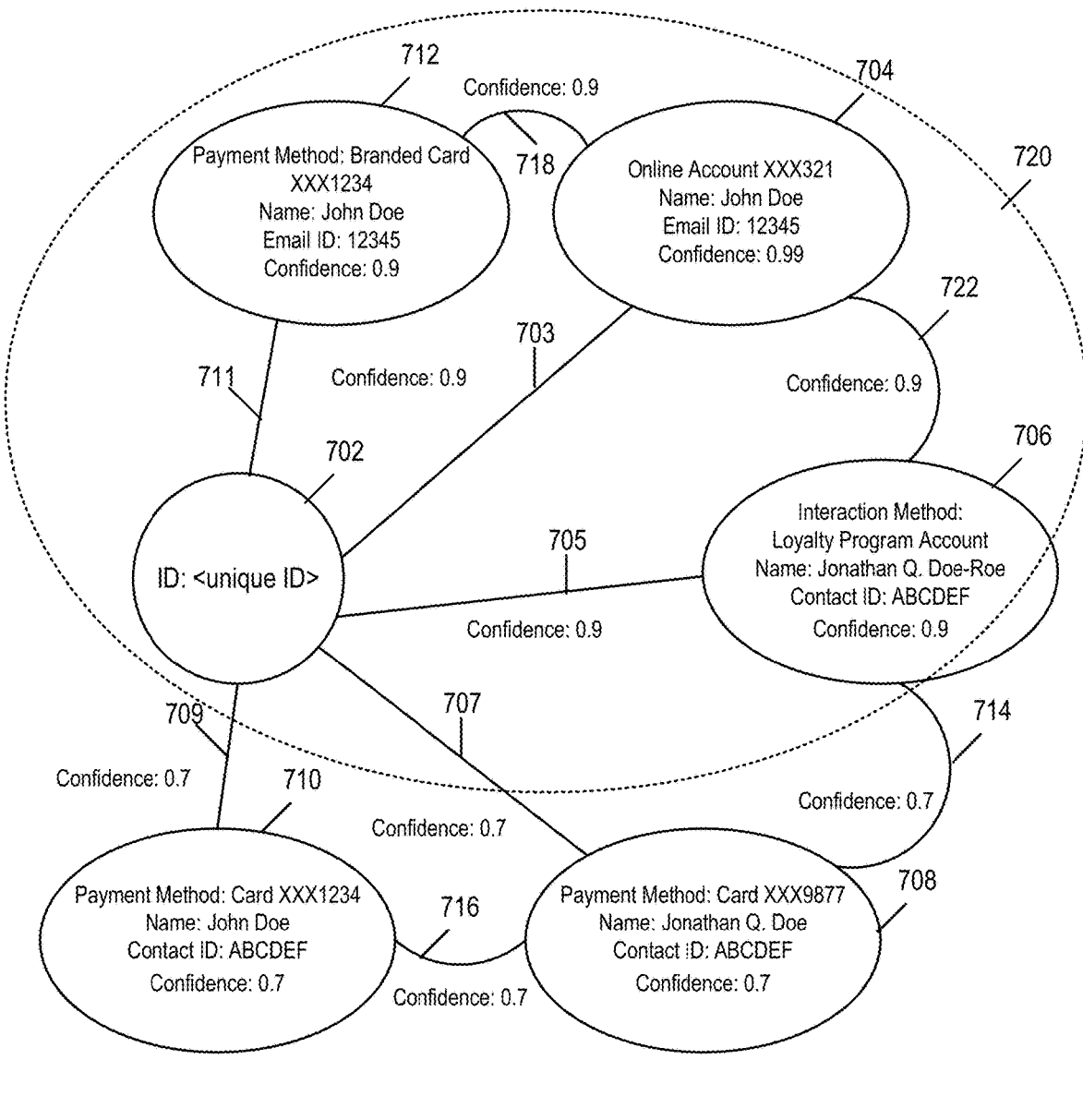
FIG. 7 illustrates an example user identity cluster, including a plurality of user profile nodes and a user cluster node, as well as an example selection of a subset of the user accounts nodes included within the cluster.

Referring now to FIGS. 7-15, various methods and structures for managing user clusters within an identity graph are described. FIG. 7 illustrates an example user identity cluster 700, including a plurality of user profile nodes and a user cluster node, as well as an example selection of a subset of the user accounts nodes included within the cluster. FIGS. 8-15 illustrate various ways in which nodes may be managed within an identity graph that utilizes the cluster structure seen in FIG. 7.

The example user identity cluster 700 may be implemented within an identity graph, for example within a graph database within the infrastructure described above. In the example shown, the user identity cluster includes a user cluster node 702, which is linked to a plurality of user profile nodes 704, 706, 708, 710, 712. In the example shown, each of the user profile nodes is linked to the user cluster node 702 via a cluster edge. Specifically, user profile node 704 is linked to the user cluster node 702 via cluster edge 703, user profile node 706 is linked to the user cluster node 702 via cluster edge 705, user profile node 708 is linked to the user cluster node 702 via cluster edge 707, user profile node 710 is linked to the user cluster node 702 via cluster edge 709, and user profile node 712 is linked to the user cluster node 702 via cluster edge 711.

Additionally, in the example shown, each user profile node may be linked to another user profile node via an identity edge. For example, user profile nodes 704, 706 are linked via identity edge 722, user profile nodes 706, 708 are linked via identity edge 714, user profile nodes 708, 710 are linked via identity edge 716, and user profile nodes 704, 712 are linked via identity edge 718. It is noted that various other identity edges may exist as well (e.g., between user profile nodes 706, 710): however, such edges are not depicted here mainly for graphical simplicity.

In general, the user cluster node 702 maintains a unique identity for a user within the identity graph. In examples, upon determining that a particular user profile represents a unique, new user, such a user cluster node 702 may be created, and a unique identifier generated, in accordance with the methods described below in conjunction with FIG. 10. In further examples, other information that is common among the user profile nodes may be stored within the user cluster node.

The user profile nodes 704, 706, 708, 710, 712 generally represent individual profiles uniquely identifying a user. Each of the profiles may represent the same user, or different users, and the relationship among the user profile nodes defines whether, within the context of the identity graph, it is believed that the user profile nodes corresponds to a same user. Each user profile node maintains within it attribute information associated with the particular user profile. The specific types of information maintained within the user profile node are dependent on the type of profile that is reflected by that node. In the example shown, user profile node 704 reflects an online profile including information directly provided by the user, including a profile identifier, a name identifier, and a representation of contact information (e.g., an email address) associated with that user and validated for use. Other nodes may include representations of other types of information. For example, user profile node 712 reflects a profile defined by use of a particular payment card, in this case a payment card issued by or affiliated with a retail enterprise. The user profile node 712 may include, therefore, a payment card number (e.g. an encrypted identifier representing the payment card number or a partial number, such as a last four digit number of a payment card) a first name and last name, and contact information represented by identifiers to accommodate privacy and security needs, Contact information can include an email address, a postal address, and/or a phone number. Similarly, user profile node 706 reflects a profile defined by use of a loyalty program. This user profile node 706 may not include a payment card number, but also includes a loyalty account number, and may (optionally) still contain a representation of a user's first name and last name (e.g. a name used to register the loyalty program account when registering with the retail enterprise) and representations of contact information such as an email address or phone number. Still other types of user information may be maintained within other user profile nodes 708, 710, 712 for example as associated with third-party payment cards or other types of profile sources.

It is noted that a single user cluster may be associated with one or more nodes of the various types of nodes discussed herein. For example the user identity cluster 700 is shown as including a single online account profile represented by user profile node 704; however, that same user may have other user profiles, for example representing a different persona of that user (e.g., a business account and a personal account, a family account, and the like). Furthermore, as is apparent in FIG. 7, different payment cards may be used by the same user in different contexts, either associated with an online account or not, or used only for in-store transactions, or the like.

In the example shown, each user profile node 704, 706, 708, 710, 712 has associated with it a confidence value. The confidence value may, for example, correspond to a source confidence, also referred to as a node confidence, representing an institutional view of the reliability of data that is associated with the data source where the profile node data originated. In the example shown, data provided directly to the retail enterprise from a customer, such as would be required in the case of an online profile as represented in user profile node 704, could be assigned a highest confidence (e.g., 0.99). In the case of a store branded credit card (e.g., user profile node 712) or a loyalty program (e.g., user profile node 706) may be assigned a relatively high confidence score, such as 0.9. However, information included in a user profile node associated with a third-party payment card (e.g., user profile node 708, 710) may have a lower source confidence. This may be because, although the credit card number may be known to the retailer due to its presentment at a point of sale, and in some instances a user's name may be known and extracted from the third-party payment card at the point of sale, other contact information may either not be available, or may be different from contact information provided directly to the retailer by the customer. In other instances, such as in the case of digital purchases, a user profile node may represent a profile payment node that may utilize a payment card that is not the same as the name on the online profile associated with that payment card. In such instances, the retailer has no way to independently validate the contact information or certain other types of attributes of user profile nodes that represent accounts created with third-party entities. However, based on details of a transaction linking a payment profile node to a user profile node (e.g., based on a transaction made when a user is logged in under a particular user profile but using a differently-named payment card), such edges might be created. Generally speaking, and based on an observed or tested historical accuracy of data associated with such third-party accounts, a retailer may assign a confidence score to such user profile nodes that is somewhat lower, e.g., 0.7 in the example shown. An example set of initial source confidence levels, or node confidence levels, are illustrated in Table 1, below.

TABLE 1

Initial Source Confidence

| Data Source | Confidence Score | Explanation |
| --- | --- | --- |
| Direct Customer Data Entry | 0.99 | A customer's contact history is assessed relative to known transactions with particular payment cards, and mobile phone numbers and/or email addresses may be verified by sending a text or verification email. |
| Add Third Party Payment Card to Account "Wallet" | 0.8 | A name and a billing address is manually entered by the customer when adding a card to the wallet. |
| Swipe Third Party Card In Store | 0.7 | Name and account number information can be sent to a third party service, alongside store identifier, to obtain potential address or contact information for the customer. |
| Apply for Store-Branded Payment Card | 0.95 | Data including a name and unique ID are used to check a customer's credit, and the contact information (address or email) should be accurate given account statements are sent to the customer. |
| Loyalty Program | 0.9 | User Entered data is assessed and compared against known user account profiles to link to a direct customer entered profile with the enterprise. |

In the example shown, each user profile node may also be associated with one or more edges, which define links among user profile nodes, and in turn, membership within a user cluster. Each edge may be defined using a variety of approaches. In some examples, an edge may be assessed and established based on deterministic factors, for example by comparing similarity of attributes between two user profile nodes. For example, a first user profile node may be associated with a name "John Doe", as in node 704, and a second user profile node may be associated with a name "Johnathan Q. Doe-Roe", as in node 706. Additionally, one node may have an identifier representative of email address as contact information, and another node may have an identifier representative of a phone number as contact information. A set of deterministic rules are applied by the user identity platform 110 to define where edges should be formed between two user profile nodes. Rules may include application of one or more text matching algorithms, for example a string matching algorithm, application of a common names library to associate full names and nicknames commonly used, as well as other types of deterministic rules.

In the example shown, each edge may be established based on an extent of similarity, which may also be used to establish a score of similarity, referred to as an edge confidence. The edge confidence is, in some examples, based on the extent of similarity computed in response to the deterministic rules. As further described below, the edge confidence between two user profile nodes may be enhanced using one or more probabilistic techniques, for example such as use of a classifier model to determine a likelihood of two user profile nodes belonging to the same individual based on user behavior maintained within transaction data known to the enterprise. This can form an identity edge between two nodes where an identity edge was not established, or may be used to increase or decrease confidence in such an identity edge. This can, in turn adjust a strengths of any association of a particular user profile node to a cluster to which the other of the two user profile nodes belongs.

In the example shown, each user profile node 704, 706, 708, 710, 712 is linked to the user cluster node 702 via a cluster edge 703, 705, 707, 709, 711, respectively. In this example, as user profile nodes are added to a given cluster, for example by way of establishing an identity edge between two user profile nodes, a cluster edge may also be established between the user profile node and the user cluster node. This avoids having to traverse a long chain of related user profile nodes and identity edges to identify all nodes within a cluster, since all user profile nodes are a single cluster edge away from the user cluster node 702. In some examples, the cluster edges 703, 705, 707, 709, 711 each have an assigned confidence. The assigned confidence may, in this example, corresponds to a source confidence, or node confidence, of each user profile node, respectively. The assigned confidence may also be modified by a closeness of fit of attributes across two user profile nodes: for example based on a score derived from a name matching algorithm performed on name attributes of the two user profile nodes. The name matching algorithm may include detection of exact name matches, detection of an alias, or nickname match to a name, and/or a distance matching algorithm based on name strings. Other attributes may be used to adjust confidence as well. Furthermore, in some implementations, fewer than all edges may have an assigned confidence: for examples, an edge representing a relationship between two users or which may represent an observation (e.g., a possible interactivity between two user profiles), and may not be assigned a confidence.

Additionally, in some implementations, a confidence of a cluster edge may be calculated. A cluster edge confidence score generally quantifies a confidence that a particular account, represented by a user profile node, is associated with a particular user, as defined by a user cluster or user cluster node. This is in contrast to the identity or profile edge confidence described above, which reflects the similarity among attributes between two user profile nodes. The cluster edge confidence may be derived from a combination of the node confidence of the corresponding user profile node, as well as numbers of identity edges between a given user profile node and other user profile nodes within a cluster, as well as a confidence of those identity edges: the confidence of the cluster edge may also be defined at least in part based on a similarity of attributes stored within the user profile node and optional attributes maintained within the user cluster node (to the extent such attributes may be maintained in association with the user cluster node itself). Although the user cluster node 702 is not shown as maintaining common attributes of a user, in alternative embodiments of such an identity graph, at least some attribute information may be stored in association with the user cluster node, as a collective or hub of all correlated attributes of a given user.

In the example shown, the confidence scores are normalized values within a range of 0) to 1. However, other types of confidence scoring may be utilized with other score scales or methodologies. The normalized scoring of source confidence, edge confidence, and the like are not limited to the types of confidence as illustrated in the user cluster 700 seen in FIG. 7.

In the example shown, the user cluster 700 may be the subject of a request for user identification received at the user identity platform 110. The request may include a contact list including one or more user identifiers, and optionally a confidence level (e.g., a threshold confidence) that may indicate that only those user profile nodes having a strong association with the unique user should be returned (i.e., a confidence greater than the defined threshold).

Accordingly, a subset of the user cluster 700, shown as responsive nodes 720 may be provided in response to the request. Accordingly, user profile nodes 704, 706 will be returned, but user profile node 708, 710 are not returned, since those have a confidence below a predetermined threshold (e.g., below 0.9, or 0.8 for example). Therefore, a requesting entity may obtain transaction information, for example from the transaction information 106, associated with only those two user profile nodes, which have a relatively high level of confidence but they are associated with the particular user.

Of course, in response to a different type of requests, a response may include more or fewer user profile nodes from among the user profile nodes included within the cluster. Furthermore, the selection of which user profile nodes are to be returned may be based on one or more of the cluster edge confidence, the node confidence, or the identity edge confidence.

Figure 8:
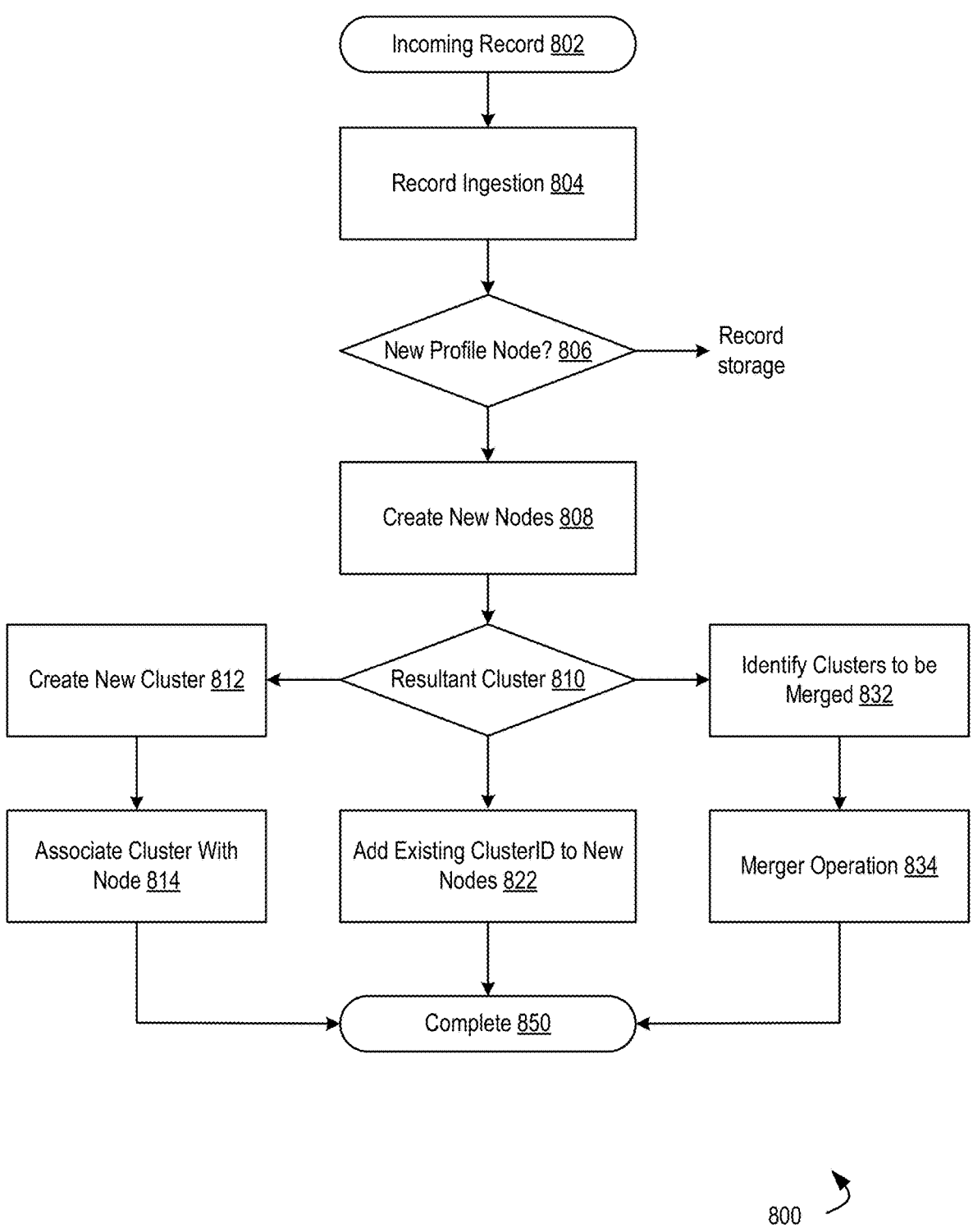
FIG. 8 is a flowchart of an example method of processing transaction data for integration at an identity graph, in accordance with example embodiments.

FIG. 8 is a flowchart of an example method 800 of receiving records representative of user accounts and processing those records to appropriately update an identity graph, in accordance with example embodiments. The method 800 may result in creation of new user profile nodes, as well as association of those user profile nodes with new or pre-existing user clusters within the identity graph, in accordance with example embodiments. The method 800 may be performed, for example, in response to receipt of a record at the user identity platform 110 of FIG. 1.

As illustrated, an incoming record 802 is received at a record ingestion operation 804. The incoming record 802 corresponds to, for example, user identifying information from an interaction with the enterprise managing the identity graph, such as a sales transaction. The record ingestion operation will parse the record, and determine whether the record corresponds to a known existing profile node, at operation 806. If the record corresponds to a known existing profile node, the record may be disregarded if transaction details are managed and stored within other enterprise systems. Alternatively, some details of the record (e.g., time of transaction, user identity, and the like) may be stored, for example in a transaction database 106. However, in circumstances where the record does not match an existing profile node, a new profile node may be required. Furthermore, in some examples, only records that represent unique user profiles are received at the user identity platform for ingestion. A new node operation 808 will create a new user profile node once it is determined that the record does not correspond to an already-existing user profile node.

Once the new user profile node is created, it can be determined how that user profile node may fit within the identity graph. In the example shown, a cluster determination operation 806 determines whether the user profile node should result in creation of a new cluster (e.g. in the situation that the user profile should be associated with no existing user cluster or known user), whether the received record should be added to an existing cluster, or that the transaction represents a profile that could cause merger of two or more previously separate clusters.

In the situation that the incoming record would result in a new cluster, a new cluster creation operation 812 will create a new cluster node having a new; unique identifier for the user cluster that will be used to uniquely identify that cluster, which will include the new user cluster node, the new user profile node, and any subsequently added user profile nodes that may be linked to that same user. An example method for creating such a new cluster identifier is described below in conjunction with FIG. 11. By assigning the cluster ID to the newly created user cluster node, the cluster is uniquely associated with that identifier.

Once the new cluster and cluster identifier is created, the user profile node may be associated with the cluster node, at assignment operation 814. This may be done in a number of ways. For example, a cluster edge may be formed between the new cluster node and the new user identity node, with the cluster edge being maintained either as a separate object within the identity graph, or in association with the cluster node. Alternatively, the cluster identifier may be assigned to, or associated with, both the new cluster node and the new user identity node, thereby affiliating the user identity node with the cluster. In some instances, assigning the cluster ID to a user profile node may create an edge between the user profile node and the user cluster node sharing the same cluster ID.

In the situation that the incoming record does not result in a new cluster, an addition operation 822 may be performed add the new user profile node to a pre-existing cluster. This may be due to a found link between the new user profile node and an existing user profile node, which may be used to establish an identity edge between the new user profile node and an existing user profile node of the pre-existing cluster, as discussed in further detail below. Based on such an identity edge, a cluster edge between the new user profile node and the cluster node may also be established, as described herein. Further details regarding example linking rules for linking two user profile nodes are provided below.

In the situation that the incoming record does not result in a new cluster, but instead results in merger of two existing clusters, a merger determination operation 832 will establish that a merger of two existing clusters will need to occur. The merger determination operation 832 may determine, for example, that a record creating a new node results in an identity edge with two or more existing clusters. Merger of two clusters may be performed in a variety of ways. For example, a record may result in creation of a new user profile node, and a set of linking rules to identify identity edges may detect edges between that new user profile node and two or more existing user profile nodes belonging to two or more different clusters. Or, a record may result in creation of two different user profile nodes (e.g., an identity/payment type node, and a loyalty node) for the same user, and identity edges are created between those nodes and the profile nodes of two or more clusters. Still further, a record may result in updates to an existing node in the identity graph, such that, once linking rules are reprocessed, new identity edges result in identity edges between profile nodes of two or more clusters.

In the case merger is determined to be required, a merger of those clusters may occur, e.g., at merger operation 834. The merger may be performed in a variety of ways, as further illustrated below: In at least one example, an oldest cluster may survive, and all profile nodes may be re-linked via cluster edges to the cluster node of that oldest cluster, with any non-surviving cluster nodes and cluster edges being removed. Other approaches may be used as well (e.g., using a different one of the clusters, or creating a new cluster and importing all user profile nodes into that new merged cluster).

Upon completion of any of the record processing options, a completion operation 850 is performed, for example returning a confirmation of completed processing of the individual record.

Figure 9:
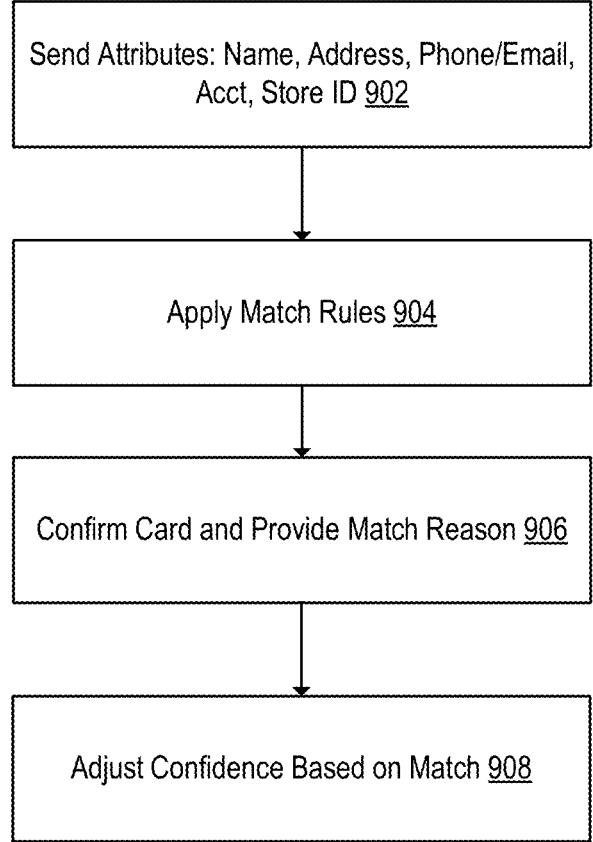
FIG. 9 is a flowchart of example methods of receiving records representative of user accounts and processing those records for association with a user cluster within the identity graph, in accordance with example embodiments.

FIG. 9 is a flowchart of an example method 900 of adding a user profile node to the identity graph, in accordance with an example embodiment. The method 900 may be performed, for example, in the instance that a record reflects a third-party payment card, for example a credit card used in store for retail enterprise.

In the example shown, the method 900 includes sending one or more attributes associated with the payment to a third party service, such as a third-party data broker service (e.g., Acxiom, or the like), at step 902. In response, the user identity platform 110 will often receive at least one name and address combination of attribute information that may be associated with a known user. In some examples, more than one combination may be received. In some instances, where the received record is not associated with a third party card, but instead is associated with a profile having known information to the enterprise, sending specific attributes to a third-party service may not be performed.

Upon receipt of all attributes necessary to perform an assessment of record, one or more match rules may be applied, at step 904. As briefly mentioned above, the match rules may take a variety of forms. In some examples, the match rules may be deterministic matching pools applied to the record by comparing record attributes against attributes of known user profile nodes within an identity graph. Example match rules may include application of a string matching algorithm between two names or addresses, in which a score is generated based on string similarity. A match may be determined based on, for example, whether a match score across a plurality of attributes is above a predetermined threshold. Probabilistic matching based on user behavior may also be applied.

After the match rules are applied, a match may be determined, at step 906. As part of the confirmation, a match reason may be applied or provided, for example based on a same name and address, or similar contact information. In some examples, as further described below; the closeness of match may be used in establishing a confidence that the record is associated with a same user as other records to which the record is linked, at step 908. In examples where only deterministic rules are applied, the node confidence is set based on the source of information and a determined accuracy of data from that data source, and is therefore constant for all records associated with that source. However, in some examples, the closeness of match between the record and attribute information in other user profile modes may adjust an edge confidence between a newly created node associated with the received record and another node within a cluster associated with the same user. Additionally, as described further below, where probabilistic techniques are also used for determining similarity among user profile nodes, it is possible that the edge confidence may also be adjusted based on the outcome of such probabilistic analysis.

Referring now to FIGS. 10-16, methods and logical diagrams are provided for manipulating user clusters in an identity graph in response to receipt of new transaction records that suggest to modify the identity graph. For example, modifications to the identity graph may include adding a node to an existing cluster, adding a node to a new cluster, merging to existing clusters into a single cluster, or splitting a cluster into two separate clusters based on information indicating that a cluster should in fact represent two different users.

Figure 10:
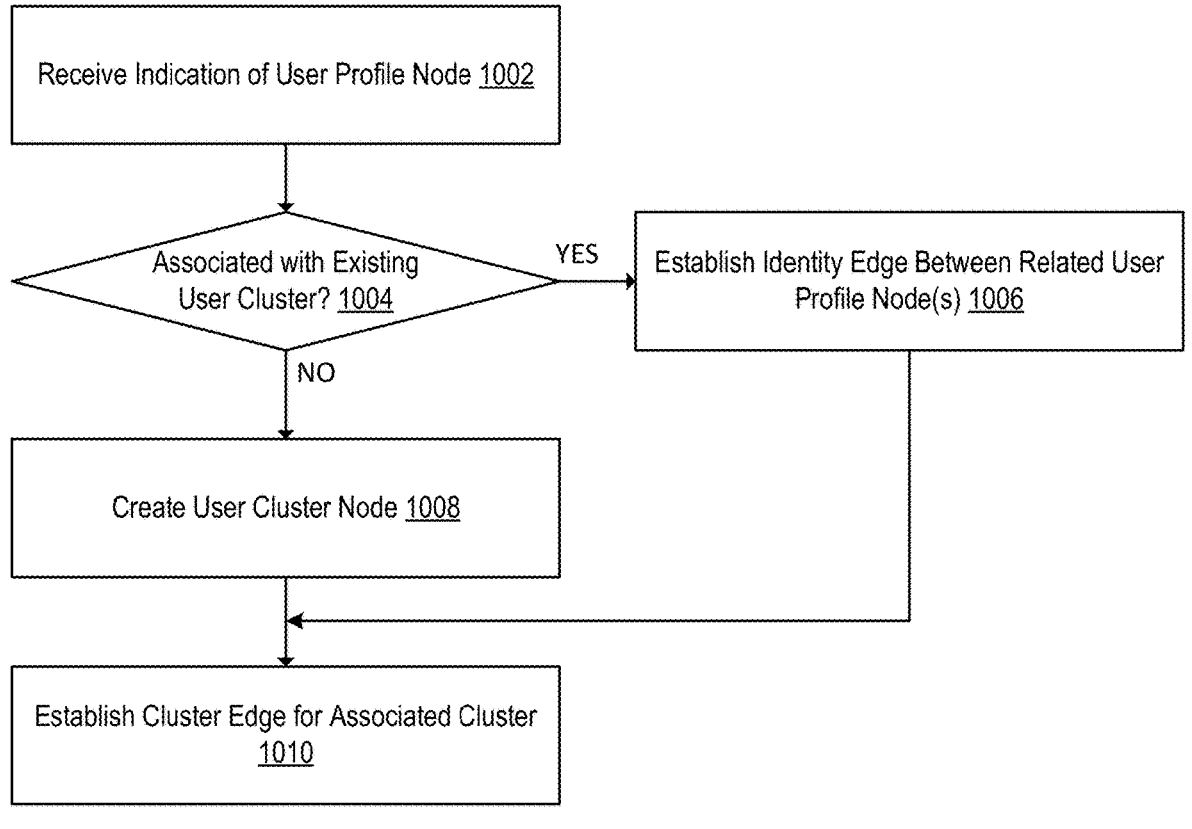
FIG. 10 is a flowchart of an example method of adding a user profile node to the identity graph, in accordance with an example embodiment.

FIG. 10 is a flowchart of an example method 1000 of adding a user profile node to the identity graph, in accordance with an example embodiment. The method 1000 includes receiving an indication that a user profile node is to be created, at step 1002. The indication that a user profile node is to be created may be, for example, based on receipt of a new record representing an account not previously maintained within the identity graph. The account may be, for example, based on a new user sign up for a digital account at a retail website, receipt of new transaction records associated with a third-party payment card, may be a new user sign up for a payment card issued by the retail enterprise, a new user sign up for a loyalty program associated with the retail enterprise, or other types of user profile creation.

Figure 14:
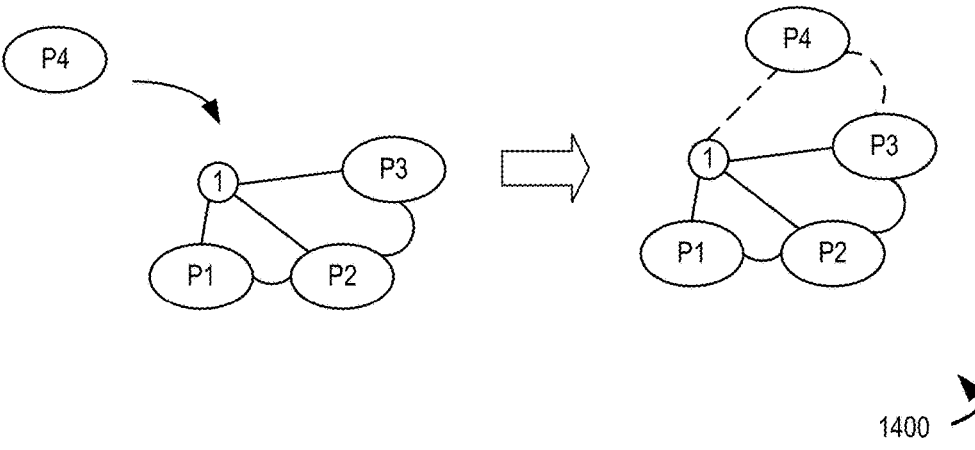
FIG. 14 is a schematic diagram of adding a user profile node to a user cluster including a user cluster node, according to an example implementation.

At operation 1004, the method 1000 includes determining whether the new user profile node is to be associated with an existing user cluster. For example, as described above, deterministic and/or probabilistic rules may be applied to identify a match between the new user profile node and existing user profile nodes within the identity graph, for example based on similar name and contact information associated with two different payment cards or loyalty accounts, among other rules. If a match is identified, at step 1006, and identity edge is established between the new user profile node and any related, matched user profile nodes within the identity graph. If no match is identified, at step 1008, a new user cluster node is created. At step 1010, a cluster edge is created, in either event, tying the new user profile node to either the user cluster node of the existing cluster, or the new user cluster node created based on identification of the record as representing a new user entirely within the identity graph. A schematic example of adding a user profile node to an existing user cluster is illustrated in FIG. 14.

Figure 11:
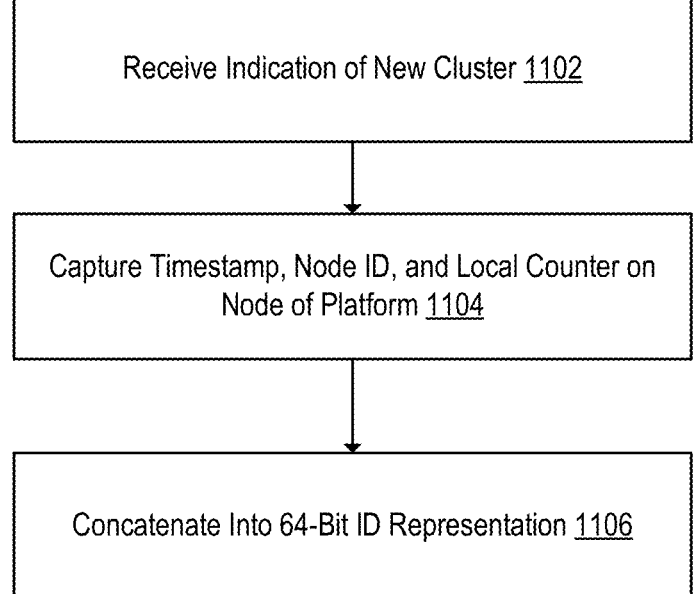
FIG. 11 is a flowchart of an example method of generating a unique cluster identifier for a user cluster node identifying a unique user, according to an example embodiment.

FIG. 11 is a flowchart of an example method 1100 of generating a unique cluster identifier (e.g., a "cluster ID") for a user cluster node identifying a unique user, according to an example embodiment. The method 1100 may be performed, for example, when creating a new user cluster node that requires a new unique identifier as in step 812 of FIG. 8.

In the example shown, the method 1100 includes receiving an indication that a new cluster is to be created, at step 1102. In response to the indication a new cluster is created, a request may be managed at a particular node within the user identity platform 110. The node may be a particular computing system within a distributed computing system managed by the enterprise. At step 1104, the node designated to create the new unique user identity will capture a timestamp, a node ID, and a local counter on the specific device. In example embodiments, the timestamp may be at millisecond precision and can include up to 41 bits in length. The node ID can also be allocated to a predetermined bit lengths, for example up to nine bits, thereby allowing up to 512 separate nodes usable to manage and generate unique user cluster identifiers. Furthermore, the local counter may utilize a remaining set of bits, for example up to 12 bits, thereby leading to a maximum value of 4095. A remaining pair of bits may be fixed, to identify the number as a cluster ID. Each of these numbers may be concatenated, at step 1106, and may result in a 64-bit number that represents, uniquely, the user cluster node, and therefore the user cluster.

Taking the example of method 1100, a timestamp may be captured as 1606377900049, a node identifier may be node 406 (of 512), and the counter may be 1. Concatenating a a leading two bits of "01" leads to a binary string of: 0110111011000000011100101011000100000001000 1110010110000000000001, or 7980504644272611329 in decimal representation. Using each of the bits in this manner, it can be reasonably presumed that there is limited, if any risk of collision between two cluster IDs created in accordance with this approach.

Figure 12:
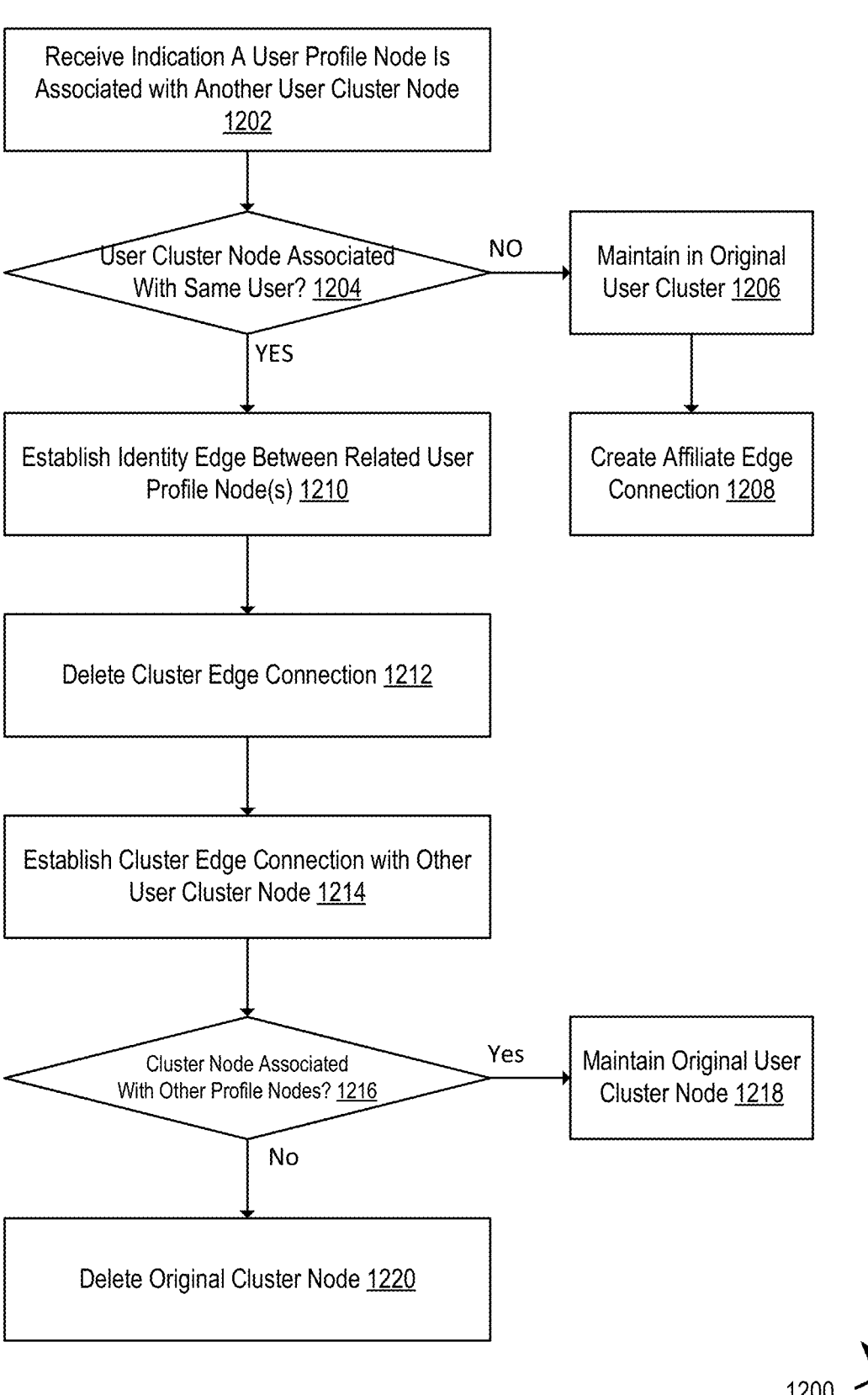
FIG. 12 is a flowchart of an example method of merging user profile nodes from two or more user clusters into a single cluster, according to an example embodiment.

FIG. 12 is a flowchart of an example method 1200 of merging user profile nodes from two or more user clusters into a single cluster, according to an example embodiment. The method 1200 may be used, for example, when a record is received that would indicate that two separate user clusters in fact should be correlated, for example as being associated with a same user.

In the example shown, the method 1200 includes receiving an indication that a user profile node is associated with another user profile node of a different cluster, at step 1202. At operation 1204, an assessment is performed to determine whether the user profile node from the other cluster is associated with the same user as the current user profile node. If the other user profile node is not correctly associated with the same user cluster as the current user profile node, the user profile node is maintained in the original user cluster, at step 1206. In some examples, an edge connection may be formed, for example an affiliate edge connection, at step 1208.

If, however, the user profile node is associated with another user profile node of another user cluster (e.g., the user cluster nodes are in fact representative of the same user), an identity edge is established between the related user profile nodes, at step 1210. The two user cluster nodes are assessed to determine which is older: the older of the two user cluster nodes survives. The newer of the two user cluster nodes would typically then be deleted, along with any associated cluster edge(s), at step 1212. A new cluster edge connection is established with the other of the user cluster nodes to which the user profile node is properly to be connected, at step 1214.

Figure 15:
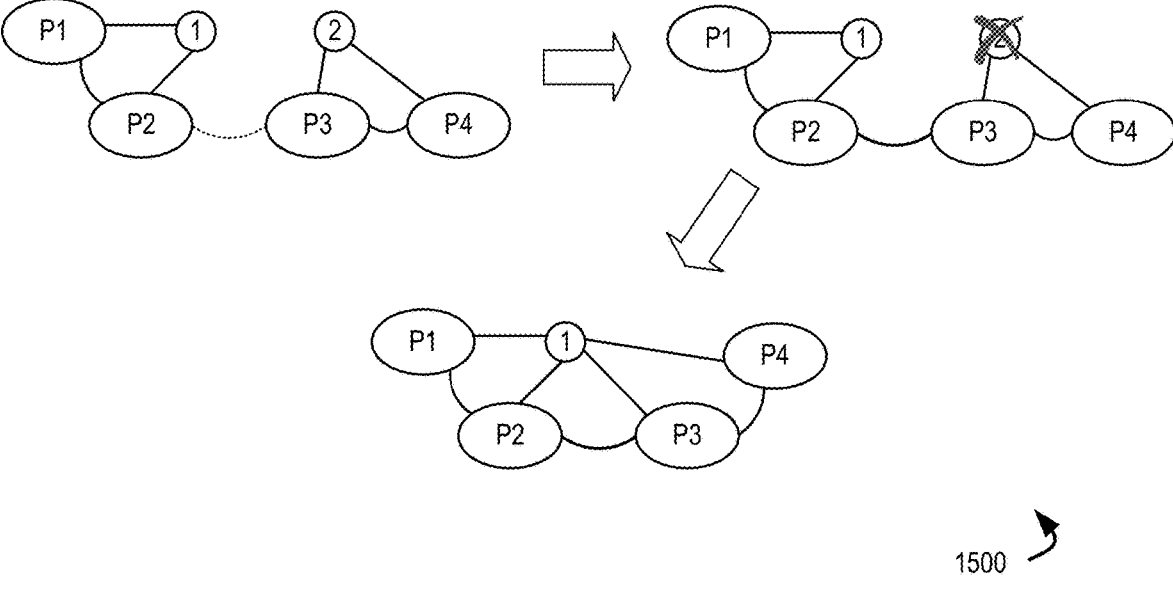
FIG. 15 is a schematic diagram of merging user profile nodes of two user clusters into a single user cluster, according to an example implementation.

Generally speaking, once a user profile node is identified as merging into a different user cluster, any other user profile nodes in the original user cluster will similarly migrate and be merged into the common user cluster, based on the preserved identity edges among the preexisting set of user profile nodes in that original user cluster. In some examples, however, such as if the user profile node is updated such that edges to other user profile nodes in its original user cluster were "broken", the original user cluster node may be maintained within the identity graph. In such instances, as determined at operation 1216, the original user cluster node might be maintained within the identity graph, at step 1218. However, in the typical case that the original user cluster node is no longer associated with any other user profile nodes at operation 1216, the original user cluster node does not need to be maintained within the identity graph, and instead may be deleted, at step 1220. A schematic example of merging user clusters is depicted in FIG. 15, below.

Figure 13:
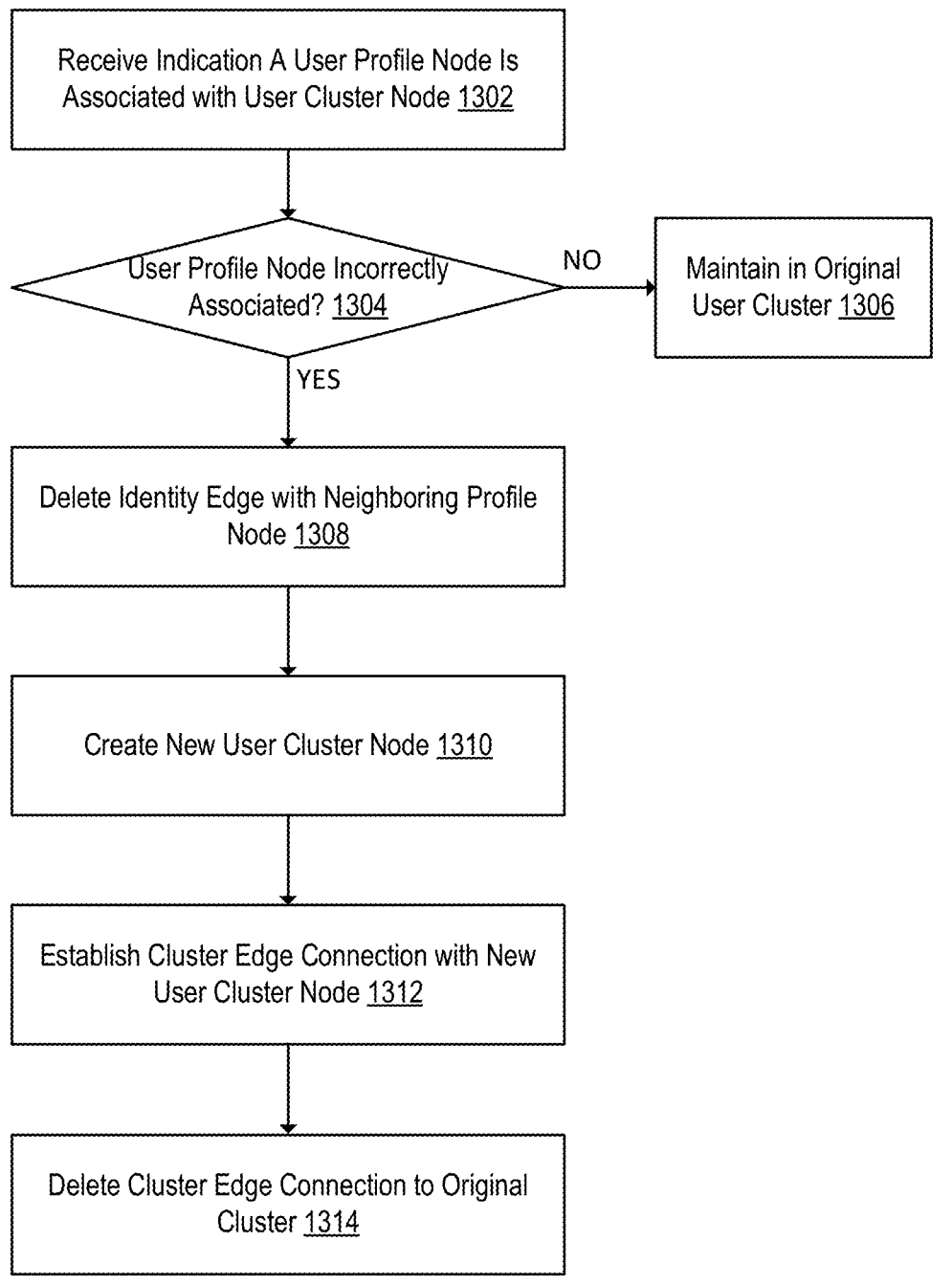
FIG. 13 is a flowchart of an example method of splitting user profile nodes from a single cluster into two are more user clusters, according to an example embodiment.

FIG. 13 is a flowchart of an example method 1300 of splitting user profile nodes from a single cluster into two or more user clusters, according to an example embodiment. Splitting user profile nodes into two or more clusters may be performed, for example, upon determining that an edge connection between two user profile nodes should not exist, for example because the user profile nodes are properly attributable to two different users and therefore two different user clusters.

In the example shown, the method 1300 includes receiving an indication that a user profile node is associated with a particular user cluster node, at step 1302. An assessment operation 1304 determines whether the user profile node is incorrectly associated with a given user cluster. If the user profile node is not incorrectly associated, it is maintained within its original user cluster, at step 1306.

However, if the user profile node is determined to be incorrectly associated with one or more profile nodes within its user cluster, then the identity edge with a neighboring user profile node(s) may be deleted, at step 1308. The deletion of the identity edge may be in response to a determination that, upon further receipt of additional attributes, or upon further assessment of a confidence or strength of connection of the identity edge, the user profile nodes should no longer be considered associated with the same user. This may be based on, for example, receipt of additional information about the user profile, such as receipt of additional attributes. It may be also based on further probabilistic techniques indicating that user behavior is in fact indicative of two different users.

In some examples, the method 1300 further includes creating a new user cluster node at step 1310. Creating a new user cluster node can involve, for example, creation of a node and assignment of a new unique cluster ID to that node, in accordance with the method described above in conjunction with FIG. 11. Of course, in some other examples, it may be that the user profile node is incorrectly associated with one user, but instead should be associated with a different user. In such a case, no new user cluster node is created, but instead the existing user profile node is re-associated with a different, existing user cluster node.

In either event, the method 1300 includes establishing a cluster edge connection with a user cluster node, at step 1312. The existing cluster edge connection to the original cluster may then be deleted, at step 1314. Accordingly, the user profile node becomes disassociated with the previous user cluster, and re-associated with a new user cluster. A schematic example of splitting a user cluster into two user clusters is depicted in FIG. 16, below.

Figure 16:
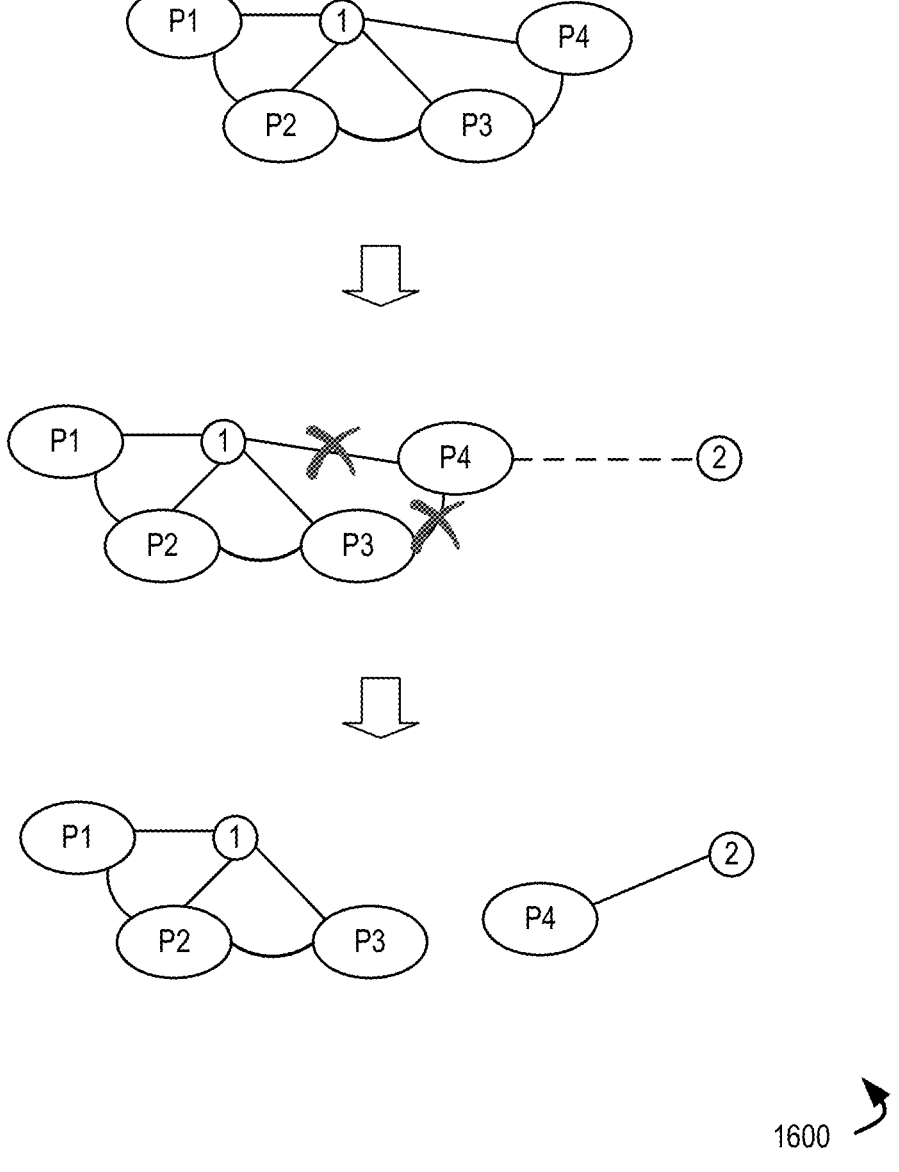
FIG. 16 is a schematic diagram of splitting a user cluster into two user clusters, according to an example implementation.

Referring now to FIGS. 14-16, example schematic diagrams of adding a user profile node, merging user profile nodes of two user clusters into a single user cluster, and splitting a user cluster into two user clusters, are illustrated. The schematic diagraphs are intended as illustrative rather than limiting. Such processes may be performed on a wide variety of types of nodes and clusters, and have a variety of other effects on user clusters.

FIG. 14 is a schematic diagram 1400 of adding a user profile node to a user cluster including a user cluster node, according to an example implementation. In this example, a user profile node P4 is received at the user identity platform 110 and is identified as belonging to a cluster including a user cluster node 1 and user profile nodes P1, P2, P3. In this example, user profile node P4 is determined to share an identity edge with user profile node P3, and therefore, after that identity edge is formed, a cluster edge between the user profile node P4 and user cluster node I may be formed. In further example implementations, identity edges may be established between the user profile node P4 and others of the user profile nodes within the cluster, e.g. nodes P1, P2.

FIG. 15 is a schematic diagram 1500 of merging user profile nodes of two user clusters into a single user cluster, according to an example implementation. Diagram 1500 represents an example of merger of two user clusters, as described in conjunction with FIG. 12. In this example, a first user cluster has a user cluster node 1 and user profile nodes P1, P2. A second user cluster has a user cluster node 2, and user profile nodes P3, P4. In this example, an identity edge is identified between user profile nodes P2 and P3. In that example, because of the identity edge, it has been determined that user profiles nodes P2 and P3 belong to a same user cluster.

Accordingly, in the example shown, after establishment of the identity edge between user profile nodes P2, P3, user cluster node 2 may be deleted, and cluster edges may be established between user profile nodes P3, P4 and the user cluster node 1, thereby establishing a single user cluster.

FIG. 16 is a schematic diagram 1600 of splitting a user cluster into two user clusters, according to an example implementation. In the example shown, a single user cluster has or user profile nodes P1, P2, P3, and P4. In this example, it may be determined that user profile node P4 should not be linked to the user profile node P3 via an identity edge. This may be because updated information is received regarding attributes of one or both of the user profile nodes P3, P4, resulting in an updated deterministic assessment of the identity edge. It may also be because of a subsequent determination, using probabilistic methods, that behavior of user profile P4 and P3 are indicative that these are different users.

Accordingly, and as illustrated in the diagram 1600, the identity edge between user profile nodes P3 and P4 is deleted, and additionally the cluster edge between user profile node P4 and user cluster node 1 is deleted. A new user cluster node 2 is created, and a cluster edge is formed between that new user cluster node 2 and user profile node P4. As such, upon completion of the splitting operation, two separate user clusters are formed with the respective user profile nodes as members of those clusters.

Referring to FIGS. 7-16 generally, although certain node and cluster structures are described, it is recognized that the present disclosure is not so limited. That is, there may be different methods for correlating nodes with each other, or forming clusters among nodes. Some example methods that may be used in the alternative are described below.

III. Management and Computation of Confidence Scores in Identity Graphs

Figure 17:
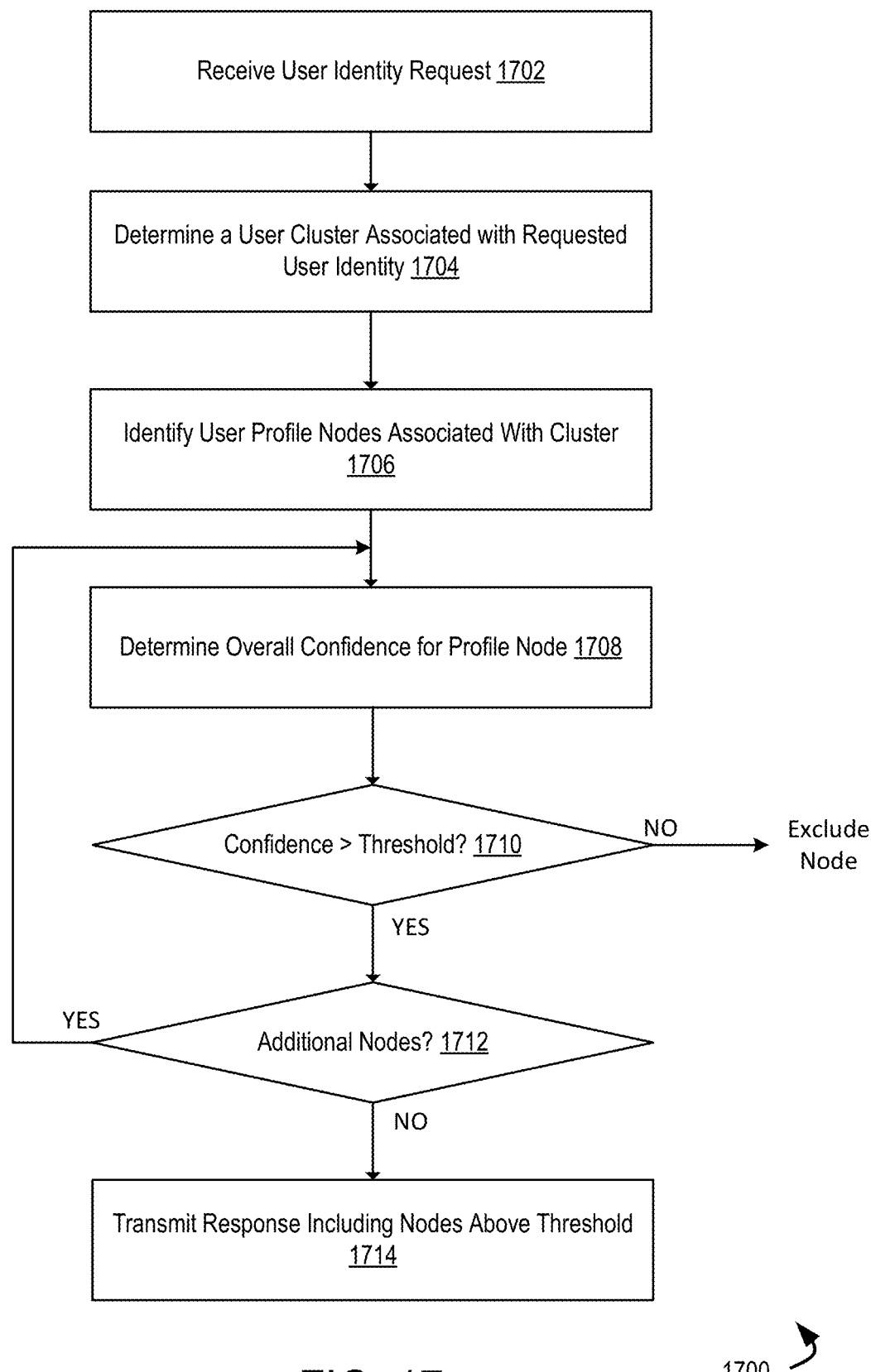
FIG. 17 is a flowchart of an example method of determining user profile nodes responsive to a request based, at least in part, on a confidence value calculated in association with that node, according to example embodiments.
Figure 19:
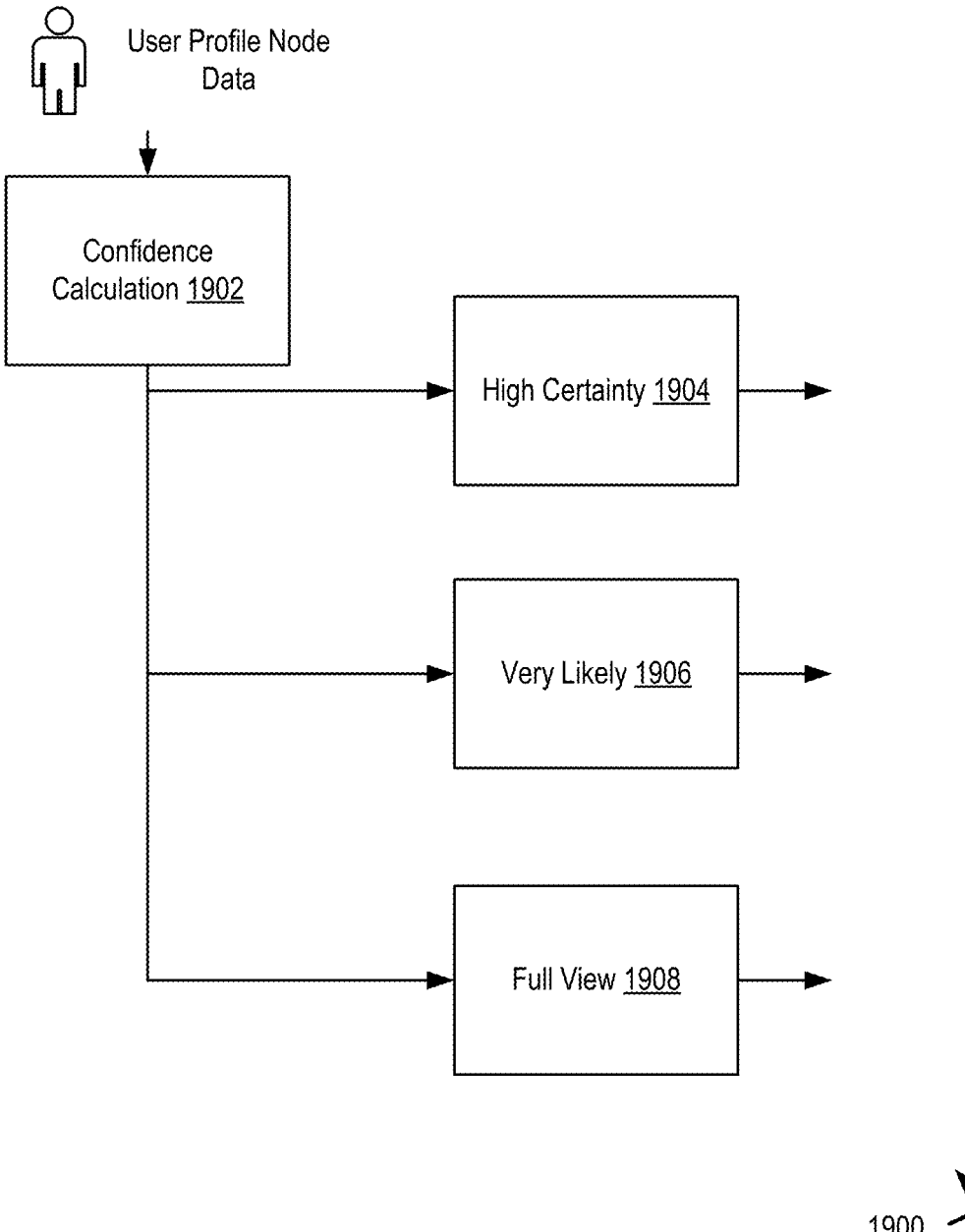
FIG. 19 is a block diagram of an example node confidence calculation, in accordance with example embodiments.

Referring now to FIGS. 17-19 details regarding application of confidence scores within identity graphs are provided. The confidence scores described herein may be used within identity graph structures to represent a variety of different types of "confidence" or reliability in information within the identity graph, whether that information represents a node (or information within that node) or an edge, such as an identity edge or cluster edge. Calculated confidence levels may result in a leveling/thresholding into collections of high, medium, and low confidence nodes. In response to a query for information about a user, the context of the query (or the query itself) may request that only account data of at least a predetermined confidence is returned. Accordingly, using the identity graph structure and user clusters described herein, the use of confidence data within such a structure allows for improved flexibility as to the nodes and/or transaction data that are responsive to a given query for user data.

FIG. 17 is a flowchart of an example method 1700 of determining user profile nodes responsive to a request based, at least in part, on a confidence value calculated in association with that node, according to example embodiments. The method 1700 may be performed by a user identity platform 110, for example using any of the identity graph structures described herein.

In the example shown, the method 1700 includes receiving a user identity request, at step 1702. The user identity request can be in response for a query for information about a particular user, or a query for information about any users having a particular attribute. For example, a user identity request may correspond to a request for all user identities associated with individuals who have purchased toys within the past six months. In examples, the user identity request may include information about the requesting entity, or may include information regarding a desired level of accuracy or completeness of response. For example, in a case where the request is from a marketing entity seeking to deliver personalized offers to individuals to repeat a purchase of a particular item, the request may include, or there may be a determination at the user identity platform 110, that the need for accuracy is high. In a case where the request is from a marketing entity seeking to deliver generalized offers to individuals, the request may include, or there may be a determination at the user identity platform 110, that the need for accuracy is lower, e.g., only a medium or low accuracy may be required.

In the example shown, the method 1700 includes determining one or more user clusters associated with the requested user identity, at step 1704. The one or more user clusters may include an individual user cluster in response to a request for a single user identity, or may include a plurality of user cluster identifiers, each of which being a cluster that has at least one user profile node that matches the criteria included in the request. Identifying user clusters that correspond to a request can vary depending on the format of the request. If a request identifies a specific individual, that identification may take the form of the unique ID assigned to the user cluster node: however, more likely, the request will be to identify a specific individual or number of individuals who is associated with a particular profile (e.g., by email address, name, payment card number, etc.) or having particular characteristics. In such cases, the user profile node that matches the request may be included within a response, but the specific user cluster node identities are identified as corresponding to those users.

In the example shown, the method 1700 includes identifying one or more user profile nodes associated with the identified cluster, at step 1706. If a request is identified as being associated with a specific user profile, that user profile may be represented by a particular user profile node within the identity graph. Identifying other user profile nodes may include identifying a cluster to which the identified user profile node belongs, identifying the corresponding user cluster node to which the user profile node is linked, and identifying all other user profile nodes that are included within that cluster. These are generally user profile nodes that are linked to the initial user profile node (e.g., by an identity edge) or user profile nodes linked to the user cluster node via a cluster edge.

In the example shown, the method 1700 includes determining an overall account to user confidence for each of the identified user profile nodes within the identified cluster, at step 1708. This overall account to user confidence may also be referred to herein as a cluster edge confidence, as it is a confidence associated with the cluster edge linking a user cluster node to a user profile node. Determining an overall cluster edge confidence for each profile node within the identified cluster may include assessment of a pre-calculated cluster edge confidence for each user profile node included within the user cluster. This cluster edge confidence, as discussed herein, may be based on a node confidence associated with each user profile node, as well as one or more edge confidence scores defining a confidence of association among the user profile nodes within the cluster.

In a specific example, a node confidence, which may be used in determining a cluster edge confidence, may be set based on observed historical accuracy of data sources associated with a particular profile type. Example node confidence values are described above in Table 1. In other examples, node confidence may be updated based on observed accuracy. Node confidence may be updated periodically based on observed accuracy of a source of information associated with that node. For example, increases in accuracy and reliability of third party payment card information may result in an increase in assigned node confidence for user profile nodes associated with such payment methods/accounts.

In a further specific example, an edge confidence may be calculated between two user profile nodes. The edge confidence may be based solely on similarities between two user profile nodes, or may be based on a combination of those similarities and the underlying node confidence. In example implementations described herein, edges between user profile nodes may be defined to represent one of a plurality of edge types. In some examples, an edge may correspond to an identity edge, which is the type of edge previously described, and which connects two nodes that belong to the same user. In addition, a relationship edge may be implemented. A relationship edge may correspond to a situation in which there is a relationship between two nodes, but that relationship is not an identity relationship. For example, the relationship edge may correspond to a linking between two cardholders within the same family. Furthermore, an observation edge may also be used, and which can be implemented for circumstances where factual observations are made based on transaction or other data that tie the two profile nodes together in some way. The strength of these observations, defined by the number and frequency of their occurrence provides input into inferred relationships and/or identities. This may be in the case where, for example, there is a split card payment—the split payment may be made between two payment accounts of the same user, or may be two unrelated users entirely. Lastly, there is a suspect pair edge which holds the confidence score for edges that have been assessed for an identity match but failed to meet the threshold for creating an identity edge. The confidence on a suspect pair can be increased or decreased using probabilistic matching techniques, and if the confidence meets or exceeds the threshold the edge can be upgraded to an identity edge. Example probabilistic techniques are described in further detail below.

In an example of calculating an identity edge confidence, for two nodes, a matching process may be performed on contact information attributes, such as an address or phone number. In this case, the match may be binary—either present and matching, or non-matching. In other examples, a string matching process may be used to determine two names being sufficiently similar, e.g., "John Doe" and "John Q. Doe". In the case the string matching does not determine similarity in a name or email string matching process (e.g., where two first names are spelled differently), a fuzzy matching algorithm may be used, which generates a score representing a likelihood of match between two names or email addresses. In this instance, a minimum node confidence may be used, and multiplied against a matching score that is obtained by performing the fuzzy matching process across the name attribute. In an example illustration, two nodes having node confidence of 0.9 and 0.7, respectively, and may be matched on a corresponding names, "John Doe" and "Jon Q. Doe". Such names may not pass a string matching analysis due to the different spelling of a first name. However, a fuzzy matching score may be derived from string matching between the two name attributes, and a normalized fuzzy matching score of (for example) 0.89 may be determined. In such an instance, the edge confidence may be calculated as 0.7×0.89=0.623. More generally, this identity edge confidence score may be represented as follows:

Let $I_{i,j}(x)$: indicator variable that represents whether a particular contact mechanism x matches for nodes i and j:

For all x∈{email, address, mobile}

$$I_{i,j}(x) = \left\{ \begin{array}{l} 1, \text{ if } x_i = x_j \\ 0, \text{ otherwise} \end{array} \right\}$$

Let $C_i$: source confidence score for node i

Let $F_{i,j}$: fuzzy name matching score for node i and j

Then, an edge confidence $E_{i,j}$ could, in some cases, be described as:

$$E_{i,j} = \min(C_i, C_j) \times \max_{x \in (\text{email, address, mobile})} I_{i,j}(x) \times F_{i,j}$$

Of course, two nodes may be matched across more than one attribute as well. In some examples, a highest edge score is used when matching individual attributes.

In accordance with the present disclosure, in example embodiments, a cluster edge confidence may be calculated as a normalized score based on node confidence and edge confidence. For example, a weighted average confidence may be used, combining existing edge and node confidence. An example of use of a weighted average confidence is described in further details below in conjunction with FIG. 18.

In the example shown, the method 1700 includes determining, for each profile node, whether an overall confidence for the strength of that particular node's link to the user cluster is greater than a predetermined threshold level. This can take a variety of forms. In examples, the threshold may be a defined threshold level from among a plurality of discrete threshold levels, for example by setting defined threshold confidence at low, medium, or high confidence. Low confidence may correspond to a confidence calculation below 0.7, for example, while medium confidence may correspond to a confidence calculation between 0.7 and 0.9. High confidence may correspond to a confidence calculation above 0.9. Other thresholds may be used as well, based, for example, on the specific confidence scoring used.

If the overall confidence (e.g., the "cluster edge confidence") is greater than the threshold level, the method 1700 will proceed. If there are additional nodes to be assessed, at operation 1712, flow returns to determining the overall node confidence for that profile node, at step 1708. If no further profile nodes require assessment, operational flow proceeds to transmit a response to the requests, including any nodes above the predetermined threshold, at step 1714.

FIG. 18 is a flowchart of a method 1800 of computing linking confidences between pairs of nodes based on node level attribute confidence values and matching scores across an identity graph, in accordance with example embodiments. The method 1800 may be performed, for example, upon ingestion of a new user profile node, or to recalculate a particular confidence, such as an identity edge confidence or a cluster edge confidence, in response to changes in the identity graph (e.g., changes in source confidence based on subsequent observations, changes in account attribute data changing a strength of edge confidence, etc.).

In the example shown, the method 1800 includes applying a node confidence to the node, at step 1802. Applying a node confidence may include, for example, assigning a node confidence based, at least in part, on a predetermined, or observed and updated, accuracy assessment regarding source data associated with the user profile.

In the example shown, the method 1800 includes assessing attributes of the user profile node relative to attributes of other user profile nodes. This can include performing an assessment of an exact match on the email address and/or phone number provided relative to other available user profile nodes. Additionally, it can include performing a fuzzy match against name information or mailing address information of other user profile nodes. This may be performed across all of the attributes available for a given node, and the comparison may be made against any or all available nodes within an identity graph.

In example embodiments, performing either an exact match (in the case of a name, address, email or mobile number) or a fuzzy match (in the case of name or mailing address), or matches in the username portion of an email, may result in either a binary value (0 for mismatch, 1 for match) or partial score (on a 0-1 normalized scale) for a goodness of match between corresponding attributes of two nodes. In some instances, this "attribute match" score may be multiplied against an "attribute quality" score that is representative of the accuracy of a particular source as to the particular attribute.

An example of example attribute matching scores is provided in Table 2 below; in this example, email address, name, and behavior are considered probabilistic, and mailing address and mobile number are considered discrete. Accordingly, fuzzy matching may be performed between probabilistic attributes, and an exact match test is performed on discrete attributes.

TABLE 2

Individual Attribute Matching Scores Example

| Attribute Type | Node 1 | Node 2 | Match Score | Type |
|---|---|---|---|---|
| Email | jdoe@email.com | jdoe@email.com | 1 | Probabilistic/Continuous |
| Email | jdoe@email.com | jdoe@gmail.com | 0.9 | Probabilistic/Continuous |
| Mobile | (123)456-7890 | (123)456-7890 | 1 | Deterministic/Discrete |
| Address | 987 Park St. | 123 Park St. | 0 | Deterministic/Discrete |
| Address | 456 Anon St. | 456 Anon St. | 1 | Deterministic/Discrete |
| Name | John Doe | John Doe | 1 | Probabilistic/Continuous |
| Name | Jonathan Doe | Jonathan Q. Doe | 0.5 | Probabilistic/Continuous |
| Behavior | 3, 2, 7 | 5, 2, 5 | 0.9 | Probabilistic/Continuous |

Additionally, as noted above, an example of matching attributes and global attribute weights may be defined, and used in conjunction with the match scores to arrive at overall confidence scores. Table 3, below, lists example global attribute weights that may be applied. As seen in this table, individual attributes may be weighted differently when associated with different data sources, given the potential for each data source to be better or worse at providing accurate attribute values for specific attributes.

TABLE 3

| Attribute Weighting by Profile Source | | | |
| --- | --- | --- | --- |
| | Global Weight | | |
| Attribute | Source 1 | Source 2 | Source 3 |
| Email | 1.0 | 0.9 | 0.9 |
| Mobile | 0.8 | 0.8 | 0.7 |
| Address | 0.8 | 0.8 | 0.7 |
| Name | 0.9 | 0.9 | 0.9 |

In the example shown, the method 1800 includes generating an edge confidence from a weighted sum of attribute similarity scores, at step 1806. The weighted sum of similarity scores adds the attribute similarity scores, optionally multiplied by the attribute weights to arrive at a raw attribute similarity score. This has the advantage of providing increased weights as more attributes are closely aligned, while accounting for the relative quality levels of each profile data source for specific attributes. In an example, this example "raw score" of an edge confidence may be represented as follows, where attributes weights $w_e^{s1}$, $w_e^{s2}$ represent the source-specific weight for a particular attribute (e.g., email):

$$\text{raw score}=w_e^{s1}w_e^{s2}(x_{e1}+x_{e2}\ldots)+w_m^{s1}w_m^{s2}(x_{m1}+\\ x_{m2}\ldots)+w_a^{s1}w_a^{s2}(x_{a1}+x_{a2}\ldots)+w_n^{s1}w_n^{s2}(x_{n1}+\\ x_{n2}\ldots)+w_b^{s1}w_b^{s2}(x_{b1}+x_{b2}\ldots)$$

In the example shown, the method 1800 includes normalizing the edge confidence score to a normalized range, at step 1808. The normalization may be performed, for example, using an activation function. The activation function may re-scale an edge score by normalizing to a common range (e.g., between 0 and 1, or another predetermined range). In example implementations, a tanh (hyperbolic tangent) function may be used. Such a function represents a non-linear function that scales x axis values between a negative and a positive predetermined value: since the weighted sum attribute scores are always positive (at least zero or positive), use of a weighted sum attribute score as an x value will result in a y value between 0 and a predetermined value (e.g., 1) along a scale that magnifies individual attribute matches.

Continuing the mathematical representation above, if $w_k^s$ is a global attribute weight, then:

For all k∈ {email, mobile, address, name, behavior, etc.}
And for all s∈ {profile, profile payment, etc.}
Then, $x_k^{(i,j)}$ corresponds to a total attribute matching score for nodes i and j and attribute type k
An activation function may be stated as:

$$f(z) = \frac{e^z - e^{-z}}{e^z + e^{-z}}$$

In such an arrangement, a predicted edge confidence score $\hat{y}^{(i,j)}$ then can be defined as follows:

$$\hat{y}^{(i,j)}=f(\Sigma_k w_k^{s1} w_k^{s2} x_k^{(i,j)}).$$

In the example shown, the method 1800 includes assigning an edge confidence based on the normalized edge confidence score, at step 1810. Additionally, an overall confidence may be calculated. In some examples, the overall confidence, such as a cluster edge confidence, may be a combination of edge confidence and node confidence for the particular node. This may be a weighted average of combined edge confidence and node confidence scores for each node within the cluster. One or both of the cluster edge confidence and the identity edge confidence may be precalculated and stored (with node confidence being assigned). A cluster edge confidence may be calculated based on a combination of node confidence and edge confidence determined in accordance with the above.

In some examples, the overall confidence may correspond to a high, medium, or low cluster edge confidence. Based on such a classification, one or more actions may be taken. For example, identity edges may be formed between two nodes based on a threshold being reached, but in response to some queries, only nodes having a high cluster edge confidence may be returned in response to specific queries for user data.

FIG. 19 is a block diagram of an example node confidence calculation process 1900, in accordance with example embodiments. Generally speaking, the confidence calculation process 1900 includes a confidence calculation process 1902, which receives user profile node data and performs node confidence, edge confidence, and account to user confidence calculation processes as described above. Upon completion of node and edge confidence calculations, a resulting confidence may be assigned to one of a plurality of confidence levels based on whether a specific confidence meets a threshold level, as previously described. In this example, a high certainty classification 1904, a medium certainty classification 1906, and a full view classification 1908 may be provided: however, in alternative embodiments, other numbers or arrangements of certainty classifications may be used.

In examples, a high confidence may be defined as any cluster edge confidence having a score above a highest predetermined threshold (e.g., 0.9 or 0.89, such that any score 0.9 or above, within a 0)-1 scale) may be considered highly likely to be accurate or correlated. A medium confidence may be defined as any node or edge confidence having a score between two thresholds (e.g., below the high threshold of 0.9 or 0.89, and above a predetermined low confidence threshold, such as 0.8). A low confidence may be defined as all nodes in the cluster. Accordingly, a full view of a potential user may be all user profile nodes or represent any edges above the minimum threshold of zero, while more selective views will include fewer such user profile nodes.

Referring to FIGS. 17-19 generally, it is recognized that the above examples of thresholds and approaches for assigning and/or determining node confidence and edge confidence values are merely illustrative, and not limiting on the present disclosure. Furthermore, some approaches for determining confidence may be adapted specifically to particular identity graph structures, such as the structures described in Parts II and IV of this document. However, across the various embodiments, the approaches for calculating or determining confidence, including use of both node confidence and edge confidence, specific attribute quality levels, and normalization and classification of confidence levels provide advantages over existing approaches with respect to managing a balance between a number of possible edges formed between user profile nodes and qualitatively tracking the likelihood of linkages among such nodes. As noted previously, this improves the ability to flexibly respond to user data requests submitted to a user identity platform managing such an identity graph.

IV. Alternative Embodiments of Identity Graphs and Management Thereof

Although the above descriptions of an identity graph and use of confidence level calculations/classifications are based on use of a particular identity graph structure, other possible identity graph structures may also be used, and may achieve at least some of the advantages described herein.

Figure 20:
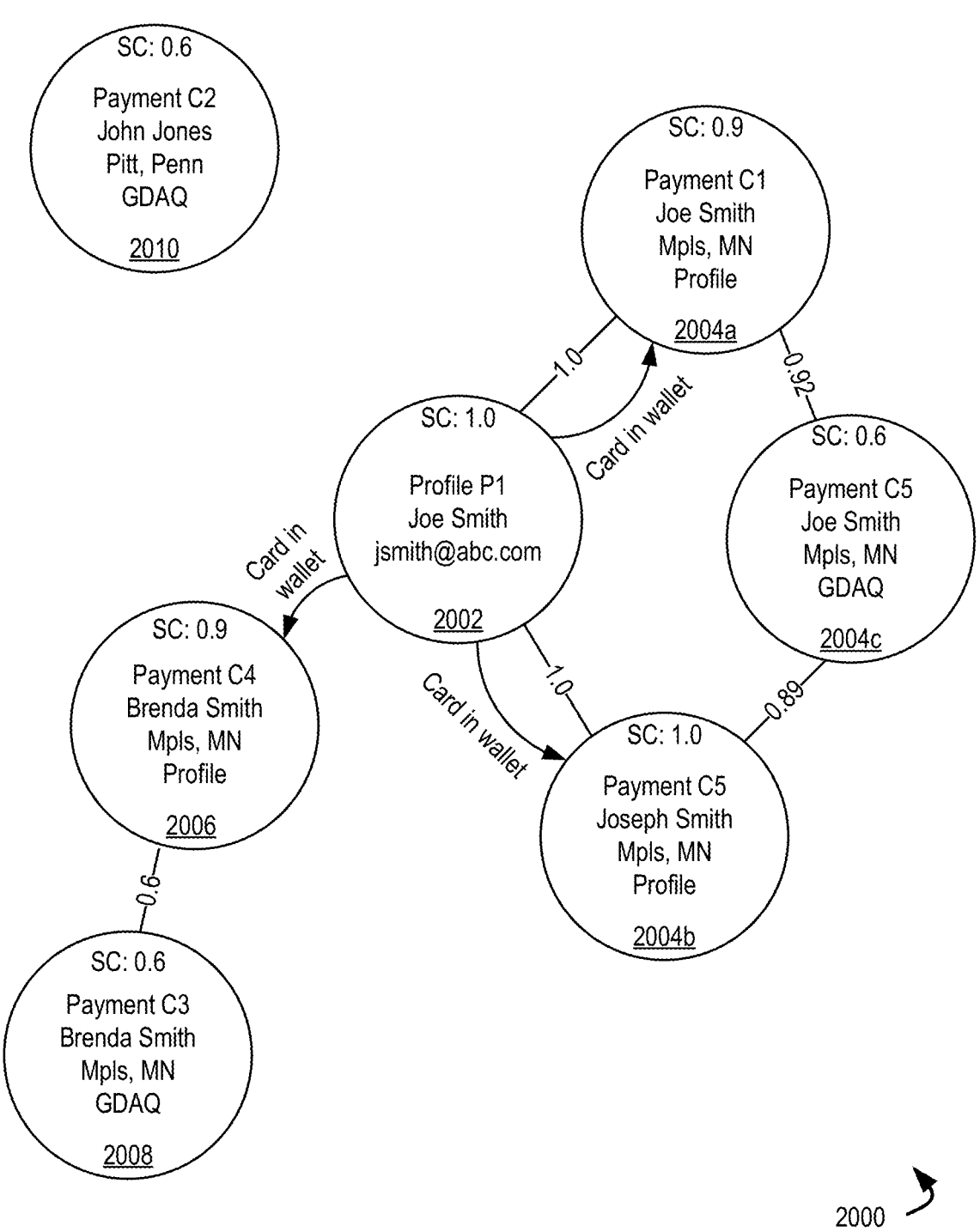
FIG. 20 is an example portion of an identity graph illustrating node confidence and edge confidence and edge confidence, in an alternative example embodiment.

FIG. 20 is an example portion of an identity graph 2000 illustrating node confidence and edge confidence, in an alternative example embodiment. In this general example, a user profile node 2002 is used to link to payment account nodes, rather than using a user cluster node in the manner discussed above. In this specific example, within user profile node 2002, a profile is defined, including profile attributes for a particular user. The profile attributes included in the user profile node 2002 are those attributes that are of high confidence of correctness, e.g., based on those attributes being entered by the user in an online user profile. In examples, attributes may be stored in such a user profile node that have a very high confidence (e.g., 0.99, on a 0-1 scale described previously) is used. In other words, the user profile node 2002 maintains those attributes that are known to a statistical certainty to be associated with a particular user. In this example, the attributes of a name ("Joe Smith") and an email address ("jsmith@abc.com") are known to a statistical certainty, and are therefore included within the user cluster node 2002.

In some examples, the user profile node 2002 may represent a profile node in which a user explicitly registers himself/herself within a user identification platform, e.g., by providing personal information to an enterprise. As such, rather than forming both a user cluster node that lacks user attributes and a user profile node maintaining such attributes, in this example, those nodes are combined into a single node used to identify the user.

Additionally, in this example embodiment, the user profile node 2002 maintains a node confidence level itself. The node confidence level in this example is generally required to be of a very high confidence, e.g., 1.0. This is because such a user profile node 2002 will be associated with data specifically provided to the enterprise by the user, rather than inferential data received from a third party such as a payment card service.

In the example shown, the user profile node 2002 is linked to various payment nodes, including payment node 2004a, payment node 2004b, and indirectly, payment node 2004c, which can, for example, represent other user profile nodes associated with payment mechanisms. Payment node 2004a is linked to the user profile node 2002 because the specific payment card used and associated with payment node 2004a was explicitly linked to the user profile represented in the user profile node 2002, for example by adding a card to a user wallet maintained within the profile of user profile node 2002. Accordingly, an edge confidence between payment node 2004a and user profile node is set to 1.0, i.e., certainty that the nodes are associated with each other. Similarly, payment node 2004b is linked to the user profile node 2002 by a card in wallet action, resulting in a linking confidence or edge confidence of 1.0, representing enterprise certainty that the payment node 2004b is associated with the same user, despite a change in attribute (e.g., the variant of username and address information).

Furthermore, payment node 2004c is not linked to the user profile node 2002 because it represents a card transaction not explicitly placed in the user's wallet, but may match card number data and/or other attribute data. In this example, payment node 2004c is linked via an edge to payment node 2004b because they use the same payment card (where payment node 2004c represents use of the card in a store, rather than accessing the card from the user's wallet associated with the enterprise for online shopping, and the like). In this instance, payment node 2004c forms an identity edge with payment node 2004b based on use of the common payment card: the edge confidence, as shown, is 0.89 based on that shared attribute. Similarly, payment node 2004c forms an identity edge with payment node 2004a based on common name and address attributes, despite use of different payment card information. The identity edge between payment nodes 2004a, 2004c is shown as 0.92.

In some alternative embodiments, because payment nodes 2004b-c use a card having a same card number may be maintained as a single node, despite use of slightly different user names associated with that card. For example, a rule may be utilized in which a fuzzy string match between two user names may result in those names being considered a match, and the transactions being associated with the same payment node.

As above, payment nodes 2004a-c each have an associated node confidence as well. For example, payment node 2004a has a node confidence of 0.9, and payment node 2004b h as a node confidence of 1.0. Payment node 2004c, representing an in-store, third party payment card transaction, has a node confidence of 0.6, in this example.

As such, it can be seen that, in comparison to the prior identity graph, not all user profile nodes (payment nodes 2004a-c) may be linked to the user profile node (node 2002). This has the advantage of needing less management of cluster edges than in an arrangement using both user profile nodes and user cluster nodes, but with the downside of more node traversals to identify all nodes having sufficient similarity/confidence as to fall within a definition of a user in response to a request for user data.

In the example identity graph 2000, the hub node, e.g., user profile node 2002, may be linked to other nodes that are not associated with the same user. In the example shown, a payment node 2006 is associated with a different user entirely, but may have been added to the user profile for the user associated with the hub node. In this example, user "Joe Smith" has a profile with an enterprise, and has added a payment card having a name "Brenda Smith". This addition of a card may not create an identity edge, because the addition of the card may correspond to incorporation of payment information for a family member or other affiliated user into the user account. In this instance, payment node 2006 may have a node confidence of 0.9 (being a node associated with an online purchase, and therefore requiring certain user data entry), and may be linked by an identity edge to a further payment node 2008. The further payment node 2008 may be associated with the same user, and may be a different payment card but associated with the same name and address, and therefore an identity edge may be formed between the payment nodes 2006, 2008. In this case, the edge confidence (0.6, in this example) may be determined from the node confidence of the lowest-confidence node in the link, i.e., the payment node 2008.

In the example identity graph 2000 as shown, additional nodes may be included. In this example, a further payment node 2010 is not affiliated with any of the other user profiles, and represents a third party transaction profile that is not associated with a known user registered with the enterprise. This payment node 2010 may be maintained independently and can be treated as its own hub node, or may be maintained separately until a user (e.g., user "John Jones") creates a user account and links the payment node 2010 to that user account. In that case, the user account can import the user attributes and maintain attribute confidence scores corresponding to the node confidence score (0.6) of the payment node 2010, unless and until the user enters specific user information into such a user account (in which case a higher confidence may be used).

Figure 21:
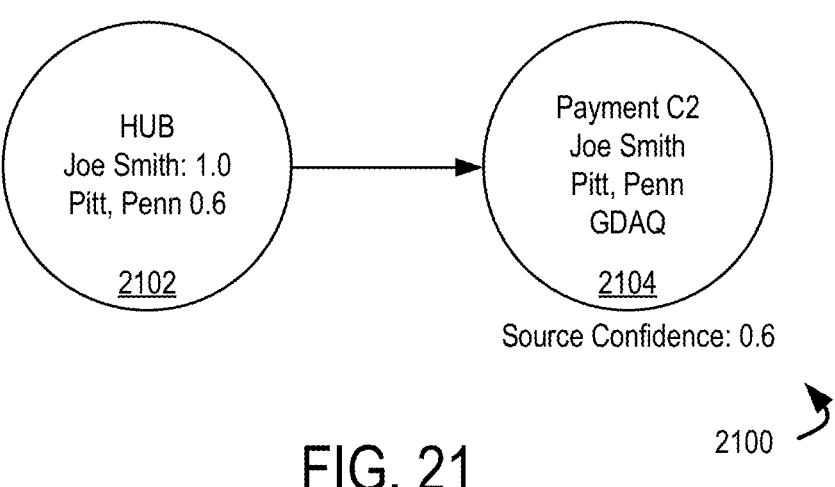
FIG. 21 is an example portion of an identity graph, in accordance with an alternative embodiment.

FIG. 21 is an example portion of an identity graph 2100, in accordance with an alternative embodiment. The identity graph 2100 represents a simplified variant of the identity graph 2000 of FIG. 20. In this example, the hub node 2102 is associated with a single payment node 2104. The hub node 2102 acts similarly to the user cluster node described above, and can be referred to similarly. In this example, and by way of contrast to the identity graph 2000, the hub node 2102 inherits attributes of the payment node 2104, and maintains a confidence of the attribute that corresponds to the node confidence. For example, a user may create an account with an enterprise with a name "Joe Smith". A matching payment made at a point of sale using a payment card C2 by "Joe Smith" may have an address attribute that is received from a third party service, and therefore the hub node 2102 inherits the address attribute "Pitt, Penn" having a confidence (0.6) corresponding to the source confidence, or node confidence, of the payment node 2104.

Figure 22:
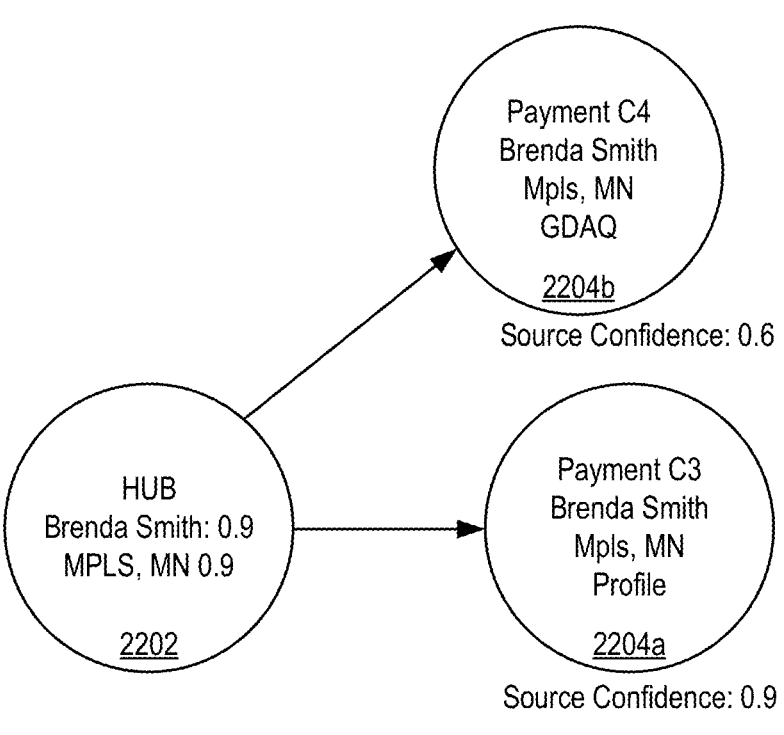
FIG. 22 is an example portion of an identity graph, in accordance with a further alternative embodiment.

FIG. 22 is an example portion of an identity graph 2200, in accordance with a further alternative embodiment. In this example, a hub node 2202, such as a user profile node, may be created based on an online payment at a payment node 2204a. The hub node 2202 may inherit name and location attributes from that payment node 2204a. A third party payment card transaction, such as an in-store transaction, may result in creation of a further payment node 2204b, which may be linked to the hub node 2202 based on shared attributes in accordance with the discussion above. In this example, the hub node maintains individual confidence for each attribute of the user that corresponds to a highest node confidence for a node containing the attribute.

Figure 23:
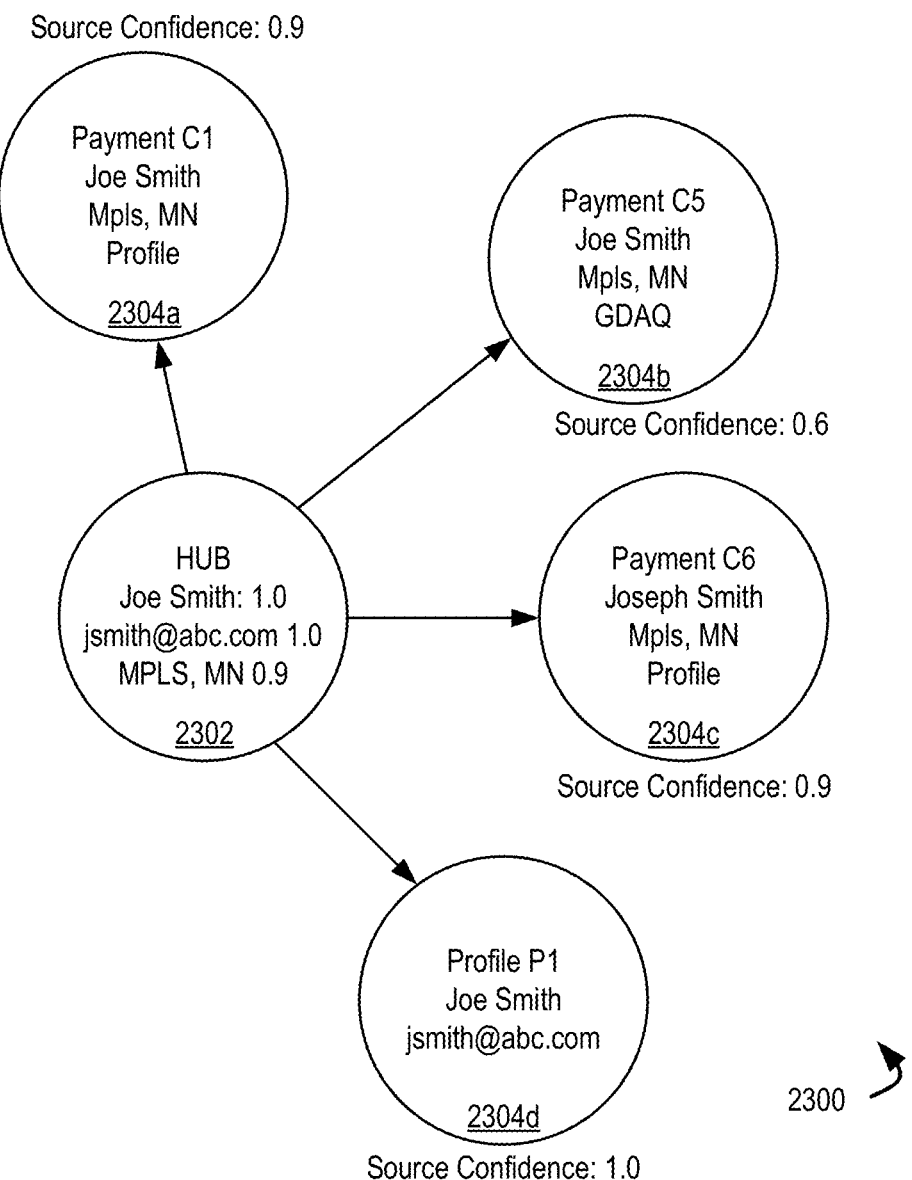
FIG. 23 is an example portion of an identity graph, in accordance with a further alternative embodiment.

FIG. 23 is an example portion of an identity graph 2300, in accordance with a further embodiment showing further examples of such a "hub node" arrangement. In this example, as with FIGS. 21-22, rather than using edges between user profile nodes, a hub node 2302 is used. The hub node 2302 acts similarly to the user cluster node described above, and can be referred to similarly. In this example, the hub node aggregates user attribute information within it from associated user profile nodes 2304a-d, and associates the greatest confidence attribute information with the user. For example, in this example, hub node 2302 maintains a name attribute of "Joe Smith" based on user profile node 2304d having a node confidence of 1.0 and using that name information. In alternatives, the name attribute information may be drawn from a store payment card name attribute. This may be further validated by the fact that three of four profile nodes 2304a-d associated with the hub node 2302 use that name. Additionally, an email address attribute is aggregated in the hub node 2302 from user profile node 2304d, based on the highest confidence value. Location information ("Mpls, MN") may be used based on nodes 2304a, 2304c having a next highest confidence, and having matching location information. Notably, within the hub node 2302, the node confidence for each user profile node is attributed to an attribute confidence for the attributes maintained within the hub node. This allows the hub node 2302 to maintain all information about the various user profile nodes 2304a-d associated with it. In this instance, user profile nodes 2304a-d may be associated with the hub node 2302 based on similarity of attributes between those maintained at the hub node 2302 and those of a given user profile node, thereby eliminating the need for edge nodes between the user profile nodes 2304a-d.

Of course, it is noted that although the above identity graph types may be used in conjunction with the confidence scoring described above, as well as the probabilistic user matching and verification processes described below, each approach has particularized advantages. For example, some of the above approaches require aggregation of user attributes into a hub node, such as a user cluster node, rather than allowing such attributes to merely be maintained within a user profile node. Furthermore, for those approaches that do not use a hub or cluster node, but rather rely on linked user profile nodes, there may be some computational savings in maintaining user cluster node relationships and edges, at the expense of potentially longer identity edge traversals to identify all user profile nodes that would otherwise be included in a definition of a user in response to a request. Furthermore, in such systems, multiple user identifiers may refer to the same user, with a dynamic user identity reflecting the concatenation of linked information from a user identity graph. This may be both computationally intensive and may cause some difficulty for external systems that ingest identity data to maintain validatable and consistent information associated with a given user.

V. Probabilistic User Matching and Verification Processes for Customer Data for Identity Graph Enhancement As previously discussed, in various embodiments, the matching of user profile nodes to other nodes within an identity graph may be performed using any of a variety of deterministic rules, for example based on matching of attributes between profiles. However, because such rules are generally static or require user observations as to their overall accuracy, there are limits to the extent and rate of improvement of those matching processes, and therefore limits to the extent various confidence levels may be improved. Furthermore, there may be types of relationships between user profiles, and types of activity within a given profile, that may be highly indicative of a particular user identity (e.g. specific purchases of goods, such as toys and the like) that might otherwise go undetected, but when considered in a probabilistic manner, could improve either the edge confidence or edge type within an identity graph.

In some example embodiments of the present disclosure, one or more probabilistic classification models may be used to assist with correlation of user (e.g., customer) activity with a particular user profile. For example, transaction data may be compared against candidate nodes within an identity graph to identify likely matching nodes, either for improving the confidence that a node is a particular user, or for improving a confidence with which two nodes may be linked. This may assist with, for example, matching in-store purchase activity to online activity of a particular user already known within the identity graph.

Figure 24:
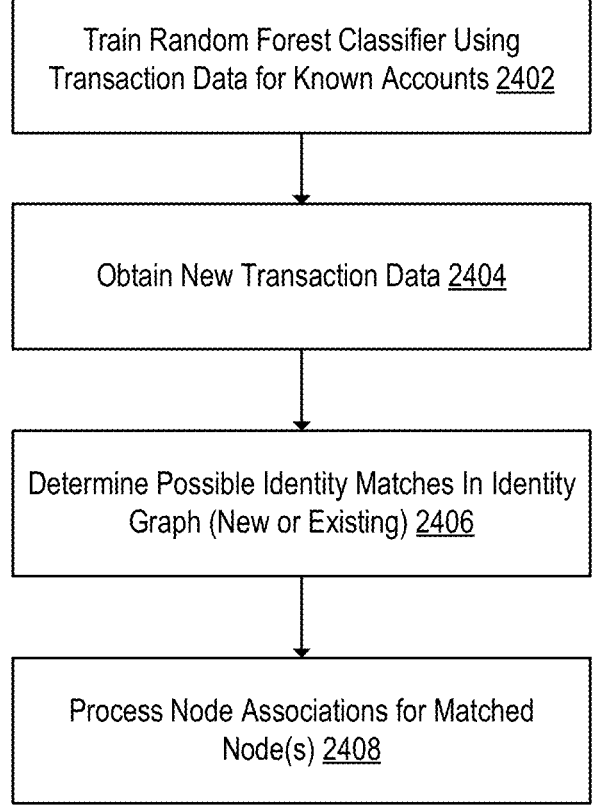
FIG. 24 is a flowchart of a method of performing a probabilistic matching process useable to inform a structure of an identity graph, in accordance with an example embodiment.

To that end, a method 2400 of performing a probabilistic matching process useable to inform a structure of an identity graph is illustrated in FIG. 24. In that example, a classifier model, such as a random forest classifier, is trained using transaction data for known accounts reflected in the user profile nodes in the identity graph, at step 2402. Generally speaking, and as described further below in conjunction with FIG. 29, the random forest classifier model is configured to receive transaction information, or transaction data, and classify that data as to its likelihood of correlation to transaction data associated with an existing user profile node.

In the example shown, the method includes obtaining new transaction data, at step 2404. The new transaction data can be transaction data associated with an account not previously observed by the user identity platform. Upon receipt of the new transaction data, the user identity platform will determine one or more possible identity matches within the identity graph, or will determine a best match for the account from a set of suspect pairs, at step 2406. The one or more possible identity matches may correspond to a new user cluster node (i.e., a determination that no match exists from among the candidate user cluster nodes), or an existing user cluster node. Determining one or more possible identity matches within the identity graph may be performed using, for example, behavior inferences to select a best match from among a list of possible profiles associated with that transaction data. This can be, for example, selecting a likely owner of a credit card reflected in transaction data based on behavior inferences. The transaction data, and other transaction data associated with that payment card, may be used to obtain behavior inferences for matching purposes. Additionally, or in the alternative, behavior inferences may be used to adjust a linking confidence between two candidate nodes (e.g., suspect pairs). In such an example, the linking confidence may be incremented up or down based on the determination based on behavior reflected in the transaction data, or within other transaction data associated with the same payment card. Once any possible identity matches are identified, a node association processing operation is performed, for example to adjust established edges (in the case of adjusting linking confidence) or to determine which of the candidate nodes corresponds to a matching node (in the case of using behavioral data to identify a best match), at step 2408.

Figure 25:
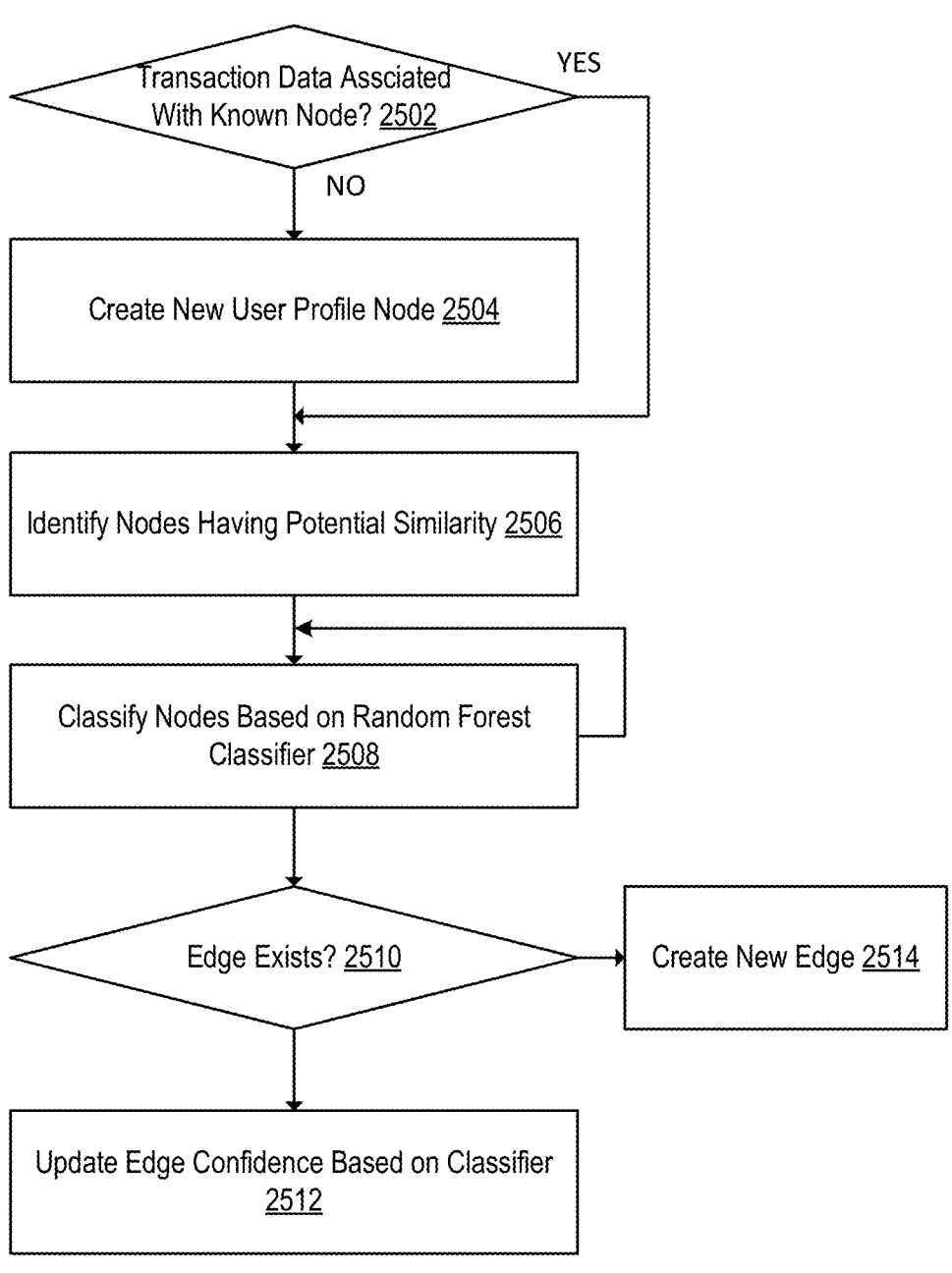
FIG. 25 is a flowchart of a detailed method of determining and processing identity matches using a probabilistic matching process, in accordance with an example embodiment.

Referring specifically to FIG. 25, a flowchart of a detailed method 2500 of determining and processing identity matches using a probabilistic matching process is provided. The method may be used to adjust a linking confidence (e.g., an edge confidence, or a suspect edge) between two candidate nodes (e.g., suspect pairs). The method 2500 may be performed as an example of the node association processing operation of step 2408, and provides a structure for probabilistic matching using transaction data to enhance an identity graph, as well as adjustment of aspects of the identity graph in response thereto.

In the example shown, the method 2500 includes determining, at operation 2502, whether transaction data is associated with a known node. This may include, for example, matching a third-party payment card number or otherwise performing one or more deterministic processes to identify and correlate the transaction data to an existing user profile node.

Generally speaking, in situations where the transaction data is not associated with a known user profile node (or at least not one that is readily identifiable via the transaction data), the method 2500 may include creating a new user profile node, at step 2504, in accordance with the methods described previously.

Once the transaction data is associated with a cluster, one or more other user profile nodes may be identified that have potential similarity to the user profile node, at step 2506. Identifying other potentially similar user profile nodes may include performing a deterministic matching process between the user profile node and other nodes within the identity graph. In some cases, a generally permissive set of criteria may be used that can identify a broad collection of candidate user profile nodes that may correspond to a match: this broad collection may include user profile nodes for which an identity edge would otherwise typically be created using deterministic rules alone, but may also include user profile nodes which might otherwise not have sufficient similarity to form an identity edge using deterministic rules alone. For example, partial matches to user names and similar geographic locations (e.g. similar ZIP Code) may be sufficient to identify a candidate user profile node that might be linked (e.g., forming a suspect pair), but might not typically be sufficient to establish an identity edge. This may also include, in some embodiments, an identification of user profile nodes that have existing edges, such as identity edges, shared with the node being considered (i.e. when both the node representing the transaction data and the matching node already exists and are linked by an edge).

Once such candidate matching nodes are identified, including any suspect pairs that may exist (i.e., the pair being the current node and any other nodes that are partially but not adequately matched by deterministic rules), the user profile node reflected in the receive transaction data may be compared against, individually, each of the candidate matching nodes using a classifier model, at step 2508. The classifier model will use transaction data associated with the user profile node and transaction data associated with the candidate matching nodes to identify, probabilistically, a likelihood that the two nodes represent the same user, and therefore strengthen the score of the link between the nodes which may result in clearing the threshold for an identity edge. Such a change in score may result in that identity edge being created. If the threshold is not met, the resulting score can still be saved on the edge for that suspect pair, and will be available for future incremental movement up or down until such a time that a lower threshold is met and the edge disappears completely. In example embodiments, the classifier model generates a probability score for each pair of nodes considered. Based on the probability score, a decision may be able to be made, using various thresholding, as to whether an edge should be created between two nodes, or whether a confidence, such as a node confidence or edge confidence should be adjusted. An example of a system for performing such probabilistic analysis within the user identity platform is provided below in conjunction with FIG. 29.

In the example shown, the method 2500 includes determining whether an edge exists, at step 2510. If an edge already exists, a confidence updating operation, at step 2512, determines whether to update an edge confidence based on the output of the classifier at step 2508. That is, if there is close correlation between newly-received transaction data and transaction data of another node, in some examples, the edge confidence between those nodes may be adjusted to increase that edge confidence, either numerically or within discrete levels. For example, the probability score may be weighted and/or normalized, and added to an existing edge confidence.

In examples where an edge does not already exist, it is possible that the method 2500 includes creating a new edge, at step 2514. The new edge would likely correspond to a suspect pair edge, and may be based solely on the probabilistic similarity between transaction data, or may be based on a previous weak correlation using determinative rules that are supplemented with probabilistic analysis. In other words, where an edge exists, probabilistic analysis of nodes may determine that the edge confidence should be increased or decreased. Where an edge does not previously exist, probabilistic analysis of the nodes may determine that the edge should be formed. For example, where deterministic rules may only imply a weak association between two nodes, those nodes may be identified and a classification model may be used to determine that the relationship between those nodes is in fact sufficiently strong to create an identity edge.

In some instances, third-party payment card details may be transmitted to an external card information supplementing service, which may receive a customer name and a de-identified payment card number, alongside a retail transaction location, and return an address (e.g., a physical address or mailing address) of a customer in response, it is observed that those addresses are received with only about 70% accuracy, and responses are only received for approximately one in three transactions. That is, if such an external service lacks confidence in a match between a name and address, it will not return an address. And, even in circumstances where an address is returned, it is potentially the case that the returned address is not the correct address for the individual who used the payment card. Accordingly, additional techniques for validating the selection of the correct individual consumer in the case of the third-party payment cards is desired.

In accordance with the example method described in FIG. 26, a modification to this third-party address information process is made, in which the third party service is adjusted to return any or all potential matches, rather than only those that meet the services baseline confidence level. Using that collection of potential matches, an enterprise may perform its own analysis in attempts to match one or more of the potential matches with the behavior of the individual as determined from payment card transaction information. Once a best match is determined, the identity graph would process the new payment card using the name and contact details of the individual with the best match.

Referring specifically to FIG. 26, a flowchart of a method 2600 of performing an identity verification process is provided. The method 2600 uses a third party identity verification service in combination with one or more matching processes that may be performed within a user identity platform. In the example shown, the method 2600 includes obtaining transaction data for third party payment cards, and deidentifying the card information associated with the transaction, at step 2602. Deidentifying the card information may include, for example, encrypting the payment card number or masking at least a portion of the payment card number, for example all but the last four digits of that number. The transaction data can include, for example, information about the purchases made, as well as a name of the person using the third-party payment card and a store identifier representing the location at which the purchases were made.

In the example shown, the method includes obtaining a plurality of consumers who live in the designated area and who have the name indicated on the payment card, at step 2604. Obtaining the consumers can include submitting the transaction data, or a portion thereof, to a third party information service. In examples, the third-party information service receives a name, a location of the retail enterprise at which the transaction occurred, and a de-identified representation of a card identifier used for the transaction. The third-party information service is requested to search a database of individuals who may be associated with the payment card (e.g., a U.S. consumer database), and return to a user identity platform the contact details for any consumer who may own the payment card, including address, email, and phone number. This can include even those matches that may have a low confidence of accuracy.

In the example shown, the method 2600 further includes identifying, within an identity graph, a plurality of user profile nodes that correspond to the potential customers, at step 2606. That is, any potential user having a match to an address, name, or other attributes may be identified at this stage.

Once the collection of user profile nodes is identified, transaction data associated with the purchase transaction may be compared with the transaction data of the identified plurality of user profile nodes, at step 2608. Based on this comparison of transaction data, a matching user profile node may be identified from among the collection of user profile nodes that were assessed, at step 2610.

The method of comparing transaction data between the received transaction data associated with the third-party payment card and the transaction data associated with the identified user profile nodes may take a number of forms. For example, a transaction classification model may be used to compare the transaction data of the third-party payment card against each of the potential matching user profile nodes. For example, a random forest classifier may be used to compare the transaction data and generate a confidence or likelihood of match between the transaction data and one or more of the user's identity clusters, as described herein.

In the example embodiment shown, the method 2600 further includes processing the received transaction record, at step 2612. That is, the record is ingested by a user identity platform, and details from the transaction record (e.g., account/identity information), and other suspect identity records discarded or held for analysis purposes, as well as the data associated with the transaction record, may be used in updating the identity graph in the manner described above.

In this instance, in some cases the method 2600 can include updating a node confidence, at step 2614, based on the additional details that may be available in the transaction data, or received from the third-party service. For example, the additional transaction details may include specific user attributes that may be added to a user profile in a user profile node, which may then allow for adjustment of confidence deterministically based on a closer match between the user profile node and other user profile nodes within the identity graph (e.g. within a cluster). The adjustment in confidence may, in some embodiments, be based at least in part on an observed accuracy or completeness of account attribute data received from the third-party service and attributable to the third-party payment card. The additional transaction details may also be used, as part of a classification model, to identify with greater confidence a particular user. This may allow for increase in the source confidence, or node confidence, for a given third-party transaction card operation. The change in source or node confidence may be based on observed improvements achieved through use of a probabilistic classifier used to analyze transaction activity for user correlation. The analysis of transaction activity may determine, for example, a common item preference between items represented in the transaction data and other transaction data associated with other user profile nodes, or a similar item purchasing pattern reflected in the respective transaction data.

In some examples, the adjustment in node confidence may result in a change of classification of the node confidence among a plurality of preset confidence levels. For example, use of transaction information to assess node confidence may allow for upgrade of node confidence from low confidence level to a higher confidence level, such as a medium or high confidence level as described above in conjunction with FIG. 19.

In situations where additional information may not be available from third-party service or where no additional matching may be performed, it is possible that the baseline node confidence is not adjusted. Additionally, if no existing user profiles are identified to which the additional attribute data may be attributed, a baseline node confidence may also not be adjusted.

In some examples, at step 2610, it may be the case that no existing user identity cluster matches the transaction data. In such cases, a new user profile node may be created, and assessed relative to existing user profile nodes to determine whether it should reside within a particular user cluster. As part of that process, probabilistic techniques may be utilized to improve a correlation between the newly created user profile node and other user profile nodes for purposes of establishing identity edges.

Figure 27:
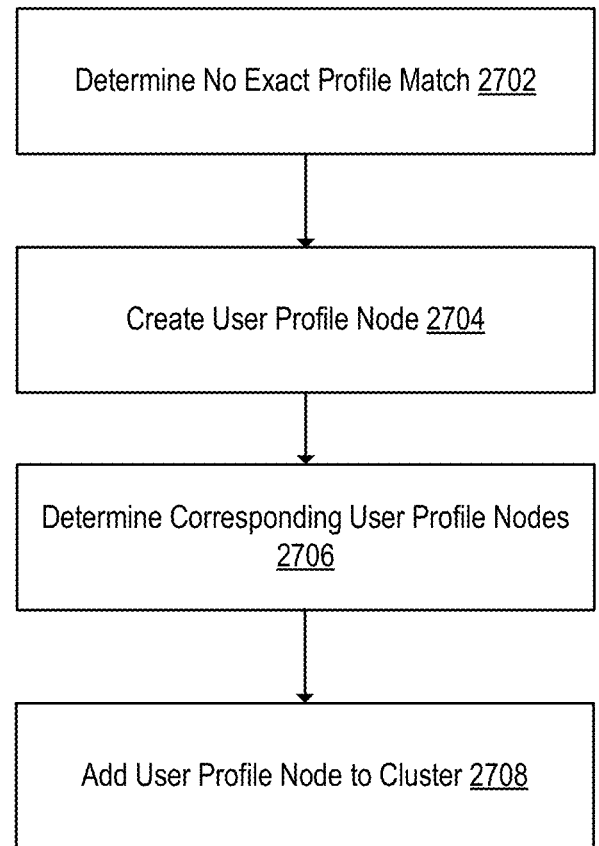
FIG. 27 is a flowchart of a method of one possible use of the identity verification process in determining the presence of a new user profile node and placing such a user profile node within an identity graph, according to an example embodiment.

An example of such a process is described in conjunction with FIG. 27, which illustrates a method 2700. The method 2700 represents one possible use of the identity verification process in determining the presence of a new user profile node and placing such a user profile node within an identity graph, according to an example embodiment.

In the example shown, the method 2700 includes determining that there is no exact profile match, at step 2702. Accordingly, a new user profile node is created, at step 2704. Corresponding user profile nodes may be identified, at step 2706, based on deterministic and/or probabilistic techniques. In particular, in this instance, the possible contact information received from the third-party service may be used to identify potential candidate user profile nodes that may correspond to a same user as the newly created user profile node, for example based on common name and contact information, as well as similar transaction history or patterns.

In the example shown, the method 2700 includes adding the user profile node to a user cluster, at step 2708. In some examples, this may include creating a new user cluster, for example where no corresponding user profile nodes exist, and therefore no identity edges are formed.

Figure 28:
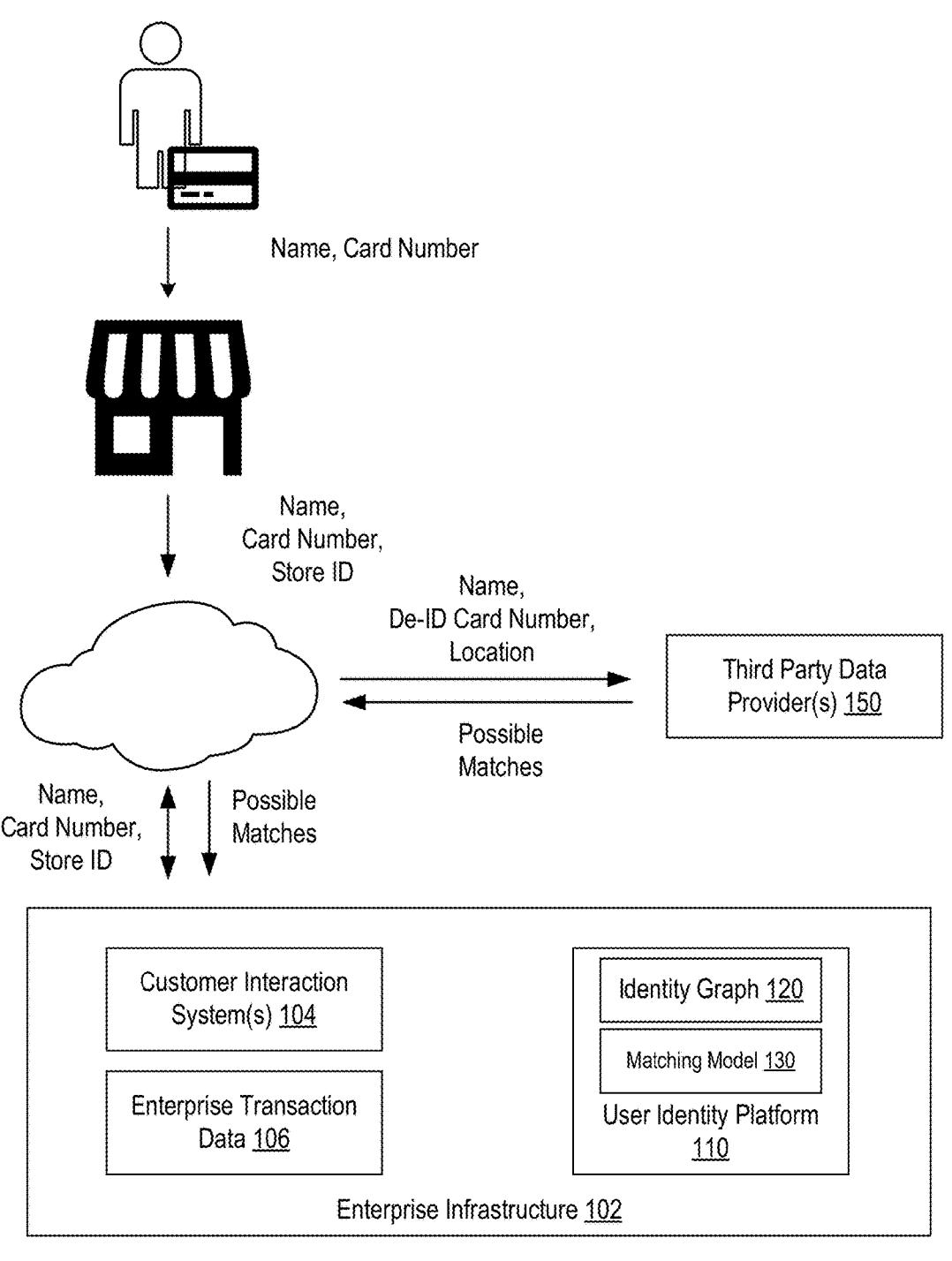
FIG. 28 is a logical diagram of an example identity verification process, in accordance with example embodiments.

Referring now to FIG. 28, a logical diagram 2800 of an example identity verification process is provided, in accordance with example embodiments. The identity verification process illustrated may be implemented using the methods of FIGS. 24-27, above, and is performed within the context of a retail environment. In the example shown, a customer 12 may conduct a purchase transaction at a store location 14 using a third-party credit card. As part of the transaction, a point of sale at the store location will capture, from the credit card, a card number as well as a cardholder name and transaction details, and pass the transaction details, name, and card number, alongside a store identifier, to enterprise infrastructure 102. In examples, the user identity platform 110 will receive the cardholder name, card number, and store identifier, and may pass to a third-party data provider 150 the cardholder name, a de-identified card number (e.g., the encrypted card number, a masked version of the card number including only the last four digits being available for matching), and a general location of the transaction (e.g. store identifier that maps to a file with store shopping area).

Figure 29:
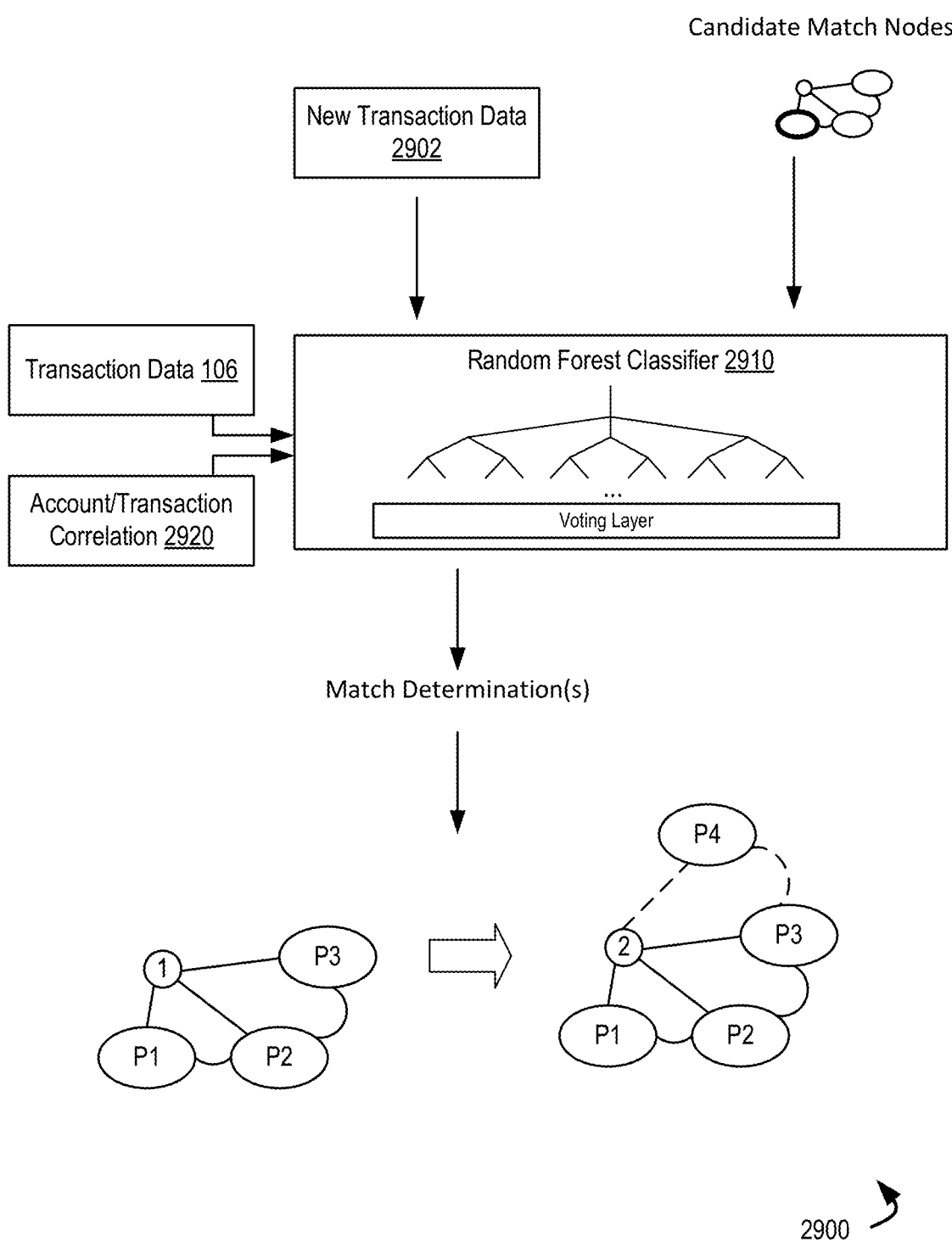
FIG. 29 is a logical diagram of a possible structure for probabilistic matching within a user identity platform.

As mentioned above, in typical cases a third-party data provider 150 will return either a single match, or no matches if it cannot be determined that there is a single matching individual. The third-party data provider 150 is configured to return information about the customer based on the name, location, and de-identified card number FIG. 29 is a logical diagram 2900 of a possible structure for probabilistic matching within a user identity platform. The diagram may take place, in whole or in part, within the user identity platform 100 of FIG. 1, or at least within enterprise infrastructure 102.

In the example shown, transaction data 2902, for example representing purchase transaction at a retail location, is received at the user identity platform, and a number of candidate match nodes are also received, as previously described. In this example, the user identity platform 110 may include a classifier model, shown as random forest classifier 2910.

In example embodiments, the random forest classifier 2910 is trained using transaction data 106 and account to transaction correlations 2920. Specifically, pairs of known correlated nodes (and optionally, pairs of known non-correlated nodes) may be used as training data, and provided to the random forest classifier 2910. In a retail context in which both store data and online shopping data are both available, there may be a need to manually pair initial sets of store and online data for purposes of training, or to otherwise correlate transaction data. Specifically, transaction data that may be used in a matching process may include online/browse data, store transaction data, IP address to ZIP code matching, store ID to ZIP code matching, ZIP code distances (to determine a distance between a given user's home address ZIP code to that of a store), item attributes, item mapping, and various global user identifier mappings. Other types of data may be used as well.

To then form a reasonably-sized set of training data, a set of binary, integer, or other numerical and/or string values may be generated as features of each pair of store and online transaction data collections (each collection representing a separate account, and therefore a separate user profile node). Example features used for defining a pairing between accounts can include:

- Whether a valid global identifier exists for the online user
- Whether the global identifier matches an identifier for a retail store customer
- Whether a valid key exists for an online user
- Whether the global identifier associated with the valid key matches an identifier for a retail store customer
- A number of common items bought in a store and online
- A number of common items bought in a store and browsed online
- A number of common lowest-level categories of items bought in a store and bought or browsed online
- A number of common next-level categories of items bought in a store and bought or browsed online
- A number of sub-class items that are bought both in store and bought or browsed online
- A number of class-level items bought in store and bought or browsed online
- A list of purchase dates in stores, browse/purchase dates online, and time gaps therebetween
- Average, median, min/max of time differences calculated between in store and online purchases Common keywords between store purchased items and online browsed or purchased items Total and/or average amount spent online and in store, or browsed online Number of item purchased that had a price lower than a regular price Accordingly, once trained, the random forest classifier may receive an identification of two nodes, or two sets of transaction data, and identify a likely correlation across two accounts in response. The random forest classifier 2910 generates a plurality of parallel probability analyses and includes, in some instances, an aggregation, or voting, layer, which outputs a probability score representing a normalized likelihood of or extent of similarity between two nodes. In examples the classifier model is configured to compare various transaction patterns within transaction data 2902 against other transaction data, for example transaction data 106, which corresponds to transactions for each of the candidate matching nodes individually.

In the example shown, a set of match determinations, with a single match determination per pair of candidates (e.g., a comparison of a current set of transaction data or node relative to match candidates) may be used to determine the presence of edges between two nodes, and therefore may selectively add new nodes to existing user clusters, where one of the matched nodes is a pre-existing member of that cluster. In alternative embodiments, the match determination between nodes of a pair of candidate nodes may strengthen an existing identity edge connection, for example to increase a confidence of an identity edge.

Accordingly, referring to FIGS. 24-29 generally, identity graphs of various forms described in this disclosure may be enhanced by identifying relationships among user profiles that would otherwise not be apparent from profile attributes alone. Finding such hidden relationships through a probabilistic classifier improves the "completeness" of the view of a given profile (beyond just the attributes such as name, address, contact information), and can improve an overall confidence in a particular data source, as well as a confidence that two profiles are in fact related. This has even further downstream advantages in terms of accuracy and completeness of the overall view of a given user. In the retail context understanding a consumer more holistically (e.g., by understanding behavior for all of the user's accounts) increases the opportunity to identify advantageous communication opportunities and methods with a user, thereby increasing the likelihood of interaction and enhancing the customer's relationship with the retailer.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of identification graph structures applied to customer identity, technologies disclosed herein are applicable to identity graph structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of verifying customer data for inclusion in a customer identity graph, the method being performed by a customer identity management platform of a retail enterprise, the method comprising:

obtaining transaction data associated with a third party payment card of a customer used in a transaction at a location of a retail enterprise, the transaction data including transaction attributes including at least a customer name, an account identifier of the third party payment card, and the location of the retail enterprise at which the transaction occurred;

submitting at least a portion of the transaction data to a third party service after completion of a transaction represented by the transaction data, wherein the third party service is external to the retail enterprise, and wherein submitting a portion of the transaction data includes deidentifying the transaction data associated with the third party payment card;

receiving, from the third party service, a plurality of potential customer contact information data sets of the customer, in response to submitting the at least a portion of the transaction data to the third party service, the plurality of potential customer contact information data sets including customer addresses, emails, and phone numbers;

identifying, within the customer identity graph maintained by the identity management platform, a plurality of user profile nodes corresponding to the plurality of potential customer contact information data sets of the customer, the customer identity graph including a plurality of user clusters, each user cluster being associated with a different customer and including one or more user profile nodes, each of the one or more user profile nodes being associated with a customer account of the customer, wherein the identity management platform further includes a random forest classifier model trained using transaction data and account to transaction correlations representing pairs of known correlated nodes or pairs of known non-correlated nodes;

comparing, via the random forest classifier model, the transaction data to other transaction data associated with the plurality of profile nodes, wherein the identity management platform further includes the random forest classifier model;

generating, via the classifier model, based on the comparison, a probability score, the probability score representing a likelihood of correlation between the transaction data and transaction data of a corresponding one of the plurality of user profile nodes;

identifying, based on the probability score generated by the classifier model, a matching user profile node from among the plurality of user profile nodes based on a similarity of the transaction data; and associating the transaction data with the matching user profile node based on the probability score, wherein associating the transaction data with the matching user profile node further comprises at least one of updating an existing edge confidence, creating a new edge, or removing an existing edge to improve the accuracy and completeness of the customer identity graph, wherein updating the existing edge confidence includes adjusting a strength of association between the matching user profile node to one or more user profile nodes within the customer identity graph, wherein creating the new edge includes, in response to determining that the probability score is above an upper identity edge threshold, creating the new edge between the matching user profile node and one or more user profile nodes within the customer identity graph, and wherein removing the existing edge includes, in response to determining that a probability score is below a lower identity edge threshold, removing the existing edge between the matching user profile node and one or more user profile nodes within the customer identity graph;

receiving a request for a customer identity of the customer, the request comprising attributes of the customer and a desired identity confidence;

in response to receiving the request, determining a user cluster from among the plurality of user clusters corresponding to the customer identity; and identifying the user profile nodes associated with the user cluster node based on the received attributes and the desired identity confidence, wherein identifying the user profile nodes further comprises identifying one or more customer accounts associated with the user profile nodes within the determined user cluster that satisfy the desired identity confidence based on a node confidence of the user profile nodes corresponding to the one or more customer accounts; and providing an identification of the one or more customer accounts identified by the user profile nodes within the determined user cluster.

2. The method of claim 1, wherein the comparison of the transaction data to other transaction data associated with the plurality of user profile nodes includes an identification of a common item preference between items represented in the transaction data and the other transaction data.

3. The method of claim 1, wherein the transaction data further includes a card number of the third party payment card.

4. The method of claim 3, further comprising submitting at least a portion of the transaction data to the third party service by providing the customer name, the location of the retail enterprise at which the transaction occurred, and a deidentified representation of the card number.

5. The method of claim 1, wherein updating a node confidence of the matching user profile node includes upgrading the node confidence from a low node confidence to a higher node confidence.

6. The method of claim 1, wherein the third party service is a data broker service.

7. A customer identity management platform used within a retail enterprise, the customer identity management platform comprising:

a computing system comprising a memory and a processor, the memory storing instructions which, when executed by the processor, cause the computing system to perform:

obtaining transaction data associated with a third party payment card of a customer used in a transaction at a location of a retail enterprise location, the transaction data including transaction attributes including at least a customer name, an account identifier of the third party payment card, and the location of the retail enterprise at which the transaction occurred;

submitting at least a portion of the transaction data to a third party service after completion of a transaction represented by the transaction data, wherein the third party service is external to the retail enterprise, and wherein submitting a portion of the transaction data includes deidentifying the transaction data associated with the third party payment card;

receiving, from the third party service, a plurality of potential customer contact information data sets of the customer in response to submitting the at least a portion of the transaction data to the third party service, the plurality of potential customer contact information data sets including customer addresses, emails, and phone numbers;

identifying, within an identity graph maintained by the customer identity management platform, a plurality of user profile nodes corresponding to the plurality of potential customer contact information data sets of the customer, the customer identity graph including a plurality of user clusters, each user cluster being associated with a different customer and including one or more user profile nodes, each of the one or more user profile nodes being associated with a customer account of the customer, wherein the identity management platform further includes a random forest classifier model trained using transaction data and account to transaction correlations representing pairs of known correlated nodes or pairs of known non-correlated nodes;

comparing, via the random forest classifier model, the transaction data to other transaction data associated with the plurality of profile nodes, wherein the identity management platform further includes the random forest classifier model;

generating, via the classifier model, based on the comparison, a correlation probability score, the probability score representing a likelihood of correlation between the transaction data and transaction data of a corresponding one of the plurality of user profile nodes;

identifying, based on the probability score generated by the classifier model, a matching user profile node from among the plurality of user profile nodes based on a similarity of the transaction data; and associating the transaction data with the matching user profile node based on the probability score, wherein associating the transaction data with the matching user profile node further comprises at least one of updating an existing edge confidence, creating a new edge, or removing an existing edge to improve the accuracy and completeness of the customer identity graph, wherein updating the existing edge confidence includes adjusting a strength of association between the matching user profile node to one or more user profile nodes within the customer identity graph, wherein creating the new edge includes, in response to determining that the probability score is above an upper identity edge threshold, creating a new edge between the matching user profile node and one or more user profile nodes within the customer identity graph, and wherein removing the existing edge includes, in response to determining that a probability scores is below a lower identity edge threshold, removing the existing edge between the matching user profile node and one or more user profile nodes within the customer identity graph;

receiving a request for a customer identity of the customer, the request comprising attributes of the customer and a desired identity confidence:

in response to receiving the request, determining a user cluster from among the plurality of user clusters corresponding to the customer identity; and identifying the user profile nodes associated with the user cluster node based on the received attributes and the desired identity confidence, wherein identifying the user profile nodes further comprises identifying one or more customer accounts associated with the user profile nodes within the determined user cluster that satisfy the desired identity confidence based on a node confidence of the user profile nodes corresponding to the one or more customer accounts; and providing an identification of the one or more customer accounts identified by the user profile nodes within the determined user cluster.

8. The customer identity management platform of claim 7, wherein the transaction data further includes a card number of the third party payment card.

9. The customer identity management platform of claim 8, wherein the computing system is communicatively connected to the third party service and configured to submit at least a portion of the transaction data to the third party service by providing the customer name, the location of the retail enterprise at which the transaction occurred, and a deidentified representation of the card number.

10. A non-transitory computer-readable storage medium comprising computer-executable instructions which, when executed, cause a customer identity management platform of a computing system to perform actions comprising:

obtaining transaction data associated with a third party payment card of a customer used in a transaction at a location of retail enterprise, the transaction data including transaction attributes including at least a customer name, a card identifier of the third party payment card, and the location of the retail enterprise at which the transaction occurred;

submitting at least a portion of the transaction data to a third party service after completion of a transaction represented by the transaction data, wherein the third party service is external to the retail enterprise, at least a portion of the transaction data including the customer name, the location of the retail enterprise at which the transaction occurred, and a deidentified representation of the card identifier, wherein submitting a portion of the transaction data includes deidentifying the transaction data associated with the third party payment card;

receiving, from the third party service, a plurality of potential customer contact information data sets of the customer in response to submitting at least a portion of the transaction data to the third party service, the plurality of potential customer contact information data sets including a plurality of potential customer addresses, emails, and phone numbers;

identifying, within an identity graph maintained by the identity management platform of the computing system, a plurality of user profile nodes corresponding to the plurality of potential customer contact information data sets of the customer, the customer identity graph including a plurality of user clusters, each user cluster being associated with a different customer and including one or more user profile nodes, each of the one or more user profile nodes being associated with a customer account of the customer, wherein the identity management platform further includes a random forest classifier model trained using transaction data and account to transaction correlations representing pairs of known correlated nodes or pairs of non-correlated nodes;

comparing, via the random forest classifier model, the transaction data to other transaction data associated with the plurality of profile nodes, wherein the identity management platform further includes the random forest classifier model;

generating, via the classifier model, based on the comparison, a probability score, the probability score representing a likelihood of correlation between the transaction data and transaction data of a corresponding one of the plurality of user profile nodes;

identifying, based on the correlation probability score generated by the classifier model, a matching user profile node from among the plurality of user profile nodes based on a similarity of the transaction data;

associating the transaction data with the matching user profile node based on the probability score, wherein associating the transaction data with the matching user profile node further comprises at least one of updating an existing edge confidence based at least in part on the similarity of the transaction data, creating a new edge, or removing an existing edge to improve the accuracy and completeness of the customer identity graph, wherein updating the existing edge confidence includes adjusting a strength of association between the matching user profile node to one or more user profile nodes within the customer identity graph, wherein creating the new edge includes, in response to determining that the probability score is above an upper identity edge threshold, creating the new edge between the matching user profile node and one or more user profile nodes within the customer identity graph, and wherein removing the existing edge includes, in response to determining that a probability scores is below a lower identity edge threshold, removing the existing edge between the matching user profile node and one or more user profile nodes within the customer identity graph;

receiving a request for a customer identity of the customer, the request comprising attributes of the customer and a desired identity confidence;

in response to receiving the request, determining a user cluster from among the plurality of user clusters corresponding to the customer identity;

identifying the user profile nodes associated with the user cluster node based on the received attributes and the desired identity confidence, wherein identifying the user profile nodes further comprises identifying one or more customer accounts associated with the user profile nodes within the determined user cluster that satisfy the desired identity confidence based on a node confidence of the user profile nodes corresponding to the one or more customer accounts; and providing an identification of the one or more customer accounts identified by user profile nodes within the determined user cluster.

11. The non-transitory computer-readable storage medium of claim 10, wherein each of the user profile nodes included in the identity graph has a node confidence, the node confidence being based in part on account attributes of the customer account associated with the corresponding user profile node, and each edge between a pair of user profile nodes has an edge confidence based in part on a similarity determination between attributes of the pair of use profile nodes.

12. The non-transitory computer-readable storage medium of claim 11, further comprising updating the node confidence of the matching user profile node includes upgrading the node confidence from a low node confidence derived from account attributes of the customer account corresponding to the matching user profile node to a higher node confidence based on both the account attributes and the similarity of the transaction data to the other transaction data of the one or more user profile nodes.

13. The non-transitory computer-readable storage medium of claim 10, wherein the node confidence of the matching user profile node is based at least in part on an observed accuracy of account attribute data associated with the third party payment card.

14. The non-transitory computer-readable storage medium of claim 13, wherein updating the node confidence includes increasing the node confidence in response to identifying the matching user profile node.

15. The non-transitory computer-readable storage medium of claim 10, wherein the instructions further cause the identity management platform of the computing system to perform:

in response to failing to identify a matching user profile node, maintaining a current confidence level of each of the plurality of user profile nodes corresponding to the plurality of potential customer addresses.

16. The non-transitory computer-readable storage medium of claim 10, wherein the comparison of the transaction data to other transaction data associated with the plurality of user profile nodes includes an identification of at least one of a common item preference between items represented in the transaction data and the other transaction data or a similar item purchasing pattern reflected in the transaction data and the other transaction data.

\*  \*  \*  \*  \*